(12) United States Patent
Russell et al.

(10) Patent No.: US 9,501,951 B2
(45) Date of Patent: Nov. 22, 2016

(54) USING STRUCTURED COMMUNICATIONS TO QUANTIFY SOCIAL SKILLS

(71) Applicant: TheatroLabs, Inc., Richardson, TX (US)

(72) Inventors: Steven Paul Russell, Menlo Park, CA (US); Christopher N. Todd, Dallas, TX (US); Guy R. VanBuskirk, Spicewood, TX (US); Partrick Fitzgerald, Dallas, TX (US); Ravi Shankar Kumar, Richardson, TX (US)

(73) Assignee: TheatroLabs, Inc., Richardson, TX (US)

( * ) Notice: Subject to any disclaimer, the term of this patent is extended or adjusted under 35 U.S.C. 154(b) by 0 days.

(21) Appl. No.: 14/680,475

(22) Filed: Apr. 7, 2015

(65) Prior Publication Data

US 2015/0213382 A1    Jul. 30, 2015

Related U.S. Application Data

(63) Continuation of application No. 13/972,436, filed on Aug. 21, 2013, now Pat. No. 9,053,449, which is a continuation-in-part of application No. 13/401,146, filed on Feb. 21, 2012, now Pat. No. 8,948,730, said (Continued)

(51) Int. Cl.
*H04W 4/10* (2009.01)
*G09B 19/04* (2006.01)
(Continued)

(52) U.S. Cl.
CPC ........... *G09B 19/04* (2013.01); *G06Q 10/0639* (2013.01); *G06Q 10/06393* (2013.01);
(Continued)

(58) Field of Classification Search
CPC .................. G06Q 10/06398; G06Q 30/0269; G06Q 30/0201; G06Q 30/0267; G06Q 30/0244; G06Q 30/0225; G06Q 50/01; G06Q 30/0261; H04L 67/1091; H04L 63/08
USPC ...... 455/412.1, 518, 127.1; 705/7.42, 14.53; 707/687; 370/328
See application file for complete search history.

(56) References Cited

U.S. PATENT DOCUMENTS 6,301,573 B1    10/2001    McIlwaine et al.
6,377,927 B1    4/2002    Loghmani et al.
(Continued)

FOREIGN PATENT DOCUMENTS

WO    0210926 A1    2/2002

OTHER PUBLICATIONS

"Extended Supplementary Search Report App # 14160323.3", Jun. 18, 2014, 6 pages.
(Continued)

*Primary Examiner* — Phuoc H Doan

(57) ABSTRACT

Embodiments for using structured communications to quantify social skills and social behavioral factors. Communications between at least two devices are intercepted and/or relayed by a computer system wherein a portion of the communications correspond to an audible source and wherein the forwarding or processing of communications is based on a combination of historical, contextual and/or commanded information derived from current and past communications by the computer system. Primary statistics are measured based on the communications and contextual information. Secondary statistics are derived related to a user wherein the secondary statistics quantify social skills and behavioral factors of the user in one or more dimensions against one or more profiles or roles.

21 Claims, 26 Drawing Sheets

Related U.S. Application Data application No. 13/972,436 is a continuation-in-part of application No. 13/665,527, filed on Oct. 31, 2012, and a continuation-in-part of application No. 13/739,504, filed on Jan. 11, 2013, and a continuation-in-part of application No. 13/832,944, filed on Mar. 15, 2013, and a continuation-in-part of application No. 13/833,572, filed on Mar. 15, 2013.

(60) Provisional application No. 61/445,504, filed on Feb. 22, 2011, provisional application No. 61/487,432, filed on May 18, 2011.

(51) Int. Cl.
| | | |
|---|---|---|
| *G06Q 10/06* | (2012.01) | |
| *H04L 29/08* | (2006.01) | |
| *G06Q 50/00* | (2012.01) | |
| *G09B 5/00* | (2006.01) | |
| *H04W 4/02* | (2009.01) | |

(52) U.S. Cl.
CPC ........ *G06Q10/06398* (2013.01); *G06Q 50/01* (2013.01); *G09B 5/00* (2013.01); *H04L 67/22* (2013.01); *H04W 4/028* (2013.01); *H04W 4/02* (2013.01)

(56) References Cited

U.S. PATENT DOCUMENTS

| | | | |
|---|---|---|---|
| 6,928,343 B2 | 8/2005 | Cato | |
| 6,937,998 B1 | 8/2005 | McGlynn et al. | |
| 6,996,531 B2 | 2/2006 | Korall et al. | |
| 7,248,881 B2 | 7/2007 | Shostak | |
| 7,397,368 B2 | 7/2008 | Otto et al. | |
| 7,656,295 B2 | 2/2010 | Robson et al. | |
| 7,748,618 B2 | 7/2010 | Vawter | |
| 7,925,777 B2 | 4/2011 | Levett | |
| 8,060,412 B2 | 11/2011 | Rosenbaum et al. | |
| 8,140,340 B2 | 3/2012 | Bhogal et al. | |
| 8,179,872 B2 | 5/2012 | Bienfait et al. | |
| 8,180,377 B2 | 5/2012 | Yang et al. | |
| 8,183,996 B2 | 5/2012 | Toyokawa et al. | |
| 8,271,188 B2 | 9/2012 | De Koning | |
| 8,352,260 B2 | 1/2013 | Sung | |
| 8,369,505 B2 | 2/2013 | Vuong | |
| 8,473,289 B2 | 6/2013 | Jitkoff et al. | |
| 8,630,851 B1 | 1/2014 | Hertschuh et al. | |
| 8,699,694 B2 | 4/2014 | Chishti et al. | |
| 8,798,036 B2 | 8/2014 | Kūt et al. | |
| 8,948,730 B2 | 2/2015 | Russell et al. | |
| 9,042,921 B2 | 5/2015 | Karmarkar | |
| 9,053,449 B2 | 6/2015 | Kumar et al. | |
| 2002/0143548 A1 | 10/2002 | Korall et al. | |
| 2005/0021838 A1 | 1/2005 | Levett | |
| 2005/0221264 A1 | 10/2005 | Hearn et al. | |
| 2006/0071775 A1 | 4/2006 | Otto et al. | |
| 2007/0046458 A1 | 3/2007 | Toyokawa et al. | |
| 2008/0041937 A1 | 2/2008 | Vawter | |
| 2008/0154612 A1 | 6/2008 | Evermann et al. | |
| 2008/0159271 A1 | 7/2008 | Kutt et al. | |
| 2008/0279133 A1 | 11/2008 | Bienfait et al. | |
| 2009/0003309 A1 | 1/2009 | Bawcutt et al. | |
| 2009/0005972 A1 | 1/2009 | De Koning | |
| 2009/0249432 A1 | 10/2009 | O'Sullivan et al. | |
| 2010/0009698 A1 | 1/2010 | Yang et al. | |
| 2010/0054526 A1 | 3/2010 | Eckles | |
| 2010/0070268 A1 | 3/2010 | Sung et al. | |
| 2011/0022642 A1 | 1/2011 | Demilo et al. | |
| 2011/0072154 A1 | 3/2011 | Bogdanovic et al. | |
| 2011/0093818 A1 | 4/2011 | Sathish | |
| 2011/0201356 A1 | 8/2011 | George et al. | |
| 2011/0202466 A1 | 8/2011 | Carter | |
| 2011/0205053 A1 | 8/2011 | Chen et al. | |
| 2011/0255680 A1 | 10/2011 | Vuong | |
| 2012/0034590 A1 | 2/2012 | Hallsten et al. | |
| 2012/0151380 A1 | 6/2012 | Bishop | |
| 2013/0040600 A1 | 2/2013 | Reitnour et al. | |
| 2013/0060568 A1 | 3/2013 | Russell et al. | |
| 2013/0073388 A1* | 3/2013 | Heath | G06Q 50/01 705/14.53 |
| 2013/0130207 A1 | 5/2013 | Russell et al. | |
| 2013/0196706 A1 | 8/2013 | Patel et al. | |
| 2013/0204972 A1 | 8/2013 | Russell et al. | |
| 2013/0204998 A1 | 8/2013 | Russell et al. | |
| 2014/0052676 A1 | 2/2014 | Wagner et al. | |
| 2014/0148210 A1 | 5/2014 | Kundu et al. | |
| 2014/0316779 A1 | 10/2014 | Russell et al. | |
| 2014/0316898 A1 | 10/2014 | Russell et al. | |
| 2015/0065149 A1 | 3/2015 | Russell et al. | |
| 2015/0105061 A1 | 4/2015 | Russell et al. | |
| 2015/0106167 A1 | 4/2015 | Russell et al. | |
| 2015/0113098 A1 | 4/2015 | Vanbuskirk et al. | |
| 2015/0213382 A1 | 7/2015 | Russell et al. | |
| 2015/0269869 A1 | 9/2015 | Russell et al. | |

OTHER PUBLICATIONS

"International Search Report PCT/2012/025984", Dec. 22, 2012, 9 pages.

Arbanowski, "I-Dentric Communications: Personalization, Ambient Awareness and Adaptability for Future Mobile Services", IEEE Communications Magazine, Sep. 2004, 7 pages.

Rao, "Geographic Routing without Location Information", 9th Annual International Conference on Mobile Computing and Networking, Sep. 2003, 13 pages.

* cited by examiner

Process
700

A SIGNAL IN A FIRST OBSERVATION PLATFORM IS RECEIVED FROM A FIRST COMMUNICATION DEVICE AT A SECOND COMMUNICATION DEVICE ASSOCIATED WITH A COMPUTER SYSTEM WHEREIN A FIRST CHARACTERISTIC OF THE SIGNAL CORRESPONDS TO AN AUDIBLE SOURCE AND A SECOND CHARACTERISTIC OF THE SIGNAL CORRESPONDS TO INFORMATION INDICATIVE OF A GEOGRAPHIC POSITION OF THE FIRST COMMUNICATION DEVICE, AND WHEREIN THE SECOND OBSERVATION PLATFORM IS ASSOCIATED WITH A RADIO RANGE
702

↓

A FIRST USER ASSOCIATED WITH THE FIRST COMMUNICATION DEVICE IS RECOGNIZED AT THE COMPUTER SYSTEM
704

↓

CONTEXT INFORMATION FOR THE SIGNAL IS DERIVED THE COMPUTER SYSTEM ASSOCIATED WITH THE SECOND COMMUNICATION DEVICE
706

↓

THE SIGNAL IS RELAYED FROM THE COMPUTER SYSTEM TO A SECOND COMPUTER SYSTEM ASSOCIATED WITH A SECOND OBSERVATION PLATFORM
708

↓

THE SIGNAL IS RELAYED TO A DESTINATION IN THE SECOND OBSERVATION PLATFORM VIA THE SECOND COMPUTER SYSTEM DERIVED FROM THE CONTEXT INFORMATION
710

Fig. 7

Process 1400

AT LEAST ONE SIGNAL OF A PLURALITY OF COMMUNICATION SIGNALS IS MONITORED VIA A COMPUTER SYSTEM BETWEEN A FIRST COMMUNICATION DEVICE AND A SECOND COMMUNICATION DEVICE WHEREIN A FIRST CHARACTERISTIC OF THE AT LEAST ONE SIGNAL CORRESPONDS TO AN AUDIBLE SOURCE AND A SECOND CHARACTERISTIC OF THE AT LEAST ONE SIGNAL CORRESPONDS TO INFORMATION INDICATIVE OF A GEOGRAPHIC POSITION OF THE FIRST COMMUNICATION DEVICE.
1402

A DETERMINATION IS MADE THAT A USER ASSOCIATED WITH THE FIRST COMMUNICATION DEVICE IS EXPERIENCING AN ISSUE WITH A FEATURE OF THE FIRST COMMUNICATION DEVICE.
1404

AN INVITATION FOR A TRAINING MODULE IS SENT FROM THE COMPUTER SYSTEM TO THE FIRST COMMUNICATION DEVICE, WHEREIN THE TRAINING MODULE IS FOR USE BY THE USER IN CONJUNCTION WITH THE FIRST COMMUNICATION DEVICE.
1406

THE TRAINING MODULE IS SENT TO THE FIRST COMMUNICATION DEVICE IN RESPONSE TO RECEIVING AN ACCEPTANCE OF THE INVITATION.
1408

Fig. 14

Process
1700

A FIRST COMMUNICATION IS PARSED WITH A COMPUTER SYSTEM ACCORDING TO A POLICY TO DETERMINE METADATA ASSOCIATED WITH THE FIRST COMMUNICATION, WHEREIN THE METADATA COMPRISES A FIRST SET OF ATTRIBUTES AND WHEREIN THE FIRST COMMUNICATION IS RECEIVED AT THE COMPUTER SYSTEM FROM A FIRST COMMUNICATION DEVICE.
1702

THE FIRST SET OF ATTRIBUTES IS COMPARED TO ATTRIBUTES OF A PLURALITY OF COMMUNICATION DEVICES ASSOCIATED WITH THE OBSERVATION PLATFORM, THE COMPARING PERFORMED BY THE COMPUTING SYSTEM.
1704

AT LEAST ONE RECIPIENT COMMUNICATION DEVICE IS IDENTIFIED FROM THE PLURALITY OF COMMUNICATION DEVICES FOR THE FIRST COMMUNICATION BASED ON THE COMPARING, THE IDENTIFYING PERFORMED BY THE COMPUTING SYSTEM.
1706

THE FIRST COMMUNICATION IS RELAYED TO THE AT LEAST ONE IDENTIFIED RECIPIENT COMMUNICATION DEVICE VIA THE COMPUTER SYSTEM.
1708

Fig. 17

USING STRUCTURED COMMUNICATIONS TO QUANTIFY SOCIAL SKILLS

RELATED APPLICATIONS

This application claims priority and is a continuation to the co-pending patent application Ser. No. 13/972,436, entitled "USING STRUCTURED COMMUNICATIONS TO QUANTIFY SOCIAL SKILLS," with filing date Aug. 21, 2013, and assigned to the assignee of the present invention, which is herein incorporated by reference in its entirety.

The application with Ser. No. 13/972,436 is a continuation-in-part application of and claims the benefit of the then co-pending patent application, Ser. No. 13/401,146, entitled "OBSERVATION PLATFORM FOR USING STRUCTURED COMMUNICATIONS," with filing date Feb. 21, 2012, which is herein incorporated by reference in its entirety.

The application with Ser. No. 13/401,146 claims priority to the then co-pending provisional patent application, Ser. No. 61/445,504, entitled "ENABLING A RETAIL SALES/SERVICE PROVIDER TO INTERACT WITH ON-PREMISE CUSTOMERS," with filing date Feb. 22, 2011, and assigned to the assignee of the present invention. The application with Ser. No. 13/401,146 incorporated the Provisional Patent Application 61/445,504 in its entirety by reference.

The application with Ser. No. 13/401,146 also claims priority to the provisional patent application, Ser. No. 61/487,432, entitled "ACTIVITY COORDINATING ASSOCIATE'S AUTOMATIC SERVICE ASSISTANT," with filing date May 18, 2011, and assigned to the assignee of the present invention. The application with Ser. No. 13/401,146 incorporated the Provisional Patent Application 61/487,432 in its entirety by reference.

The application with Ser. No. 13/972,436 is also a continuation-in-part application of and claims the benefit of the then co-pending patent application Ser. No. 13/665,527, entitled "OBSERVATION PLATFORM FOR PERFORMING STRUCTURED COMMUNICATIONS," with filing date Oct. 31, 2012, which is herein incorporated by reference in its entirety.

The application with Ser. No. 13/972,436 is also a continuation-in-part application of and claims the benefit of the then co-pending patent application Ser. No. 13/739,504, entitled "OBSERVATION PLATFORM FOR TRAINING, MONITORING, AND MINING STRUCTURED COMMUNICATIONS," with filing date Jan. 11, 2013, which is herein incorporated by reference in its entirety.

The application with Ser. No. 13/972,436 is also a continuation-in-part application of and claims the benefit of the then co-pending patent application Ser. No. 13/832,944, entitled "OBSERVATION PLATFORM FOR USING STRUCTURED COMMUNICATIONS WITH CLOUD COMPUTING," with filing date Mar. 15, 2013, which is herein incorporated by reference in its entirety.

The application with Ser. No. 13/972,436 is also a continuation-in-part application of and claims the benefit of the then co-pending patent application Ser. No. 13/833,572, entitled "MEDIATING A COMMUNICATION IN AN OBSERVATION PLATFORM," with filing date Mar. 15, 2013, which is herein incorporated by reference in its entirety.

BACKGROUND

Retailers are under constant pressure to cut costs, improve margins, improve customer service, increase floor traffic, and increase customer satisfaction. This has always been so, but the rise of the internet, available at home and while mobile, has increased the pressure greatly. Loyalty programs and per-customer pricing, such as special discounts, are one set of tools used in the past, and used more. Moreover, there is an increased demand to communicate efficiently with management, employees, customers and other associated with the retail environment. Such concerns also extend to situations and environments besides retail settings. Modern communication devices provide for many communication and business analytics opportunities in retail and other settings.

BRIEF DESCRIPTION OF THE DRAWINGS

FIG. 7 illustrates a flowchart of an example method for structuring communication in a plurality of observation platforms in accordance with embodiments of the present technology.

FIG. 14 illustrates a flowchart of an example method for monitoring communications in an observation platform in accordance with embodiments of the present technology.

FIG. 17 illustrates a flowchart of an example method for mediating a communication in an observation platform in accordance with embodiments of the present technology.

Figure 1A:
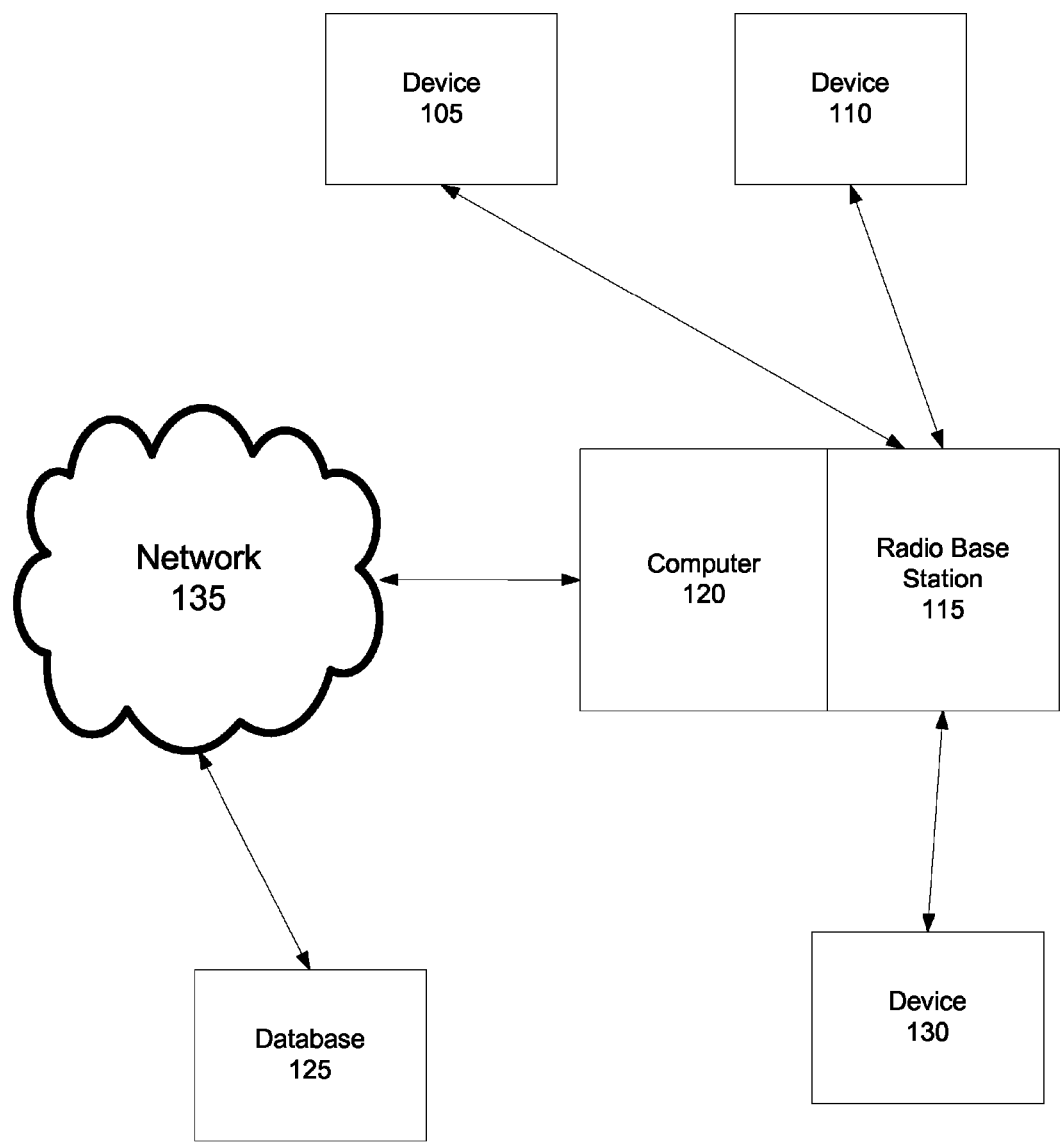
FIG. 1A illustrates a block diagram of an example environment for an observation platform for structuring a communication in accordance with embodiments of the present technology.

The drawings referred to in this description of embodiments should be understood as not being drawn to scale except if specifically noted.

DESCRIPTION OF EMBODIMENTS

Reference will now be made in detail to embodiments of the present technology, examples of which are illustrated in the accompanying drawings. While the technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following description of embodiments, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the present embodiments.

Unless specifically stated otherwise as apparent from the following discussions, it is appreciated that throughout the present description of embodiments, discussions utilizing terms such as "receiving," "intercepting," "measuring," "recognizing," "deriving," "storing," "relaying," "executing," "generating," "determining," "tracking," "recording," "identifying," "making," "sending," "tracking," "monitoring," "mining," or the like, refer to the actions and processes of a computer system, or similar electronic computing device. The computer system or similar electronic computing device, such as a telephone, smartphone, smartphone in conjunction with a Bluetooth peripheral, or handheld mobile device, manipulates and transforms data represented as physical (electronic) quantities within the computer system's registers and memories into other data similarly represented as physical quantities within the computer system memories or registers or other such information storage, transmission, or display devices. Embodiments of the present technology are also well suited to the use of other computer systems such as, for example, optical and mechanical computers.

Overview of Using Structured Communications to Measure and Quantify Sociability Skills Embodiments of the present technology are for using structured communications to measure and quantify sociability skills. This may be accomplished using an observation platform that may involve a number of users, people or other computer systems and provides structured and disciplined communications for the users using devices and captures data regarding the communications and devices such as performance metrics and Primary Statistics. The present technology may be employed in various environments such as retail settings, public-stage floors, outdoor venues, concerts, police scenarios, disaster areas, schools, sporting events, hospitality operations, security operations, military operations, a prison organization, customer service, manufacturing organization, a factory, and other environments where humans work together and where communications occur between users and or computer systems.

Employees typically establish or have an informal social network made up of other teammates who can share talents and/or enthusiasm, provide needed help and/or answer questions, or assist when trying to solve problems. The social network found in retail stores is often dynamic due to the constant inflow and outflow of employees, is inherently self-organizing and is typically not company implemented, and is typically difficult to document, measure, or quantify. As a retail store's social network matures and evolves, certain employees often emerge as influential or "go to people" who can be counted on when someone, such as an employee or a customer, needs help or a task needs to be done. Having these "go-to" people on a shift can make or break a stores performance, thus making these people valuable to an enterprise. Other employees take up roles such as "teachers" or "mentors," "task-doers" or "helpers" for the go-to people.

An employee's past work experience alone is not the leading indicator of whether or not the employee is influential or a "go-to" person in the particular retail setting. To achieve this informal status, the employee not only needs to be viewed as having the knowledge that others need, but they also need to have other factors such as being approachable, being positive in attitude and actions, and/or socially available and responsive for customers and employees to engage with them. These other factors may be described as sociability factors, sociability potential, or social skills. Managers in the retail setting may be able to determine or measure the employee's experience through their length of service or subject expertise, but when it comes to the sociability factors or social skills, managers have few tools with which to measure, quantify or evaluate and compare an employee's effectiveness other than subjective anecdotal or gut feelings. Consequently, when managers are transferred or quit, this learned anecdotal knowledge often leaves with them and an incoming manager has to learn the behavioral patterns from scratch. It is also challenging to measure sociability factors in prospective employees during the new hire process and probationary period.

The present technology operates by using an observation platform, devices and structured communications from which to gather or collect Primary Statistics that may be used to generate Secondary Statistics. The Primary Statistics and Secondary Statistics are utilized as a part of an assessment of the sociability factors, social skills, or sociability potential, of a user in the observation platform. The assessment may be used by a manager, others, or computer systems to make decisions for combining groups into teams or for the obtaining of other goals. The present technology may be to run continuous assessments of people skills, including the dependency on context, and then to use the assessments to guide planning, discover causes, provide training, and make the management task more effective. The present technology introduces the concept of quantifiable 'Sociability Scoring,' and the profit-making potential of employing measured sociability scores to the training, deployment, alignment, assessment and management of store personal. It should be appreciated that the present technology may extend to other environments besides a retail setting wherever it is useful to organize humans into groups depending on their social skills. Sociability scores may also be described as social engagement quotient and are quantified metrics, which may convey the ability and willingness of a person to communicate, educate, and engage with others.

The present technology uses the observation platform to intercept a communication from a first device at a computer system and relay the communication to a second device or second computer system where the first computer system determines the relayed destination by deriving context information from the communication and/or stored data relevant to the communication. The first computer system measures or collects Primary Statistics related to the devices, the communication and the computer systems. The Primary Statistics can be then used to generate Secondary Statistics to generate or create an assessment of a user associated with the device. The primary and Secondary Statistics and assessment are the quantified social score of the user. The assessment is then made available to a manager, others or a computer system for use in creating groups or teams or assessing an employee's capabilities, performance or alignment with the company's goals. For example, the manager may create a work schedule of employees using the assessment to ensure that a "go-to" person is scheduled for each shift. Thus the present technology may be used to measure or quantify sociability scores of employees and make that information available for managers, others or a computer system to use in making decisions.

Definitions

Sociability Score: Quantified metrics that conveys the ability and willingness of a person to communicate, educate, or engage with others. May also be referred to as Social Engagement Quotient (SEQ), Social Quotient (SQ), social skills, people skills, social factors, or social potential.

Primary Statistics: Those numerical observations that can be obtained by the observation platform from direct use of any and all of its communication-mediating, location-sensing powers and context information gathering. The primary statistical data may include, but not limited to such directly measurable quantities such as: engaged or available time(s), locations, locations traversed including speed and direction, listen time, talk time, number of listeners, geographic location of the speakers and listeners, type of communication (e.g., broadcast, private conversations, interruptions, group conversations, announcements, interrupting announcements, mandatory response messages), length of the communication session, initiator of communications, receiver of communications, presence information, keywords spoken or listened to, tone of voice, speech cadence, banter rate, emotion and inflection (as measured by voice stress analysis tools), lengths of speech segments, what policies are used for the communications, when and where two or more individuals dwell in close proximity to each other or to specific locations, the speed of movement and pausing of the listening individuals during/after talking or listening, the frequency that listeners delay hearing a message or drop out from what a speaker is saying, and/or promptness of responses to what was heard, Inertial Measurement Unit (IMU) data, radio signal strength (RSS), signal to noise ratio (SINR), measurements from accelerometer, and (X,Y,Z) location coordinates. Note that many of these items are fundamentally statistical. These items may also be referred to as first order data and metrics, primary observation, primary metrics, or primary characteristics.

Secondary Statistics: Those numbers generated through the application of inference rules or combinatorial rules from the Primary Statistics. These items may also be referred to as second order data and metrics, secondary observations, secondary metrics, or secondary characteristics. Contextual information may be derived from Secondary Statistics may be used for determination of message flow and therefore be part of the overall metadata referred to below.

Big data techniques: big data techniques.

Social graphs: Presentations of data or visual representations showing numerical or causal inter-relationships, i.e., lines of varying density connecting names to indicate the intensity of communications or strengths of relationships, interactions or engagements.

Inference rule: A specific algorithmic procedure for processing a specified set of input data to produce a specified set of output data. At the simplest, the procedure may be to construct a weighted sum of the inputs to produce a single output number. May also be referred to as combinatorial rule.

Higher-order statistic: Those numbers generated through the application of Inference rules or combinatorial rules from the Primary Statistics or Secondary Statistics. May also be referred to as higher-order observation or higher-order metrics.

Store performance data: Goals and results, expressed as metrics or numbers, that comprise both a specification of what is important in targeted performance and that also contain historical data which can be useful in learning about what seems to matter, either through human insight or intuition, or through machine-learning via an algorithmic procedure. May also be referred to as outcome data or desired objectives.

Validated: Inference rules that have been proved to have a useful and meaningful correlation to desired objectives by comparing the higher order statistics that they generate to those objectives. Also, those inference rules where the strength of the weights or the size of the other numerical values in the rule are adjusted to optimize the observed correlation. May also be referred to as verified.

External statistics: Those numerical observations that are useful in generating Secondary Statistics or higher-order statistics but that come from outside the scope of the observation platform. One example is the gross sales receipts from a cash register which might be tied statistically to circumstances visible to the observation platform via an observed basket identification. A second example would be some measurement of shopper locations by an external smartphone application. May also be referred to as external observations.

Modeling: Using either the verified or tuned Inference rules or the employee and team behavioral metrics as inputs to a business model in order to calculate a modeled result corresponding to the desired objectives. May also be referred to as forecasting.

Human-generated hypothesis: Inference rules guessed by 'common-sense' or expert opinion, possibly followed by a tuning step using comparison with historical data. May also be referred to as expert-generated hypothesis or expert-generated relationship Machine-generated inference rule: Inference rules generated at least in part by an algorithmic procedure, and then tuned to validate and optimize the observed correlation to objectives. May also be referred to as machine-generated hypothesis or machine-generated relationship.

Overview of an Observation Platform

The present technology employs an observation platform for structured communications and for gathering or collecting Primary Statistics. The following overview describes how an observation platform is used for communications between devices and computer systems and is used for collecting Primary Statistics from devices, communications and computer systems. Individual details, embodiments, and components of the observation platform described herein may or may not be used for embodiments pertaining to using observation platform to measure and quantify social skills.

Using structured communications in an observation platform, as referred to herein, may refer to the following actions regarding communications between two or more users or one user and one or more computer systems: mediating, disciplining, structuring, controlling, participating, discouraging, encouraging, influencing, nudging, making an example of, permitting, managing, managing to be in compliance with policies, measuring what goes on as a communication occurs, characterizing, enabling, observing, recording, correcting, directing, etc.

The mediating, structuring or disciplining process envisioned herein involves using a communications and computer system as a platform to receive communications from users, devices and computer systems, to generate or parse metadata related to the communication, and to relay the communication based on the metadata. Communications are enabled by multiple means including: simply speaking names, questions or commands; press-to-talk broadcasting to everyone, groups or locations; listening to pre-established information (e.g., podcasts or info-casts), moving into locations where information is presented or requested, information from other users on the system, or information from other systems or processes within this system related to actions required or information necessary. The system, including other users, may prompt users for verbal contributions to the data store or seek selected button presses to determine further context or supplemental information and actions of the user. In conjunction with the communications and signaling information being exchanged, the system collects other relevant data which may include signals or sounds useful for location determination, sounds useful for system optimization or user environment detection, or other signal information (audible or visual) relevant to operating in the desired coverage space.

One purpose of structuring or disciplining a communication is for associates to become more productive and more effective customer service associates or sales people in a retail setting. The present technology may accomplish this goal by monitoring communications of the users that occur via communication devices. The communications may be monitored to derive context information from the communication such as the name of the user, geographic location of a user, the state or status of the user (e.g., busy, available, engaged, conversing, listening, out-of-range, not logged on, etc.), business metrics regarding the user's interaction with others, and commands from the user. The communications may be monitored by a computer system associated with a radio base station that acts as a central hub for the user communications. The computer system may convert audible, voice or speech communications to a text or machine-compatible format using standard and well-known techniques. The text may be used to derive the context information from the communication. The computer system may also store some or all of the communication including the time and geographic location of the device, the audible portion of the communication and the text format of the communication. The structured communications may extend beyond a single venue to multiple venues or storage locations without regard to geographic location. Customers or users may refer to customers who are purchasing items in an environment, past customers, potential customers, perspective customers, shoppers, browsers, or others who enter the environment and do not represent the environment in an official capacity such as an employee does.

In one embodiment, the computer system generates or parses metadata related to a communication and also knows metadata for each of a plurality of devices in the observation platform. The computer system is then able to match an attribute of the metadata from the communication to an attribute from the metadata of at least one of the plurality of devices in the observation platform. The communication may then be forwarded to the matched device. The metadata may be described as attributes, tags, or characteristics of a communication. The communication may be a signal generated by user device and may comprise speech, text, audio, video, or a combination thereof. The attributes of the metadata may not be associated with the content of the signal and are related to context of the signal such as the time the signal was sent, an identification of the device that sent the signal, a location of the device when the signal sent, a geographic zone the device is located in, history of the device sending communication, etc. In one embodiment, the metadata is associated with the content of the signal, such as text. The generating of metadata and relaying of the communication may occur substantially in real time such that a user of the device does not perceive any delay in communications.

In one embodiment, the computer system uses the derived context information to determine a destination of the communication and forwards or relays the communication to the destination. For example, a first user may attempt to contact a second user via communication devices. The first user sends the communication to the computer system associated with the radio base station. The computer system recognizes the first user and is able to derive context information regarding the communication and determine that the communication's destination is a third user. The computer system then relays the communication, via the radio base station, to a communication device associated with the third user. The computer system may also convert the communication to text and derive contextual or performance metrics regarding the first or third user. For example, the first user may be an associate in a retail setting and the third user is a customer. The first user may be responding to a query made by the third user. The performance metric may be the length of time it took for the first user to respond to the query or may be whether or not the query was satisfied or may be a different metric entirely. The computer system may derive and store more than one performance metric. The computer system may also access more than one communication regarding a user to determine some metrics.

In one embodiment, the computer system uses the derived context information to determine a destination of the communication and forwards or relays the initial communication to the destination. For example, a first user may attempt to contact a second user via communication devices. The first user sends the communication to the computer system associated with the radio base station. The computer system recognizes the first user and is able to derive context information regarding the communication and determine that the communication's destination is a third user or plurality of users. The computer system then relays the communication, via the radio base station, to a communication device associated with the third user or said plurality of users. The computer system may then instruct the device of the first user to communicate directly with the device(s) of the third or plurality of users for the duration of the conversation. The computer system will continue to observe the communications and will continue to derive contextual and performance information from all connected devices. Additionally, the computer may instruct direct communications between a plurality of devices depending on context and other meta-information.

In one embodiment, the computer system is able to determine the state of the user based on either direct user action such as a button press or voice command; or based on inference from words being spoken, motions, locations or other contextual information. In one embodiment, the third user may be out of range of the radio base station and sends communications via a network associated with the computer system. In one embodiment, the third user may be part of a similar operation to that in FIG. 1A, i.e., another retail outlet or corporate headquarters for the same company in a different location as shown in FIG. 1C.

In one embodiment, the first computer system that receives the signal does not perform all of the functions of the present technology, but instead relies on cloud computing to perform some of the functions. For example, the first computer system may receive the signal and then forward it to a second computer system. The second computer system may then derive context information from the signal and determine a destination for the signal. The destination may be one or more communication devices that may or may not be within radio range of the radio base station associated with the computer system. The context information and destination may then be sent to the first computer system. The second computer system may also store data associated with the observation platform such as signal logs, the signals themselves, or speech-to-text conversions of the signals. In one embodiment, the second computer system is not physically proximate to the first computer system but is connected via a network. In one embodiment, the second computer system is a plurality of computer systems that may be a peer-to-peer network, a server farm, computers used for cloud computing, or a combination thereof.

In one embodiment, the computer system is able to determine geographic locations of users based on information received from devices associated with the users. The geographic location data may be stored as data associated with a user's communications device at a particular time, or as a performance metric, or may be combined with other information to generate a performance metric. The geographic information may also be used by managers or others to mentor or train associates or others to optimize customer service.

A user, as referred to herein, may be a person or people such as, associates, employees, managers, trainees, trainers, customers, suppliers, vendors, emergency responders, personnel, etc. In one embodiment, the user interfaces with a device for communications with other users. Such a device may be a handheld device, a wearable device, a headset, a smartphone, an earpiece, a radio, a computer system, or other device capable of providing communications between users. Such users may be external to the operating entity and desire access via smart devices or applications.

A performance metric may also be a metric, a key performance indicator (KPI) or a business metric. A metric or performance metric as referred to herein may be any type of data associated with or derived from a communication between users, including the location of the communications device, buttons pressed, or the words spoken and the contextual state at the time of a particular communication event. In one embodiment, the computer system is able to generate a visual representation of metrics. For example, the visual representation may be a map of the geographic location of the users in an environment or may visually demonstrate the status or activities of a user. In another example, the visual representation may be textual information such as the number of communications sent by a user or the length of time it took for a user to respond to a communication or move to a specific location. The performance metrics may be sent or displayed to a manager or other user for use in making decisions. The performance metrics may be used by the manager, others, or a computer system to optimize customer service in a retail setting by taking actions such as reprimanding or rewarding an associate or measuring who responds and the time it takes to open a new register based on a request from a person or other input signal to the system. Performance metrics may also generate real-time alarms or notifications that action or coordination is needed.

The present technology provides for many examples of how structuring communications may be used in various environments for a variety of purposes. The following discussion will demonstrate various hardware, software, and firmware components that are used with and in computer systems and other user devices for structuring communications using various embodiments of the present technology. Furthermore, the systems, platforms, and methods may include some, all, or none of the hardware, software, and firmware components discussed below.

Using Structured Communications to Quantify Social Skills

With reference now to FIG. 1A, a block diagram of an environment 100 for training, monitoring, and mining communications in an observation platform. Environment 100 includes devices 105, 110 and 130, radio base station 115, computer 120, database 125 and network 135. Environment 100 comprises components that may or may not be used with different embodiments of the present technology and should not be construed to limit the present technology. Some or all of the components of environment 100 may be described as an observation platform for structuring a communication.

The present technology makes use of communication devices. Radio base station 115 and devices 105, 110 and 130 may also be described as communication devices. Devices 105, 110 and 130 may be user devices that are mobile and employed by a user to communicate with other users via other devices. Communications between the devices may be described as signals. A communication may be sent using a single signal or a plurality of signals. For example, a first signal of the communication may pertain to an audible source and a second signal pertains to information indicative of geographic information. The first and second signal may be related to one another as part of the same overall communication, or the signals may not be inherently related to one another. The devices 105, 110 and 130 may be a smartphone, a personal digital assistant, a fob, a handheld device, a headset device or other small electronic device. In one embodiment, devices 105, 110 and 130 employ speakers and microphones with control buttons for audible communications and/or LEDs or screens for visual information. The control buttons may be pressed as signal buttons, push to talk buttons, volume control buttons, and power on/off buttons or other standard buttons and may be options on a touchscreen. Devices 105, 110 and 130 may be handheld, may be worn around the neck, and may be a headset worn on the head or behind the ear or otherwise interfaced with the human body. Devices 105, 110 and 130 may or may not comprise a screen or display such as a liquid crystal display (LCD). In one embodiment, devices 105, 110 and 130 do not comprise a display such that a user is not inundated with too many options or too much information from the device. A user device without a display may simplify communications and thus allow heads-up awareness and presence in the environment. Another user, such as a customer or vendor/supplier, may be more likely to employ the device for its intended purpose if the human interface is simplified.

Devices 105, 110 and 130 and other devices in environment 100 may be dispensed to a user upon entering environment 100 or may be brought by the user into environment 100. For example, in a retail setting, associates may be issued devices by the employer or owner of the retailer setting. Customers in the retail setting may also be offered or issued devices as they enter or traverse the retail setting. Customers may choose whether or not to accept the device or whether or not to use the device after accepting it. The associate devices and the customer devices may or may not be the same type or model of devices. Alternatively, the customer may bring a device into the retail setting such as a smartphone. An application on the customer's smartphone will allow the customer to use the device for communications in the store with associates or others in accordance with present technology. The customer may remain anonymous or may elect to identify themselves. In one embodiment, recognition of the customer's identity is not required for additional services or offers.

Devices 105, 110 and 130 may be low power devices. The devices may use batteries or solar power including either ambient or battery solar power in a low duty-cycle manner to save power. In one embodiment, the devices have an automatic sleep function when location of the device does not change and no communications are sent or received after a period of time.

Radio base station 115 may be a communication device that is capable of communicating with devices 105, 110 and 130. Radio base station may simply be a component of computer 120 or may be a standalone device that is coupled with, connect to, or otherwise associated with computer 120. Radio base station 115 and computer 120 may be physically adjacent to one another or may be separated by a distance (e.g., cloud services). Computer 120 is able to receive communications from radio base station 115 and to send communications to radio base station 115 for radio base station 115 to transmit the communication to its destination. Computer 120 is a computer system with a process and memory and is capable of executing commands, software and firmware. Computer 120 may be a desktop computer, a server computer, a cloud-based computer or other standard computing system or may be custom built for the present technology.

Radio base station 115 and devices 105, 110 and 130 employ standard techniques for communicating wirelessly. The communications may be performed using radio techniques such as near field communications, short wave radio, infrared, Bluetooth, Wi-Fi, standard wireless computer network protocols, etc. Devices 105, 110 and 130 may be able to communicate with each other directly or through radio base station 115. Devices 105, 110 and 130 communicate with each other under the control of the computer system 120. In one embodiment, all communications in environment 100 are relayed through radio base station 115 which acts as a central hub. For example, device 105 may communicate with device 110 by device 105 sending a communication to radio base station 115, computer 120 derives that device 110 is the destination for the communication and relays the communication to device 110. This may occur automatically and quickly enough such that the users will not experience any undue lag in communications. In one embodiment, devices 105, 110 and 130 may communicate directly with computer 120. For example, a user may issue a command to computer 120 via device 105 or computer 120 may send information to device 105. Information sent from computer 120 to device 105 may be an audible voice signal or may be textual, contextual, geographical or graphical data to be displayed at device 105, if it is properly equipped to do so.

In one embodiment, devices 105, 110 and 130 may communicate with one another directly, and their signals may be monitored and processed by computer system 120 via a monitoring system associated with the radio base station 115. Instructions or commands may still be directed towards the computer system 120.

In one embodiment, computer 120 is able to recognize a user sending a communication. The user may be recognized based on the device used to send the communication to computer 120 and radio base station 115. For example, device 105 may have a unique signature associated with its transmissions such that computer 120 can identify differentiate the device from another user. Such recognition of a user may then be employed by computer 120 for future communications with other devices. In one embodiment, the signal or communications between devices are encrypted. The signal may be encoded such that it is unique to a specific device. The encryption or encoding may be employed by computer 120 to recognize the user of the device. In one embodiment, the user may identify himself to the computer system 120 and the computer system 120 makes the association between user identification and device 105's internal electronic identification.

Computer 120 may determine that the destination of a communication is a single device or a plurality of devices. Thus computer 120 may relay a communication from device 105 only to device 110 or may relay it to both device 110 and device 130. Computer 120 may determine that another user device is the destination of a communication originated by device 105 but may also directly respond to the communication by executing a command or sending a communication back to device 105. In one embodiment, a communication from device 105 has more than one characteristic or aspect. For example, the communication may have a first characteristic that corresponds to an audible source such the words spoken by a user employing device 105. The communication may also contain contextual information such as engaged, available, listening to information, communicating in a conversation, out-of-range, returning to coverage zones, or other behavioral/contextual information. The communication may also have a third characteristic that comprises geographical position information of device 105 or may have information indicative of a geographic position of device 105. Computer 120 is able to determine a geographic position and direction of motion of a device from the information indicative of a geographic position of device. The motion may also be described as path of travel. A characteristic of the communication may be a portion of the communication, data associated with the communication, attributes of the communication, or metadata regarding the communication.

In one embodiment, computer 120 comprises a storage medium for storing some or all of a communication. Computer 120 may store all communications between devices in environment 100. Computer 120 may store communications for a pre-determined amount of time or based on other characteristics such as user, location or types of communications. Different characteristics of the communication may be stored including portions of the communication itself. Additionally, the computer may request and store all audible information regardless if the user presses a push to talk button or otherwise signals the need to begin a communication. For example, the communication may comprise an audible portion, a text portion, information indicative of a geographical position, and a geographical data portion. The audible portion may also be converted to text. Computer 120 may store all or some of the different portions including the portion converted to text. Computer 120 may store geographic position information regarding a device over a period of time such that a path of travel or speed/direction of the user may be inferred. Thus the position and context of a user may be mapped, tracked or predicted through a physical environment or area.

In one embodiment, computer 120 receives a communication from a device with a portion of the communication that corresponds to spoken words of the user of the device. Computer 120 is able to convert the spoken words portion to information used by computer 120 to derive context information from the communication to determine performance metrics regarding the communication or the user of the device. The resulting information may also be interpreted as a command for computer 120 to execute. The resulting information may also be employed to determine a destination for the communication or to trigger an automated response from the system using stored or external information.

In one embodiment, each speaker is identified with a unique identifier with each voice file so that a speech recognition engine can train on the speaker's voice and more accurately choose words from the dictionaries and individual user grammars. Individually customized dictionaries and grammars may be used for the sequential context of the spoken words. For example, saying, "urgent Bob" is interpreted by looking up the first word in a command dictionary and the second word in a names or places dictionary. In one embodiment, a frequency table is built for each user defining how frequently they call a name or place to improve the probability of selecting the correct word. In one embodiment, if a command, name, or place is not understood, the system may default to the most likely destination group. The user can easily opt out of the default destination and start again. Alternatively, if the command, name or place is not recognized, the computer system 120 may be programmed to default to a simple reply such as "please say again" or "person not found."

In one embodiment, computer 120 executes a command received from device 105. The command may be directly received from device 105 or may be received in an audible voice signal which is converted to text and then interpreted to be a command for computer 120. The command may be to initiate a virtual voice connection between device 105 and device 110. The command may be to initiate a connection to a telephony system such that a user of device 105 may communicate with another user who is employing a telephone for communication. The command may be for computer 120 to store information into or extract information out of database 125.

In one embodiment, computer 120 is able to access database 125 over network 135. Network 135 may be a local area network, a wireless network, the Internet or another computer network. In one embodiment, database 125 is a component part of computer 120 and network 135 is not required for computer 120 to access database 125. Database 125 may comprise an inventory of product or any other type of information. For example, in a retail setting a customer may use a device to communicate with an associate regarding whether the retail setting has a particular product in stock or where the product is located. The associate may use key terms to query computer 120 regarding whether the product is in stock. Computer 120 may convert the associate's voice to text and recognize the command regarding whether the product is in stock. Computer 120 then queries database 125 and sends a response back to the associate and/or customer. The response may be sent back using an audible signal or a signal to be displayed on a screen at the user device. Similar examples may be constructed around product location databases, workforce scheduling systems, on-floor zone assignments, time clock systems, door counter systems, video surveillance systems, data aggregation systems or other information systems used for operations and reporting. Alternatively, computer 120 may recognize a command based on the converted text without a user saying key terms.

Computer 120 and any ancillary programs may detect audio characteristics such as "too much background noise", "speaking too loudly" (over-modulation), "speaking too softly" (under-modulation), "speaking to quickly" or "excessive pausing." The computer may then issue an audible prompt to the user to correct the situation for improved recognition of spoken words. Systematically monitoring the each individual user (not device) and scripted prompts allows the computer to better learn the user characteristics while at the same time allows the user to modify behavior and speech to better communicate with the system.

Database 125 may be a local inventory or a larger inventory. In one embodiment, database 125 is not an inventory but comprises different data. For example, a user may employ the device to communicate with and command computer 120 to perform a keyword search of the Internet using a search engine such as a website search engine.

In one embodiment, computer 120 is able to measure or collect Primary Statistics related to a communication or a plurality of communications between devices 105, 110 and 130. The Primary Statistics may be data that is user generated or is simply context information related to the communication. For example, the Primary Statistics may include, but not limited to such directly measurable quantities such as: engaged or available time(s), locations, locations traversed including speed and direction, listen time, talk time, number of listeners, geographic location of the speakers and listeners, type of communication (e.g., broadcast, private conversations, interruptions, group conversations, announcements, interrupting announcements, mandatory response messages), length of the communication session, initiator of communications, receiver of communications, presence information, keywords spoken or listened to, tone of voice, speech cadence, banter rate, emotion and inflection (as measured by voice stress analysis tools), lengths of speech segments, what policies are used for the communications, when and where two or more individuals dwell in close proximity to each other or to specific locations, the speed of movement and pausing of the listening individuals during/after talking or listening, the frequency that listeners delay hearing a message or drop out from what a speaker is saying, and/or promptness of responses to what was heard, Inertial Measurement Unit (IMU) data, radio signal strength (RSS), signal to noise ratio (SINR), measurements from accelerometer, and (X,Y,Z) location coordinates.

Engagement or engagement time refers to the ability for associates indicate to the system that they are engaged and unavailable to receive or initiate regular communications. Engaged users can be accessed through interrupt user capabilities or via other sounds or prompts heard in the ear or indicated on the device. Thus an engaged user is preempted from receiving a regular communication. Location maps refer to a map that shows geographic positions of where a user has been located over a period of time or for a given instance. Talk time refers to how long the speech of a communication lasted. Listen time refers to the amount of time the ear is listening to information, messages or to other speakers. Geographic location of device may refer to where an employee spends time, assigned location of an employee, percentage of time employee spends in assigned location, percentage of time employee spends in customer engagement areas, proximity of one employee to other employees. Motion, speed and motion vector refer the way a user moves, changes direction, stops and dwells across the observation platform environment. Presence information refers to the availability, status, or status indicator of a user such as how long the communication device associated with the user was turned on and available for communications. Presence information may be similar to presence information used track the presence of a user in Instant Messaging. Keywords may be keywords that are identified via computer 120 using speech recognition techniques for the audible portion of the communication. Emotion and approachability may be obtained by measuring stress in the audible speech, measuring pitch or changes in pitch, inflection, cadence and/or loudness and, the duration of the speech in the audible portion. A speech profile may be created for a given user and then changes in pitch and speed relative to the profile may be used to make determinations related to tone and emotion. Third party voice stress analysis (VSA) software may gather and generate additional context for making determinations quantitatively. Policies may refer to policy 114 of FIG. 1D.

In one embodiment, computer 120 employs one or more of the Primary Statistics to generate or create Secondary Statistics. The generation of Secondary Statistics may also be described as analyzing or synthesizing. The analyses of the primary and Secondary Statistics are able to quantify sociability potential or social skills of the users who are utilizing the observation platform. The Secondary Statistics may be generated based on an inference rule. The inference rule may be a specific algorithmic procedure for taking specified data from the Primary Statistics and outputting a specific secondary statistic. The procedure may be to construct a weighted sum of the inputs to produce a single output number. More complex algorithmic procedures may produce several output numbers by multiple weighted combinations, and may include use of thresholds to produce 'True/False' a.k.a '0/1' Boolean values or other numerical relations from linear or non-linear operations.

An inference rule may be changed or tuned during the course of using the present technology. For example, during a shift in a retail environment, a manager or others may tune an inference rule to change the Secondary Statistics that are generated. The Secondary Statistics may refer to a variety of skills or behaviors that are quantified based on the Primary Statistics. Having more data means that it possible to implement conditional probability that will lead to more accurate predictions with less uncertainty.

For example, it is known that the functioning of the basic neural system, including the human brain, can be modeled by a statistical network that employs evolved heuristics. The engineering science of 'neural networks', which is one of many models for the extraction of machine intelligence from input data, is inspired by this fact. In this model, the inputs to the system are a set of observations, possibly changing over time, where often the inputs may be 'unreliable.' From these "Primary Statistics," a neural network (or other machine learning including Bayesian Networks, generates an abstracted set of metrics. The abstracted metrics are machine derived: this is to say, the outputs are driven by the set of inputs. Therefore, these abstracted set of metrics, though being of higher order are also a set of statistics.

The Secondary Statistics are metrics that are derived from the more primitive, primary observations, and in the sense that they remain statistics. So, the terms 'primary statistic' and 'secondary statistic' in no way imply a relation of greater or lesser importance or a feeling of undependability. These terms instead accurately describe the reality of the world and the sense of drawing more sophistication from primary data, just as primary school is followed by the higher secondary education.

The Secondary Statistics are also used to create an assessment of the user. For example, the assessment may demonstrate that a user is a go-to person, a team player, a task-doer, a leader, a teacher, a director, etc. For example, a dimension of appropriate-customer-oriented-extroversion ('greeters') is measured by the frequency of customer interactions, the length of these interactions, motion or dwell time with customers, evidence of a pleasant tone and use of appropriate words and keywords. A separate dimension of domain-specific-communication-clarity is measured by the frequency of staff interactions within appropriate locations and that communications grading modified (on at least a sampled basis) by word cloud mapping of the words used to an appropriate set. As a third example, the assessment of a manager ("directors") may have different components and different weights than those of a greeter, for example. Each of these dimensions are separate from other skills. Additionally, different shifts in different stores may require different mixes of employees. The management would not want all greeters, all teachers, or all directors on the floor at the same time. The ability to measure many data points and to combine these using weights, simple algorithms or sophisticated algorithms into a composite metric is valuable and new.

The Tables below shows examples of types of sociability potentials or skills. The tables demonstrate examples of skill types such as amiable, helper, manager, expert, and loner. Each weight may be represented by numerical values typically in a range such as 0-5, 0-10, or 0-100:

| Skill Type: Amiable | Weight |
| --- | --- |
| Location | + balanced mix of dwell time and motion time where shoppers congregate<br>+ high degree of motion with shoppers<br>+ moves with deliberation and brisk pace<br>− spends time in backroom locations and/or break room locations<br>− slow pace and wandering motions in isolated locations |
| Contacts | + broad range of contact, frequent initiation, frequent concise messages<br>+ balanced mix of 1:1 conversations, one-to-group conversations, store-wide or chain-wide announcements<br>+ high degree of listener attention (listeners listen in real time, do not truncate or delay messages)<br>+ tendency to respond promptly in group conversations<br>− contacts to narrow group, longer contact<br>− listeners delay or delete messages without listening to them<br>− group members frequently drop out of conversations<br>− frequent occurrences of voice stress especially when in group conversations or when adjacent to many other associates or other users |
| Adjacencies | + frequently and briefly found in same vicinity with many<br>+ moves with others at a brisk pace<br>+ tendency to be found adjacent to a wide variety of other associates<br>− tendency to be found adjacent to only a few of the same associates. |

| Skill Type: Helper | Weight |
| --- | --- |
| Location | + tendency to be on the floor and frequently near others for brief periods of time<br>− often found in isolated places or group gathering places |
| Contacts | + broad contact, respond more than initiate, longer session<br>+ tendency to respond (via voice or motion) quickly to task messages (e.g., a location task message or a register backup assistance needed message)<br>+ tendency to quickly respond verbally to messages containing task-oriented keywords<br>− contacts to narrow group<br>− frequent occurrences of excessive voice stress |
| Adjacencies | + often get a call (contact or message), then move adjacent to another associate<br>− few adjacencies |

| Skill Type: Manager | Weight |
| --- | --- |
| Location | + tendency to be where shoppers congregate<br>+ tendency to be "engaged" in high margin areas of the store<br>+ low dwell time at any location+ frequently moves across multiple department boundaries<br>+ listeners of 1:1 brief messages frequently move with urgency and clear direction after a conversation<br>− frequently stationary in office or break room<br>− spends excessive time in low traffic areas of the store |
| Contacts | + frequent use of 'Directive or Assignment' Policies<br>+ shows active participation in group conversations (speaks frequently, others respond promptly)<br>+ high degree of listener attention (listeners listen in real time, do not truncate or delay messages)<br>+ brief 1:1 messages to a large number of associates<br>+ frequent announcements to whole store<br>+ frequent messages left for associates not yet identified by the system<br>+ audible stream contains directive keywords<br>− long periods of silence<br>− lengthy 1:1 conversations with a small set of associates<br>− frequent 1:1 conversations to a few individuals not in supervisory roles<br>− infrequent announcements<br>− listeners delay or delete messages without listening to them |
| Adjacencies | + high degree of motion throughout the store (high aisles per hour metric) that pause briefly near other associates<br>+ low dwell times with other associates<br>+ frequently with other associates while also "engaged" (mentoring behavior)<br>− tends to single locations |

| Skill Type: Expert | Weight |
| --- | --- |
| Location | + tends to stay in single 'expert' location or department (as defined in job)<br>+ moves quickly and deliberately when out of department<br>+ moves to all areas in the department<br>+ often traverses to a customer service desk or customer help desk<br>− other associates do not tend to move toward this person<br>− does not participate (low talk and listen times) in group conversations. |
| Contacts | + frequent respond to 'Subject', 'Expert' or 'Help' type Policies<br>+<br>− few associates initiate conversations with this person<br>− most conversations are short<br>− few 1:1 conversations longer than 0:30 min<br>− seldom contributes to group conversations |
| Adjacencies | + frequent in one or few vicinities with many adjacent associates<br>+ frequently with other associates while also "engaged" with shoppers (mentoring behavior)<br>+ other associates tend to move toward this associate to form brief adjacencies |

| Skill Type: Loner | Weight |
|---|---|
| Location | + remains mostly in operations locations and break rooms |
| | + moves slowly in less busy areas of the store |
| | + does not tend to move towards where shoppers congregate |
| | − tendency to dwell near other associates |
| Contacts | + seldom initiates conversations |
| | + short conversations |
| | + few associates are contacted during the shift |
| | + low engagement times with shoppers |
| | − more contacts of any sort |
| | − creates announcements |
| Adjacencies | + few adjacencies with other associates |
| | + seldom found near associates indicating they are engaged with a shopper |
| | − more adjacencies |

In one embodiment, the Secondary Statistics are evaluated against desired and undesired observables to validate or discover causal links. For example, enterprise-wide visibility allows comparison of patterns between two stores such as store-to-store results and store results at different times or under differing policies or staffing mixes. Use of 'big data' techniques to identify likely drivers of store gross sales, labor costs, and profitability by tying these external observables to the various potentially useful dimensions of the assessment. These techniques additionally permit the weighting to be varied to improve the predictive value of the Secondary Statistics. Weightings may vary by region, by shift, and by product type. By analyzing a broad data set of either historical or real time financial information and the corresponding workforce scheduling information, the present technology can determine a target or minimum goal for each shift in order to optimize a store's financial performance.

The discovered and validated measures can then be used by management to plan, hire, evaluate and guide, and to schedule. Consequent assignment of parameters to individual employees to: allow predictions of likely behaviors under various circumstances, prepare better plans (i.e., staffing mixes through workforce management tools like Kronos), create forecast consequences of hypothetical policy changes, and better train, inspire and measure all staff.

Predictive models can be built using actual historical data to determine sociability score milestones that new hires should attain over a certain time period. Store management will be systematically notified should new hires fail to meet the configurable milestones. Similarly, associate historical sociability score trends can be monitored for substantial deviations, which could signal a substantial behavior change.

The Secondary Statistics may also show a breakdown of skills or may classify skills in different categories. A numerical value may then be employed to demonstrate the user's or employee's rating or effectiveness for a given skill. The present technology may operate to generate Secondary Statistics and assessments for a single user or for groups of users.

In one embodiment, the Primary Statistics and Secondary Statistics are employed by computer 120 to generate higher order statistics. Higher order statistics simply use techniques and algorithms to create an additional level or layer of quantified sociability score or skills that are based on the Secondary Statistics.

The Secondary Statistics can be generated in a continuous or dynamic fashion. In other words the Secondary Statistics can be updated over a period of time. As new communications are made between employees and other users, more or new Primary Statistics are be gathered and used to generate new Secondary Statistics and assessments. This may be accomplished periodically or in real time. Moreover, the type of Secondary Statistics may change over time.

The Secondary Statistics and assessment may then be made available to a manager, others, or other computer systems. This may be done by the manager or others accessing the information at computer 120 or computer 120 may send the information to another computer system or handheld device accessible by the manager or others. For example, the information may be emailed to the manager or hosted on a website, delivered to a database or instantly fed to another computer system.

The Secondary Statistics or higher order statistics may also be generated based on external statistics that may or may not be combined with the Primary Statistics. External statistics come from outside the scope of the observation platform and may refer to: length of employment, languages spoken, job identity, employment hours, location assignments, skills possessed, desired skills, roles, responsibilities or social engagement quotient (SEQ) generated by another process.

In one embodiment, a visual representation may be generated based on the assessment. For example, the visual representation may be a map that shows the geographic location of a user over a period of time within the retail environment. Thus the visual representation may convey where an employee spends their time while on shift and where the employee is located when communicating. The visual representation may also depict the types of communications that are made in certain areas. For example, it may show that an employee with an answer communicates even when in the break room. Or the visual representation may show that two employees are likely to only communicate with each other during certain times or in certain places or that two or more employees tend to gather in certain locations.

The Primary Statistics, the Secondary Statistics and the assessment may be stored at computer 120 or at another location. Computer processes related to Primary Statistics, the Secondary Statistics and the assessment may be all performed at one computer such as computer 120 or may be performing using a plurality of computers via cloud computing techniques.

Figure 1B:
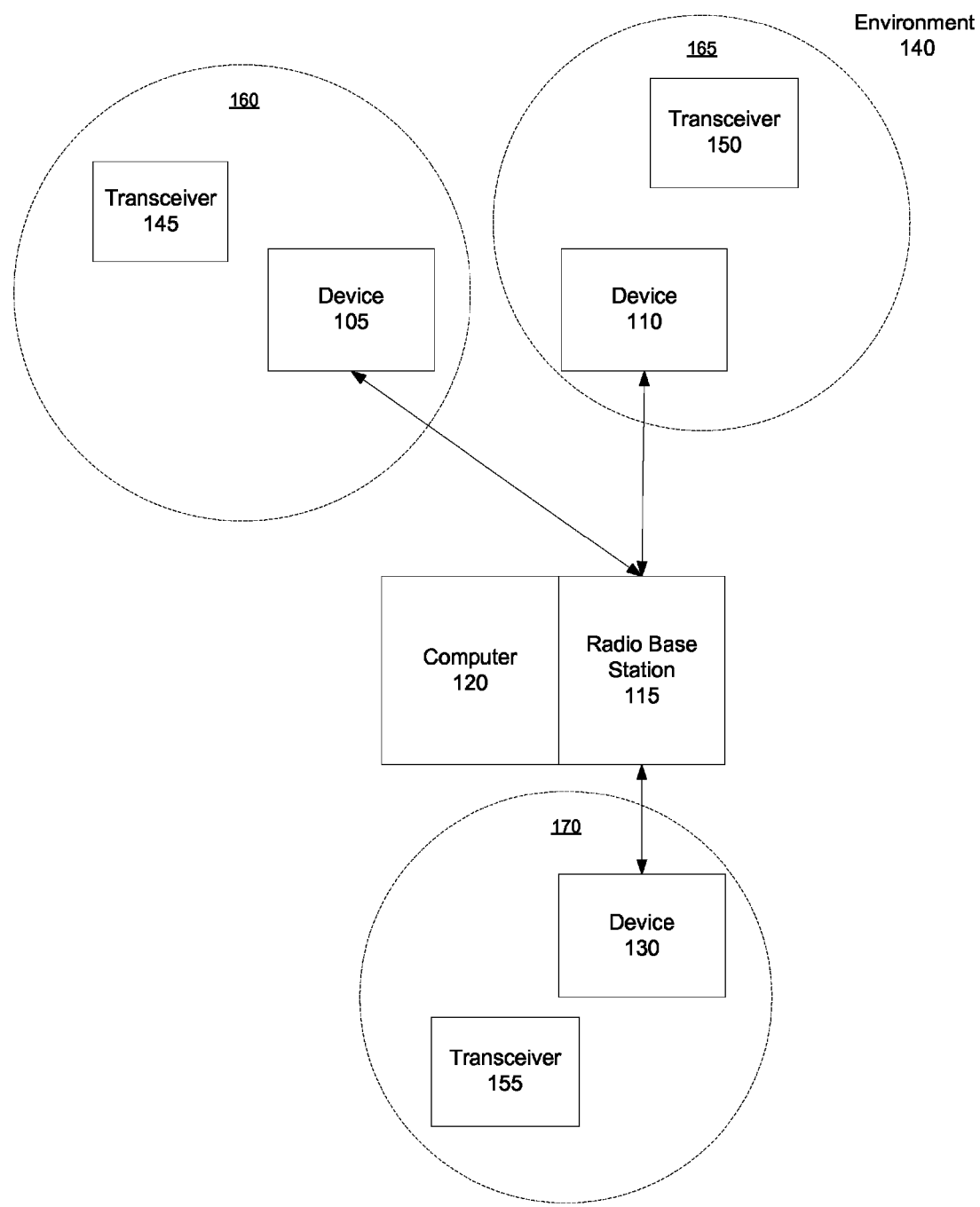
FIG. 1B illustrates a block diagram of an example environment for an observation platform for structuring a communication in accordance with other embodiments of the present technology.
Figure 1C:
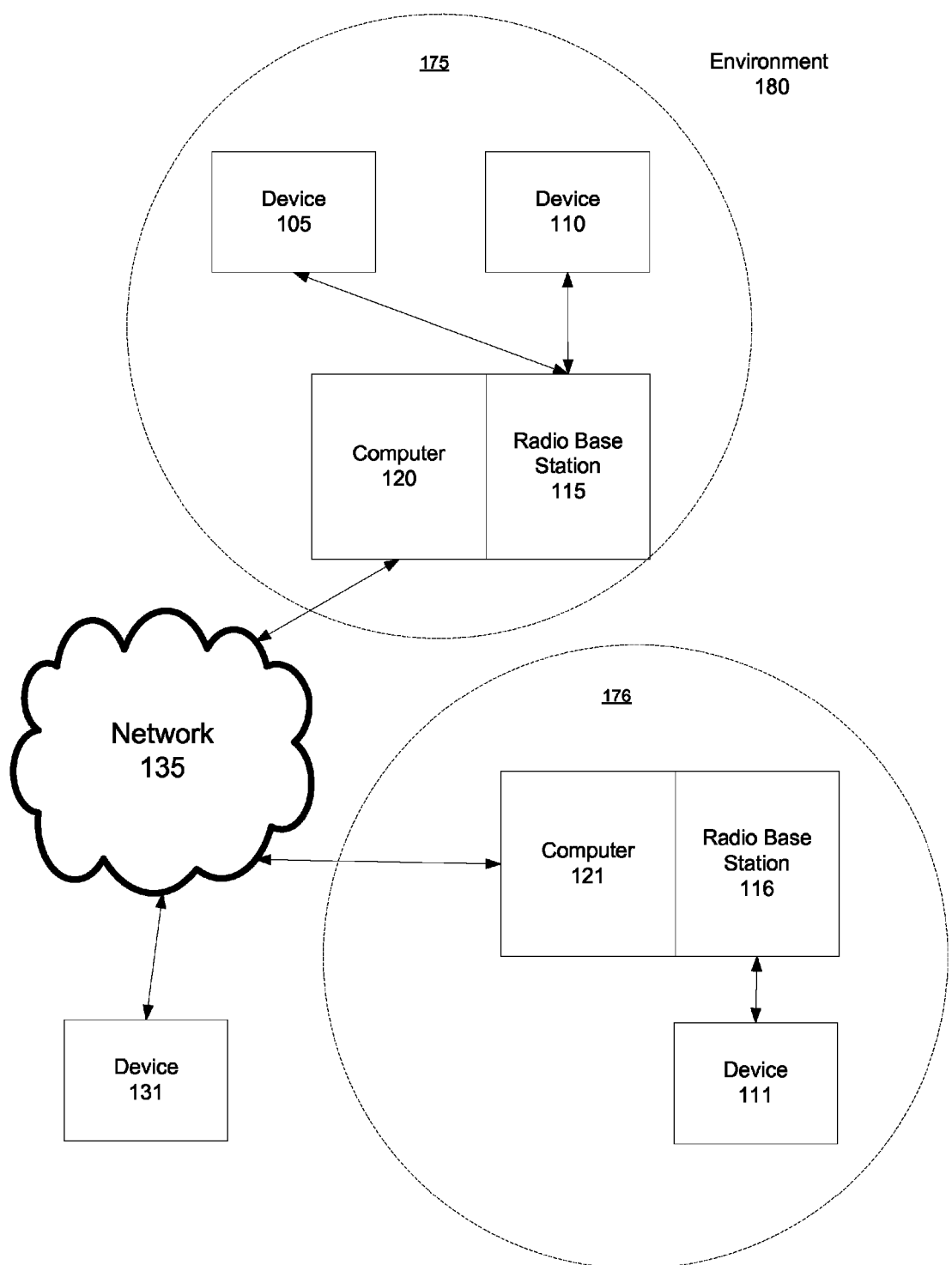
FIG. 1C illustrates a block diagram of an example environment for an observation platform for structuring a communication in accordance with other embodiments of the present technology.

With reference now to FIG. 1B, a block diagram of an environment 140 for training, monitoring, and mining communications in an observation platform. Environment 140 includes devices 105, 110 and 130, radio base station 115, computer 120, transceivers 145, 150, and 155, and regions 160, 165, and 170. Environment 140 comprises components that may or may not be used with different embodiments of the present technology and should not be construed to limit the present technology. Some or all of the components of environment 140 may be described as an observation platform for structuring a communication.

Transceivers 145, 150, and 155 are capable of sending and receiving signals to and from radio base station 115 and devices 105, 110 and 130. Transceivers 145, 150, and 155 may or may not be networked to one another and to either radio base station 115, computer 120 or both. Transceivers 145, 150, and 155 may be transceivers such as wireless routers in a computing network. The transceivers may relay a communication from a user device to computer 120. A communication or signal may be routed through a plurality of transceivers before reaching computer 120. Transceivers need not connect to any network or computer and may be located throughout the environment as needed for the location accuracy desired. Additionally, the transceivers may use a low duty cycle beacon that may be time synchronized with devices in under the control of computer 120.

In one embodiment, the transceivers may be uniquely identifiable such that a communication may comprise a characteristic that identifies the communication as being routed through a given transceiver. This identification of the transceiver may be employed by computer 120 to determine a geographic location of a device or user. Thus, a characteristic of the communication may be an identity of a transceiver and comprises information that is indicative of a geographic position. Computer 120 may determine that a device is in a geographic region that is associated with a transceiver such as region 160 associated with transceiver 145. Computer 120 may also use geographic information and user motion characteristics to predict and pre-set association to the next likely transceiver.

In one embodiment, computer 120 determines the geographic location of a device based on a transceiver signal strength received at the device from one or more transceivers. For example, device 130 may receive signals from both transceivers 150 and 155 each with a corresponding signal strength. The signal strength data is sent from device 130 to computer 120 as a characteristic of a signal or communication sent to computer 120. The signal strength data is then used by computer 120 to determine the geographic position of device 130.

Transceivers 145, 150, and 155 each have an associated region such as regions 160, 165, and 170. The regions may define the transmission range of the transceiver or may be defined based on some other criteria. In one embodiment, the regions may be described as wireless hotspots or 802.11 access points (APs). Regions 160, 165 and 170 may be well defined geographical regions either indoors or outdoors and may be known to computer 120. Regions 160, 165 and 170 are depicted as not overlapping one another. However, the regions may or may not overlap one another. In one embodiment, computer 120 may determine the geographic location of a device based on its location in one or more regions. For example, device 105 may be located in region 160 for its primary communications, yet is capable of receiving signals strength measurements from regions 165 and 170. In another example, regions 160 and 165 may be overlapping and computer 120 determines that device 110 is in the overlapping portions of region 160 and 165 because a characteristic of a communication from device 110 indicates that device 110 is capable of transmitting to and receiving signals from both transceiver 145 and 150. Thus a characteristic of signal sent from a user device to computer 120 may be contents of a communication, a portion of a communication corresponding to an audible source, signal strength data of a transceiver or multiple transceivers, an identity of a transceiver or multiple transceivers, geographic position data, or other information.

In one embodiment, computer 120 determines the geographic motion, motion vector, or path of travel of a user based on transceiver signal strengths received at the device from one or more transceivers. Movement of the communications device 130 may be derived from data regarding signal strength measurements made from one or more of the transceivers, where the signal strength is measured and sampled at successive time intervals, via well-known methods. For example, as a user moves about the region in environment 140, the signal strength will increase at one transceiver device and decrease at another. Movement of the communications device 130 may also be derived from internal components in the device such as accelerometers, barometers, or magnetic compasses, again via successive time samples of data. This data may be used to detect a more accurate range of movement.

With reference now to FIG. 1C, a block diagram of an environment 180 for training, monitoring, and mining communications in an observation platform. Environment 180 includes devices 105, 110, 111 and 131, radio base stations 115 and 116, computers 120 and 121, network 135 and regions 175 and 176. Environment 180 comprises components that may or may not be used with different embodiments of the present technology and should not be construed to limit the present technology. Some or all of the components of environment 180 may be described as an observation platform for structuring a communication.

In one embodiment, device 105 and 110 are located within region 175. The components depicted within region 175 may be described as an observation platform. Region 175 may be described as having a radio range, or span of operating distance. For example, radio base station 115 may have a physical limit regarding the distance which it may transmit radio signals. Therefore, a device outside of the radio range, such as devices 131 or 111 will not be able to communicate with computer 120 via a radio signal transmitted from radio base station 115. Additionally, devices 105, 110, 111 and 131 may also have a limited radio range.

These limitations may be overcome by computer 120 relaying the communication to either device 131 or a second observation platform within region 176 via network 135. Therefore, devices 105 and 110 may communicate with either device 111 or 131 where the communications are relayed by computer 120 and network 135. Region 176 may be described as a second observation platform with components that are duplicates of or similar to components of region 175. The regions 175 and 176 may comprise any number of communication devices or other components such computers, routers, and transceivers. Thus, the present technology provides for structured or disciplined communications between at least two user devices, or a plurality of devices, that may or may not be within radio range of one another.

In one embodiment, the communications between computer 120 and devices 105 and 110 are accomplished via radio signals and the communications between device 131 and computer 120 are accomplished via network 135. In one embodiment, the connected between network 135 and device 131 is telephony call such that device 105, which may not be a telephone, places a phone call to device 131, which is a telephone, via the observation platform. In such an embodiment, network 135 may comprise both a computer network and a phone network or cloud.

In one embodiment, device 131 and/or region 176 may be physically remote relative to radio base station 115. For example, all the components shown within region 175 may be located within radio range of one another at a first location, but device 131 and region 176 are located at a second and third location outside of region 175. These first, second and third locations may be separated by any distance. The second or third location may be hundreds or even thousands of miles away from the first location or may be less than a mile away but still outside of region 175. In one embodiment, computer 120 and radio base station 115 are located at a first physical address such as a street address for a building or other physical location, device 131 is located at a second physical address, and computer 121 and radio base station 116 are located at a third physical address.

In one embodiment, computer 120 and radio base station 115 are associated with a retail environment and region 175 includes the retail floor as well as an office or other area designated for associates, managers, or others relative to the retail environment. However, computer 121 and radio base station 116 are located in region 176 are located at a second retail environment. The first and second retail environments may be related to one another such as both being a franchise of the same business or enterprise. Thus, a customer or associate may be located in region 175 associated with a first franchise, e.g. a first observation platform, and speak with an associate using device 111 in a second franchise, e.g., a second observation platform. The customer or associate may ask questions regarding the inventory of an item at the second franchise or speak with an associate at the second franchise that has knowledge not known by associates at the first franchise.

Figure 1D:
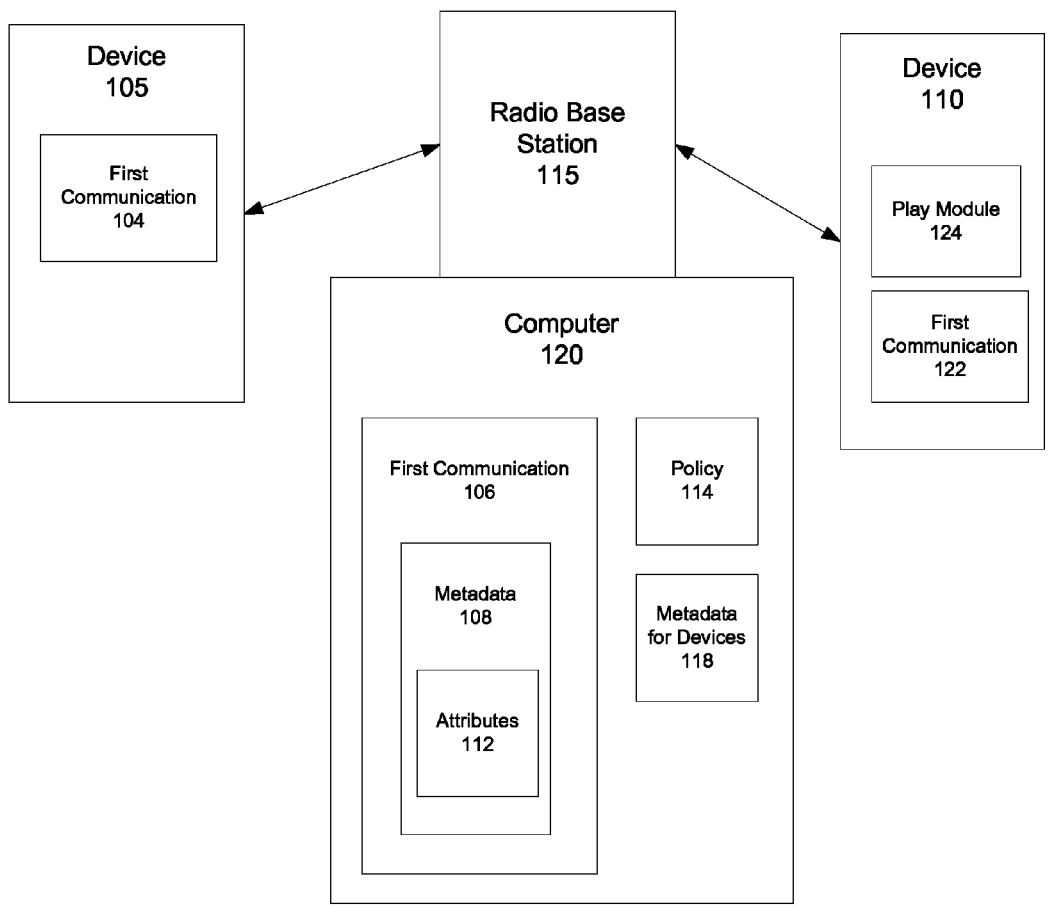
FIG. 1D illustrates a block diagram of an example environment for an observation platform for mediating a communication in accordance with other embodiments of the present technology.

With reference now to FIG. 1D, a block diagram of an environment 190 for mediating a communication in an observation platform. Environment 190 includes devices 105 and 110, radio base station 115, computer 120, first communication 104, 106 and 122, metadata 108, attribute 112, policy 114, metadata for devices 118 and play module 124. Environment 190 comprises components that may or may not be used with different embodiments of the present technology and should not be construed to limit the present technology. Some or all of the components of environment 190 may be described as an observation platform.

In one embodiment, devices 105 and 110, radio base station 115, and computer 120 have the same capabilities of their counterparts in FIG. 1A. Device 105 is able to send first communication 104 to computer system 120 via radio base station 115. Computer system 120 may be located physically proximate to the devices or it may be remote and connected via a network. Computer 120 may also be a plurality of computers connected using cloud computing techniques. It should be appreciated that first communication 104 may be generated by a user employing device 105 and the content may include audio, speech, text, images, video, or any combination thereof. First communication 104 may also be described as speech, oration, or play. First communication 104 may also include additional characteristics such as data indicative of a geographic location of device 105, a timestamp of when first communication 104 was generated and sent, the identity of a user associated with device 105, etc. In one embodiment, computer 120 stores first communication 104 as first communication 106 and parses or generates metadata 108 associated with first communication 106 according to policy 105. It should be appreciated that metadata 108 may be related to the actual content of first communication 104, may be related to the additional characteristics of first communication 104, or may be a combination. Additionally, metadata 108 may comprise data related to a history of the use of device 105 such as statistical data of how many communications are sent and received by device 105. Such data may not be part of first communication 104, but may be stored and accessed in metadata for devices 118.

In one embodiment, metadata 108 includes content from first communication 104 that directs the destination of the communication. For example, first communication 104 may comprise an audible portion with the words "Bob are you there?" Computer system 120 may convert the audible portion of first communication 104 to text and parse the phrase "are you there" as a command to relay the communication to "Bob." Additionally, metadata for device 118 may know that the name "Bob" is associated with a given device, first communication 104 is then relayed to the given device. Alternatively, computer system, 120, may parse the phrase and respond with the known state and location of "Bob," e.g., "Bob is available in aisle seven."

Metadata 108 may also be a unique message identification number generated by computer 120 for first communication 104, a group identification number that associates first communication 104 with a series of related communications, and/or a geographic zone in which device 105 is located in. Metadata 108 may also comprise data associated with the status of device 105 and/or the status of the user associated with device 105. Such status data may indicate whether the user of device 105 is busy, engaged, available, not on the system, not in rage, in a conversation, in training, etc. The status data may be generated by computer 120 and may be based on data from the history of device 105 or from first communication 104. Metadata 108 may also be a classification of a user associated with the device. Such classification may be an expertise such as a "paint expert" or "cashier" or may be more generic such as customer, manager, employee, associate, vendor, etc. Metadata 108 may also be a start and stop time of the communication. Metadata 108 may also incorporate parts or all of the Secondary Statistics relating the social engagement quotient of the individual.

In one embodiment, metadata 108 is parsed into individual attributes 112 and stored as a set of attributes. Portions or all of metadata 108 may also be copied and stored by computer 120 as metadata for devices 118. In one embodiment, metadata for devices 118 stores metadata for a plurality of devices associated with the observation platform such as device 110. It should be appreciated that metadata 108, attributes 112 and metadata for devices 118 are each controlled by policy 114. Policy 114 comprises policies, instructions, and/or rules for the generation, usage and storage of metadata. For example, policy 114 may dictate that every communication, such as first communication 104, should have an attribute stored indicating the geographic location of the device when it sent the communication. In one embodiment, policy 114 determines the length of time an attribute is stored for. In one embodiment, policy 114 is programmable or customized. In other words, policies may be changed during the operation of the observation platform and may be assigned to devices, groups of devices or individual users, if known. The devices may store a portion of the policy to control what data is sent with a communication to computer system 120. Changes in the policy may be sent to the devices. However, policy 114 may simply be a default policy. One example of a set of policies is a walkie-talkie emulator policy where the policies allow the devices in the observation platform to emulate walkie-talkies.

Metadata for devices 118 may include metadata and/or attributes similar to those described for metadata 108 only in relation to a plurality of devices rather than just one device. In one embodiment, computer system 120 compares attributes 112 to the attributes for other devices stored in metadata for devices 118 to identify a recipient device for first communication 104. In one embodiment, the identification is accomplished by matching one attribute. For example, first communication 106 may comprise an attribute that matches an attribute stored in metadata for devices 118 that is associated with device 110. Thus the matching attribute identifies device 110 as a recipient device for first communication 104. Once such an identification is made, first communication 104 may be relayed to device 110 as first communication 122 via computer system 120 and radio base station 115. First communication 122 may be identical to first communication 104 or may similar to first communication 106 and comprise metadata 108.

In one embodiment, computer system 120 identifies a recipient device by matching a single attribute. In one embodiment, computer system 120 will relay first communication 104 to every device that has a matching attribute with any one of the attributes from attributes 112. For example, device 110 may have a geographic position attribute that matches a first attribute from attributes 112 while a third device has a timestamp attribute related to a second attribute of attributes 112. In this example, both device 110 and the third device will be relayed the communication as recipient devices. It should also be appreciated that a plurality of devices may all have the same attribute matching a first attribute from attributes 112 and each of the plurality of the devices are then relayed the communication.

In one embodiment, computer system 120 will not relay first communication 104 to a device that has a matching attribute if the attribute is blocked by an inhibitor for the given device. Such an inhibitor may be received at computer system 120 from a device or may be generated and stored by computer system 120. In one embodiment, the generation of inhibitors is controlled by policy 114. For example, an inhibitor may be associated with device 105 in relation to first communication 104 such that computer system 120 does not relay first communication 104 back to device 105 even if a matching attribute is found. Other inhibitors may be related to the status of a device. For example, if a device status is "busy" or "engaged with customer" than computer system 120 may be inhibited from identifying such a matching device as a recipient device.

In one embodiment, an inhibitor may be overridden by an attribute. For example, a communication that is marked "urgent" or "interrupt" may override certain inhibitors or any inhibitor associated with the status of a device.

In one embodiment, computer system 120 identifies a recipient device based on a voting system involving a plurality of matches of attributes and/or inhibitors. For example, in the voting system, an attribute may be assigned a numerical value such as +1 and an inhibitor a value of −1. The voting system will then tally all of the numerical values and if the tally for a given device is positive, or above a predetermined threshold, then the given device will be identified as a recipient device and relayed the communication. It should be appreciated that some attributes may also be given a negative value such as status or availability of a device or the location of a device in a predetermined zone.

In one embodiment, device 110 receives the relayed first communication at play module 124. Play module 124 may operate to automatically play a relayed communication once it is received. Play module 124 may also trigger a notification to a user of device 110 that a relayed communication has been received. In one embodiment, the playback of the relayed communication is governed by a policy on play module 124 that is associated with policy 114. Computer system 120 may track, record and/or timestamp all information and other audio streams that are played to each user.

In one embodiment, device 110 is utilized to generated and send a second communication from device 110 back to computer system 120. Computer system 120 may then similarly parse metadata for the second communication and determine that it is responsive to first communication 104 and relay the second communication to device 105. This determination may be made by matching attributes of metadata and may also be based on timestamps of the communications in conjunction with policy. In one embodiment, the second communication is relayed to all of the devices that the first communication was relayed to.

In one embodiment, the first communication is relayed to a plurality of recipient devices which is described as a one-to-many communication. Once a second communication, or responsive communication, is received then subsequent communications may only be sent to and from the first device and the responsive device. Thus a one-to-many communication stream may be narrowed to a one-to-one communication stream where a communication stream is defined as a series of communications. By responding to a first communication, the user of the responding device self-selects herself to be included in the future communication stream.

In one embodiment, the first and second communication are sent and received by the devices in substantially real time. For example, computer system 120 may be parsing and matching metadata and relaying the communications, but computer system 120 may operate on the scale of microseconds such that the users of the devices will not perceive any lag and the series of communications will be perceived to occur in real time. Thus the present technology may be described as operating an observation platform whose point is satisfying unique requirements of an environment such as a retail environment. The present technology is built around, in at least one method, forwarding voice messages fast by selecting what messages to play on what devices. The selection is made employing by comparing metadata or message tags to tags on objects associated with each device or communicator. However, communications may occur within the observation platform that are peer-to-peer between two or more users and their devices and are not intercepted and relayed or forwarded by a computer system. In any case, the Primary Statistics may be gathered and used by the computer system.

In one embodiment, first communication 104 may be generated automatically by device 105 in response to a predetermined event, action or series thereof. For example, an employee's time may be tracked for time card purposes using communications from the device. Communications may be sent to that log when and where an employee is located and the communications may be sent automatically upon the device entering or exiting geographic zones.

Figure 1E:
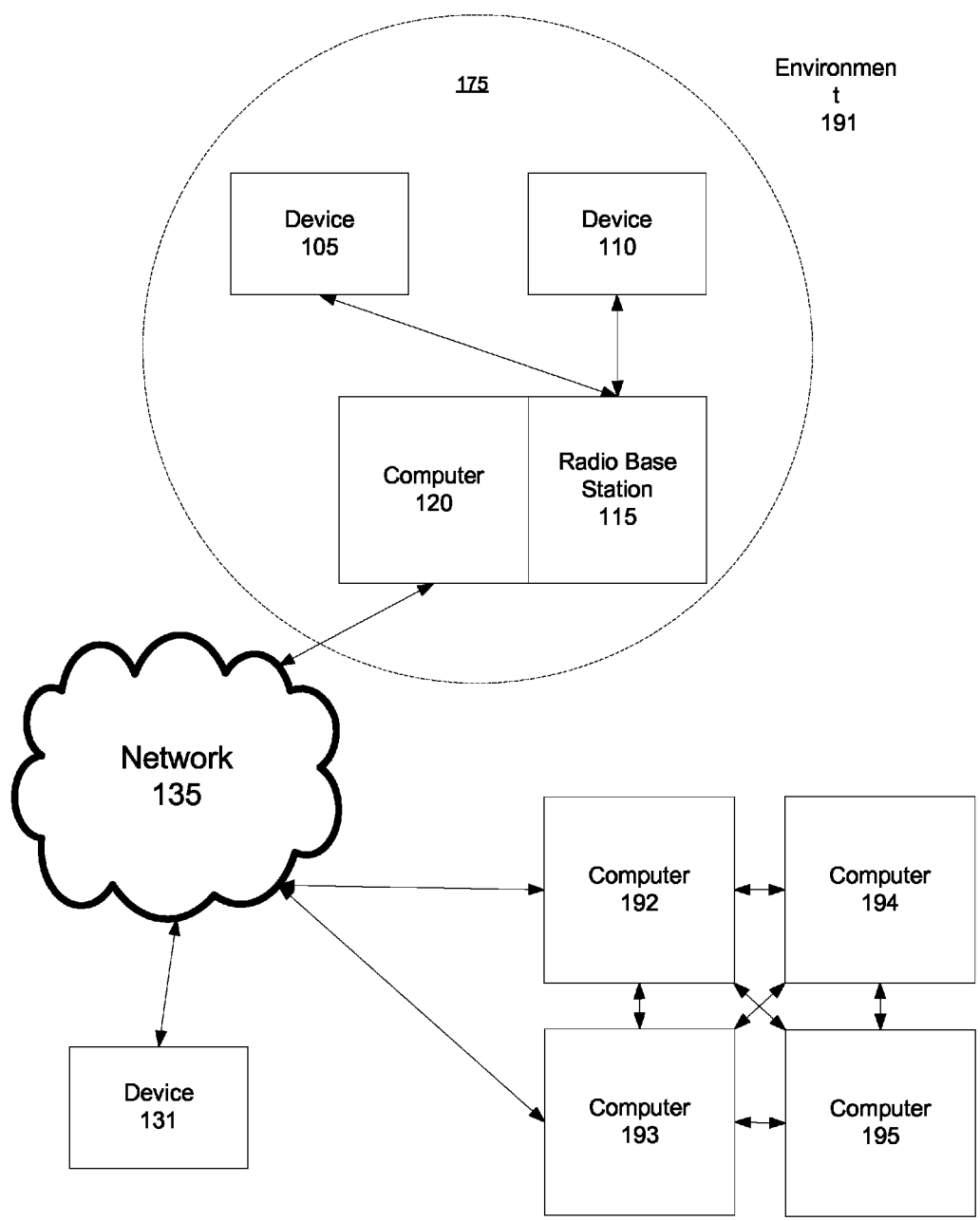
FIG. 1E illustrates a block diagram of an example environment for an observation platform for structuring a communication with cloud computing in accordance with other embodiments of the present technology.

With reference now to FIG. 1E, a block diagram of an environment 191 for using structured communications in an observation platform with cloud computing. Environment 191 includes devices 105 and 110, radio base station 115, computer 120, network 135, device 131, region 175, computers 192, 193, 194, and 195. Environment 191 comprises components that may or may not be used with different embodiments of the present technology and should not be construed to limit the present technology.

In one embodiment, devices 105 and 110, radio base station 115, computer 120, network 135, device 131, region 175, have the same capabilities of their counterparts in FIG. 1C. Device 105 is able to send first communication 104 to computer system 120 via radio base station 115. Region 175 may depict a radio range of device 105, device 110 and radio base station 115. Region 175 may also describe a first observation platform. Computer system 120 is depicted as being connected to computers 192, 193, 194, and 195 via network 135. In one embodiment, region 175 is physically remote or not proximate to computers 192, 193, 194, and 195 and device 131. For example, region 175 may be a in a retail setting and computers 192, 193, 194, and 195 are located anywhere else in the world and may be separated by hundreds or thousands of miles or may be located just outside of radio range of radio base station 115. It should be appreciated that computers 192, 193, 194, and 195 may or may not be located physically proximate to one another.

In one embodiment, computers 192, 193, 194, and 195 may be used for cloud computing techniques. Computer 120 may be in contact with one or more of the computer such as computer 192 and computer 193 as depicted by the arrows connecting computer 192 and computer 193 to network 135. In one embodiment, computer 120 forwards data and commands to a single computer such as computer 192, computer 192 then forwards data and commands to other computers. In one embodiment, computers 192, 193, 194, and 195 perform functions for the present technology and then send results back to computer 120. For example, cloud computing may be used to perform steps such as deriving context information from a signal and determining a destination based on the context information. One or more of computers 192, 193, 194, and 195 may send results back to computer 120. Thus a portion of the computational burden and storage requirements are taken from computer 120 and the hardware requirements for an individual observation platform are reduced.

Computers 192, 193, 194, and 195 may be networked to one another using a variety of techniques and may be connected as nodes in a peer-to-peer network. Computers 192, 193, 194, and 195 may be personal computers, server computers, virtual computers, or any number of other computers. It should be appreciated that all of the processes of the present technology may employ cloud computing for some or all of the steps associated with the process. Specifically, processes 300, 400, 500, 600, 700, 800, 900, 1000, 1100, 1200, 1300, 1400, 1500, 1600, 1700, and 1800 may all employ cloud computing techniques. Through the use of cloud computing, portions of the present technology may be virtualized.

Figure 2:
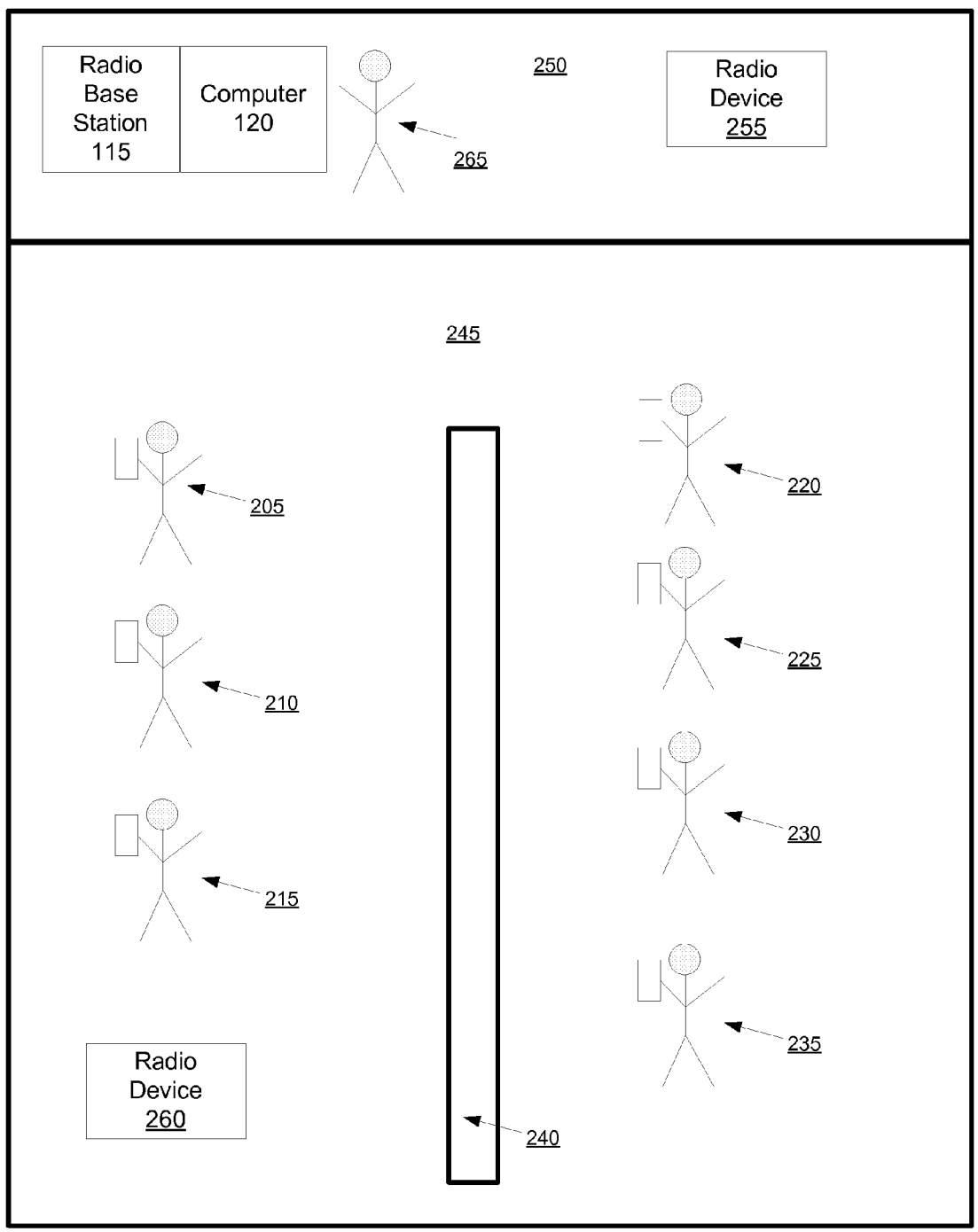
FIG. 2 illustrates a block diagram of an example environment for structuring communication in an observation platform in accordance with embodiments of the present technology.

With reference now to FIG. 2, a block diagram of an environment 200 for training, monitoring, and mining communications in an environment. Environment 200 includes radio base station 115, computer 120, users 205, 210, 215, 220, 225, 230, and 235, structure 240, area 245, area 250, radio devices 255 and 260 and user 265. Environment 200 comprises components that may or may not be used with different embodiments of the present technology and should not be construed to limit the present technology.

Environment 200 depicts a setting in which the present technology may be employed. Environment 200 may be, but is not limited to, retail settings, public-stage floors, schools, restaurants, hospitality operations, outdoor venues, concerts, police scenarios, disaster areas, and other environments where communications occur between users. Areas 245 and 250 are depicted as being enclosed. However, the present technology may be implemented in an outdoor or indoor environment or a combination of the two. Users 205, 210, 215, 220, 225, 230, and 235 are depicted as each holding a device such as device 105 of FIG. 1. The devices do not necessarily need to be handheld. Users 205, 210, 215, 220, 225, 230, and 235 may be a variety of different types of users. For example, the users may be associates and customers intermingled in a retail setting. Area 245 may be the retail floor while area 250 is a back office or other area designated for associates, managers, or employees of the retail environment.

Structure 240 may be a display, shelves, aisle divider, or other structure that physically separates spaces in area 245. For example, users 205, 210, and 215 are depicted as being in separate space of area 245 than users 220, 225, 230, and 235. Computer 120 may be able to interact with users 205, 210, 215, 220, 225, 230, and 235 and determine the user's geographic locations as well as act as a central hub for all communications between the users. In one embodiment, computer 120 recognizes a group of users associated with communication devices. The group may be based on a classification or type of user or may be based on a location of said users. In one example, computer 120 recognizes that users 205, 215, 230, and 235 are associates and users 210, 220, and 225 are customers in a retail setting. The associates may be considered a first group and the customers a second group. In a second example, computer 120 recognizes that users 205, 210, and 215 are a first group in a separate space of area 245 than the second group of users 220, 225, 230, and 235. Computer 120 may then employ the recognition of groups to generate visual representations (instantaneous or time-averaged) of features of the group and its communications. It should be appreciated that groups can simultaneously exist in many locations and are not constrained by building walls or geography.

In one embodiment, environment 200 comprises radio devices 255 and 260 used for communication with user devices and radio base station 115. Radio devices 255 and 260 may or may not be networked with radio base station 115 to provide additional coverage or range for radio base station 115. For example, radio devices 255 and 260 may be antennas or radio repeaters for radio base station 115. In one embodiment, radio devices 255 and 260 are wireless routers for computer networking. Computer 120 may employ radio devices 255 and 260 to determine a geographic location of a user. Radio devices 255 and 260 and transceivers 145, 150 and 155 may each have the same capabilities and features as one another.

The geographic location or position of a user may be determined by computer 120 receiving periodic clues or evidence of the geographic location of the user device and then computer 120 infers or deduces the geographic location based on the evidence or clues. For example, the user device associated with user 205 may receive a plurality of signals from radio base station 115 and radio devices 255 and 260. Each signal has a unique signature at the current position of user 205. The signatures of each source are periodically sent to computer 120 or as a component characteristic of any communication. Computer 120 may then determine the geographic position of user 205 based on the signatures of the sources it reports. In one embodiment, the user device knows its geographic position based on geographic position component which is part of the user device. The geographic position component may be a component device or chip that employs the global positing system, other satellite navigation system, inferred signals, radio signals or RFID signals for determining a geographic location or position. A user device with a geographic position component may transmit the determined geographic position to computer 120 periodically or as part of a communication. Thus computer 120 may know the location of a user at a given time based on the geographic position of the device associated with the user.

In one embodiment, user 265 interfaces with computer 120 to use the present technology to optimize communications. Computer 120 may determine and display performance metrics or visual representations regarding communications to user 265. User 265 may then use the performance metrics and visual representations to make decisions. For example, user 265 may be a manager of associates who can identify that a customer has asked for assistance at a given location but no associates have responded. The manager may then use the present technology to request an associated to assist the customer. In one embodiment, user 265 is able to directly use computer 120 and radio base station 115 to communicate with other users by individual identification, location or proximity groupings, role groupings or contextual groupings.

In one embodiment, user 265 interfaces with computer 120 to use the present technology to optimize geographic location. User 265 may be a customer and requests help from computer 120. Computer 120 determines the associate or user nearest the location of user 265 and provides the current and updated location of user 265 until intercepted by the associate or user. In one embodiment, user 265 may request help verbally, not engaging computer 120, and that request is heard by all nearby associates whose context is "not engaged with shoppers" or as otherwise determined by the policy.

In one embodiment, computer 120 derives performance metrics, business metric or metric from the communications between users. The metrics may be used to generate visual representations. The metrics and/or visual representations may be employed to make decisions. The metrics and visual representations may be sent to another computer system or device. A metric may be based on the behavior of a user, the spoken words of the user, the context of the user, the location and movement of the user, information carried by the tone and quality of voice, the user's signaled communications, or the primary or Secondary Statistics associated with the social engagement quotient.

A sales performance metric may be determined by linking sales with users, measuring busy (or "engaged with shopper") times of users, and ascertaining busy status of user. The busy status of a user may indicate that the user is engaged in a communication, a task, assisting a customer, listening to information or otherwise occupied. A response time metric may also be determined by measuring the time it takes to answer a user's question, how long it takes to receive assistance after asking for it, or how long it takes to arrive at a requested location. A customer satisfaction metric may also be derived based on storage and playing or conversion of speech-to-text of the associate's and customer's communication. A task performance metric may be determined by measuring the length of time an associate is currently engaged in performing said task, including noting pending and completed tasks. Metrics may be used by a manager or others to reward good behavior or correct undesired behavior. Additionally, because the communications and other audio information have been recorded, the communications may be used in training as examples.

Visual representations may be described as communication traffic intensity maps between users and/or groups such as who talks to whom, how frequently and at what time of day; who asks questions and who responds; who responds to tasks, when and how long it took to respond; and listening behavior for training podcasts, messages, announcements, conversations including such information as where they listened, when they listened and how they moved during and after the listening. Visual representations may also be described as location maps such as, a status of when users indicate that they are engaged, busy or available, when users ask questions; quiet areas where no communications or engagements are occurring; where users are not located; where selling tips were left and by whom; location-based-tasks and the times it takes to complete them; a path of where users have traveled geographically; and a map of the environment. With this observation platform for structuring communications, a more complete observation of many of the events in the interaction between and among all users can be observed, cataloged, and analyzed, providing a great deal of useful information to any manager, others, or relevant computer system.

Operations of Using Structured Communications in an Observation Platform

Figure 3:
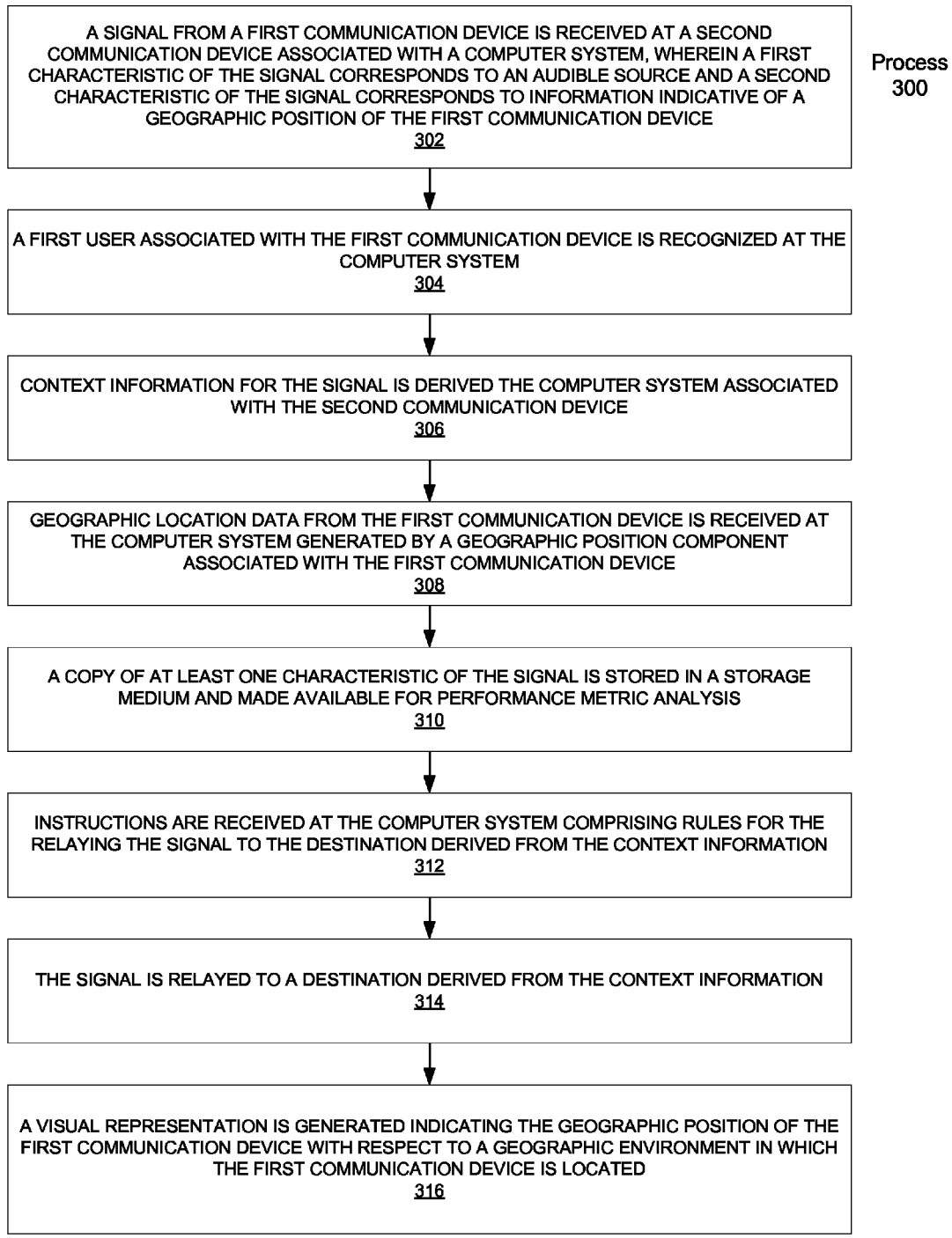
FIG. 3 illustrates a flowchart of an example method for structuring communication in an observation platform in accordance with embodiments of the present technology.

FIG. 3 is a flowchart illustrating process 300 for using structured communication in an observation platform in accordance with one embodiment of the present technology. Process 300 may also be described as disciplining communications in an observation platform. In one embodiment, process 300 is a computer implemented method that is carried out by processors and electrical components under the control of computer usable and computer executable instructions. The computer usable and computer executable instructions reside, for example, in data storage features such as computer usable volatile and non-volatile memory. However, the computer usable and computer executable instructions may reside in any type of computer usable storage medium. In one embodiment, process 300 is performed by the components of FIG. 1A, 1B, 1C or 2. In one embodiment, the methods may reside in a computer usable storage medium having instructions embodied therein that when executed cause a computer system to perform the method.

At 302, a signal from a first communication device is received at a second communication device associated with a computer system, wherein a first characteristic of the signal may correspond to an audible source and a second characteristic of the signal may correspond to information indicative of a geographic position of the first communication device. Additional characteristics of the signal may include contextual information and environmental information. For example, the audible source may be the voice of a user, the signal characteristics may include signal signature information and contextual/environmental information may include user status (e.g., engaged or on-break) and/or background noise levels. It should be appreciated that the signal may actually be a plurality of signals. For example, a first signal may be a transmission of the first characteristic corresponding to the audible source and the second signal may be the second characteristic corresponding to the information indicative of geographic position of the first communication device.

At 304, a first user associated with the first communication device is recognized at the computer system.

At 306, context information for the signal is derived at the computer system associated with the second communication device. The context information may be geographic information, data regarding length or time of communication, or text of the communication. In one embodiment, speech to text recognition techniques are employed to convert an audible communication to text. In one embodiment, the context information is a command for the computer system to perform. In one embodiment, the signal is encrypted or encoded uniquely with respect to the first communication device. The context information may be a command to the computer system. For example the computer system may be commanded to access a database in response to a query or may be given information to store for future reference.

In one embodiment, the information is a command and the command may be issued verbally by a user in a communication. For example, a user may speak into a communication device the phrase "hello everybody" thus the communication is the spoken phrase and the computer system may derive that the communication is to be sent to everybody. The computer system then relays the signal to everybody associated with the communication observation platform. In another example, the communication may be the phrase "hello Bob." The computer system derives that the destination of the communication is Bob; the communication is then relayed only to Bob.

The Table below shows examples of Communication Phrases and Derived Context information. Specific examples using sample vocabulary are given as well as more general cases indicated by the brackets [ ].

| Communication Phrase | Derived Context Information |
|---|---|
| "Hello Everybody" Hello [Group] | The communication is to be relayed to a group defined as "everybody" and anyone may respond. Context information such as "engaged" may limit those who hear and may respond to the "Hello" phrase. |
| "Hello Bob" Hello [Person] | The communication is to be relayed to an individual identified as "Bob" and only "Bob" hears the message and is able to respond. Context information such as "engaged" may result in the computer providing additional information to the caller such as the state of the user (e.g., "engaged") and other factors such as location. |
| "Hello Workshop" Hello [Location] | The communication is to be relayed to everyone associated with the "Workshop" location. Context information such as "engaged" may limit those who hear and may respond to the "Hello" phrase. |
| "Hello Process Experts" Hello [Group] | The communication is relayed to all identified as the group, "Process Experts." These people or machines may be physically located in any region or environment. Context information such as "engaged" may limit those who hear and may respond to the "Hello" phrase. |
| "Urgent Bob" or "Interrupt Bob" Interrupt [Person] Interrupt [Group] Interrupt [Location] | The communication is an urgent communication to be relayed to "Bob." Such a command may interrupt "Bob" if he is "engaged" or communicating with others or the system as defined by the operator of the environment. Once interrupted, communication is between the caller and original user (i.e., Bob) and may or may not include others who may have been talking with Bob at the time. |
| "Message Bob" Message [Person] Message [Group] Message [Location] | Leaves a message that persists for a pre-determined interval. Messages for groups are heard as persons become available. Messages for locations are heard as persons become available or enter the location area. Special cases for 'messages" include delivering audio information to groups such as Marketing Departments, Buyers, Help Desks, Websites, Technical Support or Product improvement requests. |
| "Announcement Everybody" Announcement [Group] | The communication is to be relayed to "everyone" as a bulletin. Those users who are engaged or not yet on the system will hear the bulletin when they become available. |
| "Selling tip for the side hallway" Announcement [Location] | The communication is to be relayed to those who are within or enter the side hallway as an announcement. No response is anticipated. |
| "Absolute Announcement for Maintenance Team" Absolute Announcement [Group] or [Location] or [Person] | The communication is delivered to all who are available and in the proper context. A response is mandatory. The system records the time, location, user and spoken response for later analysis or storage. |
| "Where is Steve" Where is [Person] Where is [Group] | The communication is a command to determine a geographic location of Steve and to send a message back to the communication device from the computer system that speaks the response. The response may also include contextual information such as "Steve is available" or Steve is engaged" or other information from other sources such as "Steve is on break." Steve does not need to hear that his status was being probed, although it is possible to alert him. |
| "Who is near the central hallway" Who is near [Location] | The communication is a command to determine who is geographically located near the central hallway region and to send a message back to the communication device from the computer system that speaks the response. The response may include additional contextual information for the persons in that location. |
| "Go to simple menu" Command [profile] | The communication is a command for the computer system to go to the simple menu profile and to send a message back that speaks the phrase "you will now go to simple menu." This feature allows individual users to move into different command, control and skill level profiles within the system. |
| "Does anyone know if we have . . . ?" Spoken String | Some formats of commands are natural to the users, but not is a structured speech pattern. In this case, the words, "Does anyone know . . ." may trigger the computer to send this message to group of people who know where things are. Additional contextual information may limit that group to a department or location. |
| Lost sale report | Initiates a set of questions to determine the reason for a lost sale. Typical categories are: stock-outs, selection limits (e.g., could have sold one in blue), or competitive win (e.g., they have this for 20% less on Amazon). |
| Activity Report | Queries the door counter system for shopper arrival and density information. |
| Goal Report | Provides information from POS systems regarding the financial performance of the sales associates and store POS information. |
| Message to Tech Support | Connects the communication device to technical support that may be located physically remote from the observation platform. |

The phrase "Go to simple menu" may be a command to enter a different menu structure for such activities as new-user learning, learning about products or business, listening to communications, or set-up functions such as group participation and default settings for the individual.

At 308, a geographic location of the first communication device is determined based on the second characteristic of the signal and at least one other source of information. For example, the at least one other source of information may be a router that the signal is routed through, a signal strength of the signal, information from the second communication device, etc.

At 310, a copy of at least one characteristic of the signal is stored in a storage medium and is made available for performance metric analysis. In one embodiment, the performance metrics are key performance metrics. At least one characteristic may be, but is not limited to, a time stamp, engaged, available status, a message, a voice file, a location, a signal signature, a type of message, text corresponding to a message, commands used to initiate the message, other contextual information about the user and an identity of the path the signal was routed through.

At 312, instructions are received at the computer system comprising the policies or rules for the relaying the signal to the destination derived from the context information. The policies may instruct to whom and to how the communication is to be relayed. For example, information derived from a communication may command that the communication be sent to everyone associated with the geographic location of "Workshop." However, the policies may instruct that the communication is only relayed to those associated with the "Workshop" who are designated as available or not busy. The policies may also comprise a predetermined time or a lifetime in which a response may be relayed to an available communication device.

At 314, the signal is relayed to a destination derived from the context information. The destination may be another user or a plurality of user or the computer system itself. The destination may be located outside of a radio range associated with the second communication device or be otherwise physically remote relative to the second communication device.

At 316, a data entry and visual representation is generated indicating the geographic position of the first communication device with respect to a geographic environment in which the first communication device is located. For example, the visual representation may be a map depicting the location of users or where users have been. The data entry and visual representation may include a status indicator of the user such as whether the user is busy or available.

Figure 4:
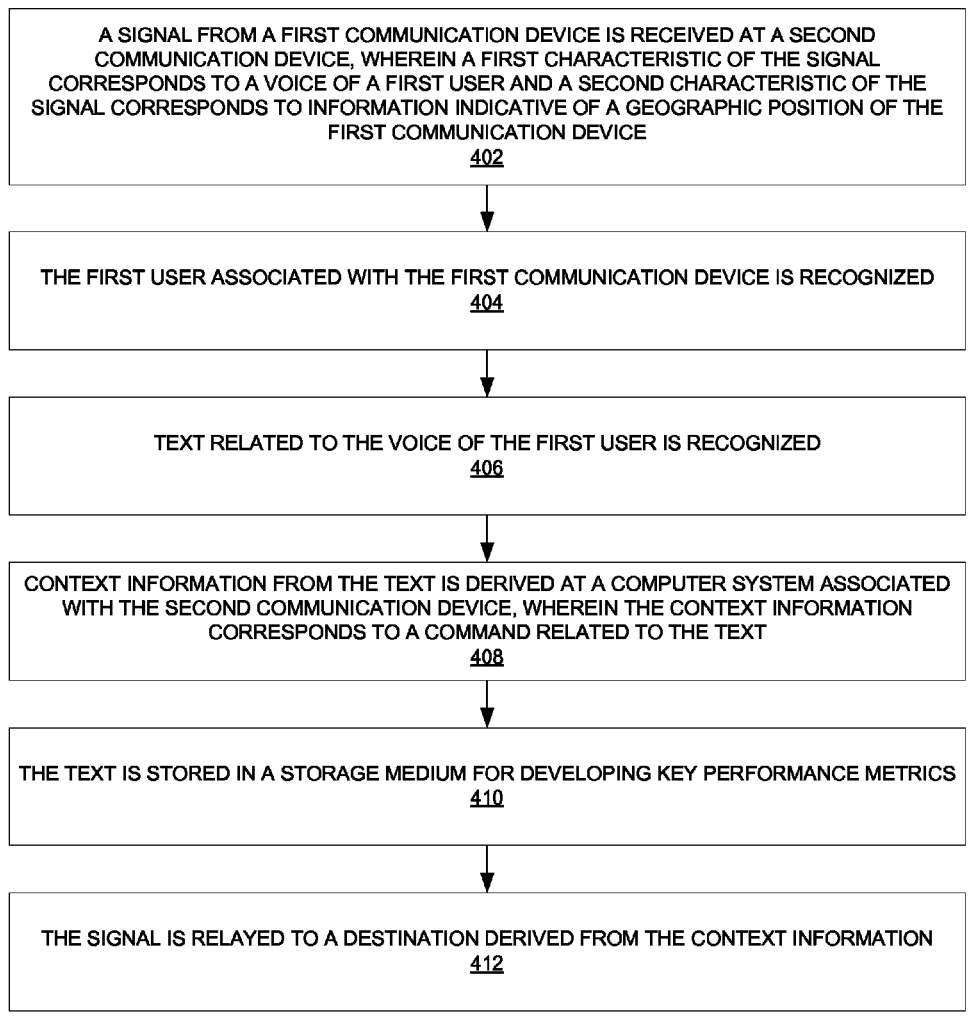
FIG. 4 illustrates a flowchart of an example method for disciplining communications in accordance with embodiments of the present technology.

FIG. 4 is a flowchart illustrating process 400 for using a structured communication in an observation platform in accordance with one embodiment of the present technology. In one embodiment, process 400 is a computer implemented method that is carried out by processors and electrical components under the control of computer usable and computer executable instructions. The computer usable and computer executable instructions reside, for example, in data storage features such as computer usable volatile and non-volatile memory. However, the computer usable and computer executable instructions may reside in any type of computer usable storage medium. In one embodiment, process 400 is performed by the components of FIG. 1A, 1B, 1C or 2. In one embodiment, the methods may reside in a computer usable storage medium having instructions embodied therein that when executed cause a computer system to perform the method.

At 402, a signal from a first communication device is received at a second communication device, wherein a first characteristic of the signal corresponds to a voice of a first user and a second characteristic of the signal corresponds to information indicative of a geographic position of the first communication device. Additional characteristics of the signal may include contextual information and environmental information. For example, the audible source may be the voice of a user, the signal characteristics may include signal signature information and contextual/environmental information may include user status (e.g., engaged or on-break) and/or background noise levels. It should be appreciated that the signal may actually be a plurality of signals. For example, a first signal may be a transmission of the first characteristic corresponding to the audible source and the second signal may be the second characteristic corresponding to the information indicative of geographic position of the first communication device.

At 404, the first user associated with the first communication device is recognized.

At 406, text or machine code related to the voice of the first user is recognized.

At 408, context information from the text or machine code is derived at a computer system associated with the second communication device, wherein the context information corresponds to a command related to the text or machine code.

At 410, the text or machine code is stored in a storage medium for developing performance metrics.

At 412, the signal is relayed to a destination derived from the context information. The destination may be located outside of a radio range associated with the second communication device or be otherwise physically remote relative to the second communication device.

Figure 5:
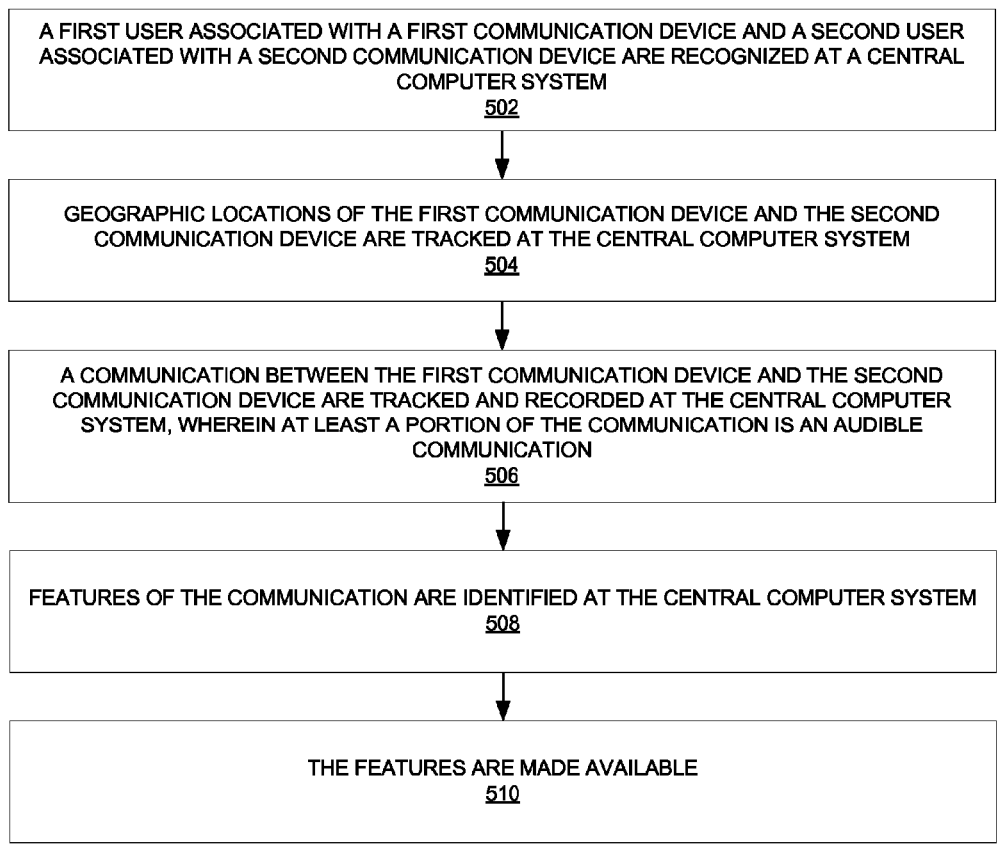
FIG. 5 illustrates a flowchart of an example method for observing and recording users of communication devices in accordance with embodiments of the present technology.

FIG. 5 is a flowchart illustrating process 500 for observing and recording users of communication devices in accordance with one embodiment of the present technology. In one embodiment, process 500 is a computer implemented method that is carried out by processors and electrical components under the control of computer usable and computer executable instructions. The computer usable and computer executable instructions reside, for example, in data storage features such as computer usable volatile and non-volatile memory. However, the computer usable and computer executable instructions may reside in any type of computer usable storage medium. In one embodiment, process 500 is performed by the components of FIG. 1A, 1B, 1C or 2. In one embodiment, the methods may reside in a computer usable storage medium having instructions embodied therein that when executed cause a computer system to perform the method.

In one embodiment, process 500 is a management observation tool for keeping track of mobile human resources and collecting data on their activities.

At 502, a first user associated with a first communication device and a second user associated with a second communication device are recognized at a central computer system.

At 504, geographic locations of the first communication device and the second communication device are tracked at the central computer system. In one embodiment, tracking means storing data about location and any spoken information.

At 506, a communication between the first communication device and the second communication device are tracked and recorded at the central computer system, wherein at least a portion of the communication is an audible communication.

At 508, features of the communication are identified at the central computer system. Features may be described as characteristics or data regarding the communication itself. The features may be user status such as engaged/available, location of a user, communication history of the user, context of the communication, keywords used in the communication, a classification of the communication, time stamps or portions of the primary or Secondary Statistics associated with the social engagement quotient.

At 510, the features are made available to a manager, operations staff or operations machines for making decisions or informing the users that new actions are requested.

Figure 6:
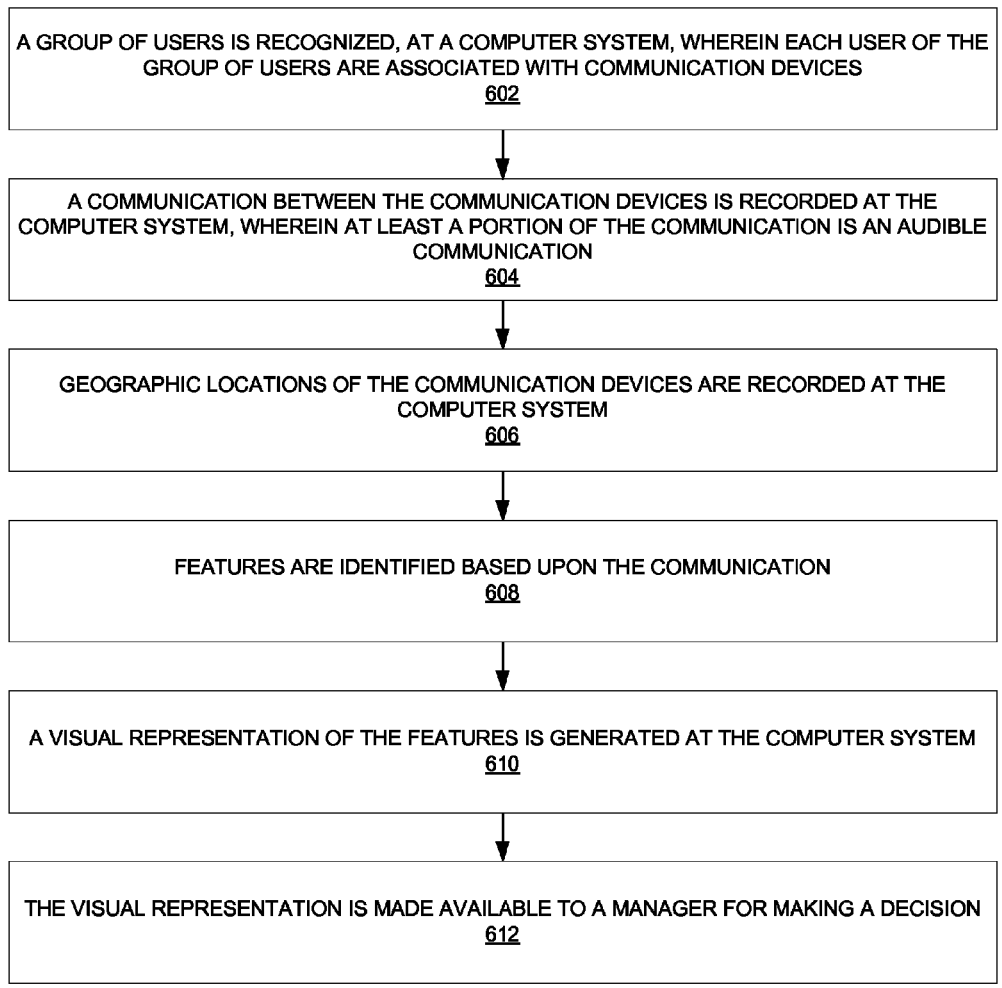
FIG. 6 illustrates a flowchart of an example method for characterizing communications in a group of users in accordance with embodiments of the present technology.

FIG. 6 is a flowchart illustrating process 600 for characterizing communications in a group of users in accordance with one embodiment of the present technology. In one embodiment, process 600 is a computer implemented method that is carried out by processors and electrical components under the control of computer usable and computer executable instructions. The computer usable and computer executable instructions reside, for example, in data storage features such as computer usable volatile and non-volatile memory. However, the computer usable and computer executable instructions may reside in any type of computer usable storage medium. In one embodiment, process 600 is performed by the components of FIG. 1A, 1B, 1C or 2. In one embodiment, the methods may reside in a computer usable storage medium having instructions embodied therein that when executed cause a computer system to perform the method.

At 602, a group of users is recognized, at a computer system, wherein each user of the group of users are associated with communication devices. The group of users may be recognized based on a classification of the user or a geographic location of the users. For example, a classification of the users may be whether the user is an associate or a customer in a retail setting.

At 604, a communication between the communication devices is recorded at the computer system, wherein at least a portion of the communication is an audible communication. In one embodiment, at least a portion of the communication is a pre-recorded audible communication.

At 606, geographic locations of the communication devices are recorded at the computer system. The location may be determined based on signal signatures or other "clues" from other devices sent periodically or with the communication indicative of the location.

At 608, features are identified based upon the communication. Features may be described as characteristic or data regarding the communication itself. The features may be a user status such as engaged/available, location of a user, communication history of the user, context of the communication, a classification of the communication, a frequency of communications between two users, a length of a communication, keywords used in the communication, a response time to a communication, time stamps or the primary or Secondary Statistics associated with the social engagement quotient.

At 610, a visual representation of the features is generated at the computer system. The visual representation may depict when a user of said group of users is engaged in said communication, when a user of said group of users asks a question in said communication, who responds to the question, where each user of said group of users are located, and where said group of users are not located. Alerts, either visual or verbal, may be generated depending on the rules and policies established by the system operators.

At 612, the visual representation is made available to a manager, operations staff or operations machines for making decisions or informing the users that new actions are requested.

FIG. 7 is a flowchart illustrating process 700 for using structured communication in a plurality of observation platforms in accordance with one embodiment of the present technology. Process 700 may also be described as disciplining communications in an observation platform. In one embodiment, process 700 is a computer implemented method that is carried out by processors and electrical components under the control of computer usable and computer executable instructions. The computer usable and computer executable instructions reside, for example, in data storage features such as computer usable volatile and non-volatile memory. However, the computer usable and computer executable instructions may reside in any type of computer usable storage medium. In one embodiment, process 700 is performed by the components of FIG. 1A, 1B, 1C or 2. In one embodiment, the methods may reside in a computer usable storage medium having instructions embodied therein that when executed cause a computer system to perform the method.

At 702, a signal in a first observation platform is received from a first communication device at a second communication device associated with a computer system wherein a first characteristic of the signal corresponds to an audible source and a second characteristic of the signal corresponds to information indicative of a geographic position of the first communication device, and wherein the second observation platform is associated with a radio range. Additional characteristics of the signal may include contextual information and environmental information. For example, the audible source may be the voice of a user, the signal characteristics may include signal signature information and contextual/environmental information may include user status (e.g., engaged or on-break) and/or background noise levels. It should be appreciated that the signal may actually be a plurality of signals. For example, a first signal may be a transmission of the first characteristic corresponding to the audible source and the second signal may be the second characteristic corresponding to the information indicative of geographic position of the first communication device.

At 704, a first user associated with the first communication device is recognized at the computer system.

At 706, context information for the signal is derived at the computer system associated with the second communication device. The context information may be geographic information, data regarding length or time of communication, or text of the communication. In one embodiment, speech to text recognition techniques are employed to covert an audible communication to text. In one embodiment, the context information is a command for the computer system to perform. In one embodiment, the signal is encrypted or encoded uniquely with respect to the first communication device. The context information may be a command to the computer system. For example the computer system may be commanded to access a database in response to a query.

At 708, the signal is relayed from the computer system to a second computer system associated with a second observation platform via a computer network.

At 710, the signal is relayed to a destination in the second observation platform via the second computer system derived from said context information.

Figure 8:
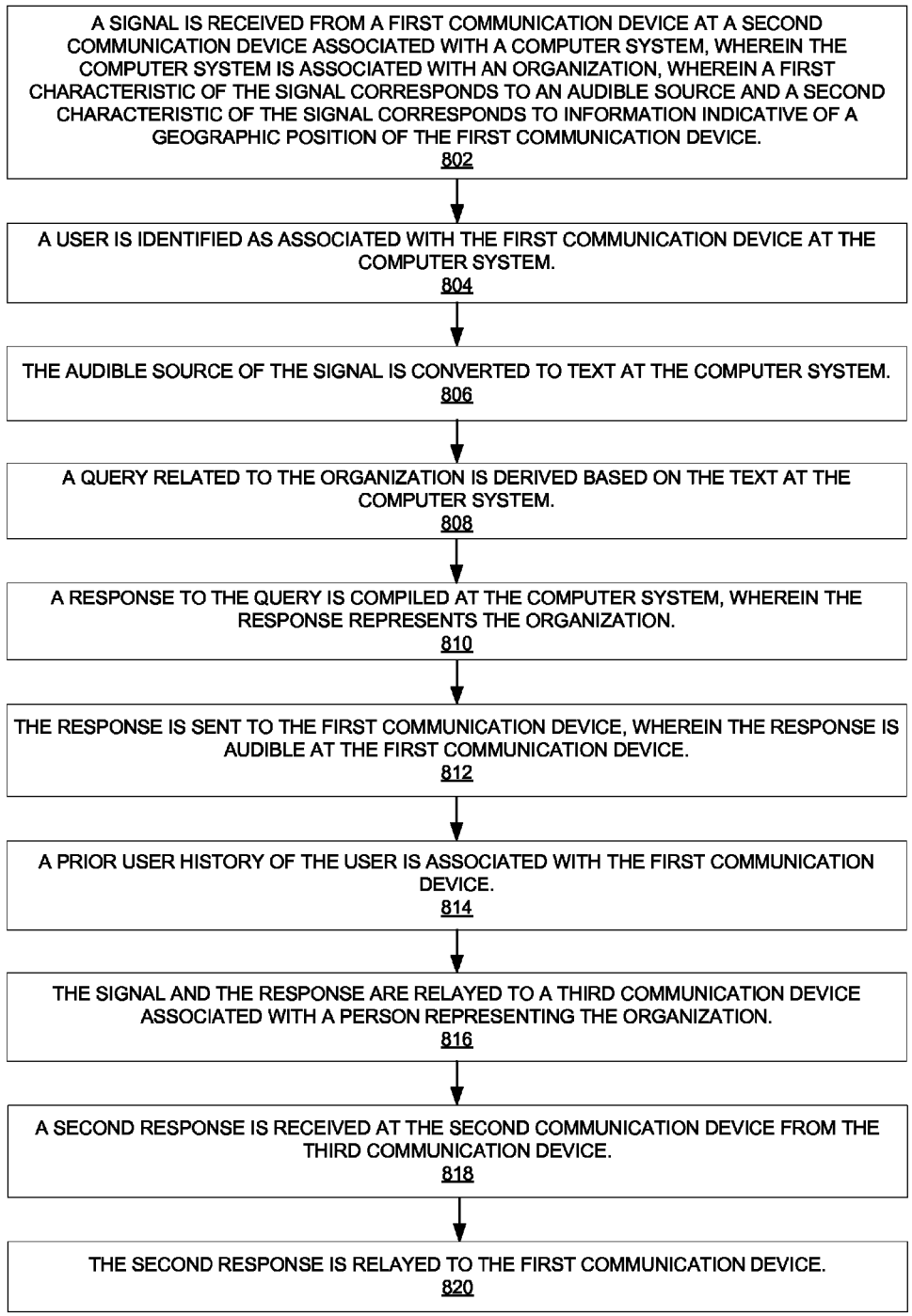
FIG. 8 illustrates a flowchart of an example method for performing communications in an of observation platforms in accordance with embodiments of the present technology.

FIG. 8 is a flowchart illustrating process 800 for performing structured communications in an observation platform in accordance with one embodiment of the present technology. Process 800 may also be described as disciplining communications in an observation platform. In one embodiment, process 800 is a computer implemented method that is carried out by processors and electrical components under the control of computer usable and computer executable instructions. The computer usable and computer executable instructions reside, for example, in data storage features such as computer usable volatile and non-volatile memory. However, the computer usable and computer executable instructions may reside in any type of computer usable storage medium. In one embodiment, process 800 is performed by the components of FIG. 1A, 1B, 1C or 2. In one embodiment, the methods may reside in a computer usable storage medium having instructions embodied therein that when executed cause a computer system to perform the method.

At 802, a signal is received from a first communication device at a second communication device associated with a computer system, wherein the computer system is associated with an organization, wherein a first characteristic of the signal corresponds to an audible source and a second characteristic of the signal corresponds to information indicative of a geographic position of the first communication device. Additional characteristics of the signal may include contextual information and environmental information. For example, the audible source may be the voice of a user, the signal characteristics may include signal signature information and contextual or environmental information may include user status (e.g., engaged or on-break) and/or background noise levels. The organization may be a retail environment, hospitality venue, a school, an event, a military organization, a prison organization, customer service, manufacturing organization, a factory, a disaster response team, or any environment where humans interact with one another to accomplish a purpose. The first communication device may be a handheld device that is capable of sending and receiving signals and may comprise a display, a microphone and a speaker. The first communication device may be owned by the organization and issued to the user or may be the user's personal property such as a smart phone executing an application. The second communication device may be a radio base station as described herein. It should be appreciated that the signal may actually be a plurality of signals. For example, a first signal may be a transmission of the first characteristic corresponding to the audible source and the second signal may be the second characteristic corresponding to the information indicative of geographic position of the first communication device.

At 804, a user is identified as associated with the first communication device at the computer system. In one embodiment, 804 only identifies that there is a user employing the communication device. The actual identity of the user may remain anonymous to the computer system or the user may be identified. The user may be identified using one or a combination of several different techniques. The user may be identified via a unique signature of the communication device associated with the user. For example, the user's communication device may be a smart phone running an application. The smart phone may be the user's personal property and is always associated with the user. In one embodiment, the user may be identified upon activation of the communication device or the application. For example, a user may enter an environment, activate a communication device and then give user credentials that identify the user. This may accomplished via voice commands or text inputs. In one embodiment, the user credentials are associated with a user profile, but the actual identity of the user remains anonymous. In one embodiment, the user may activate a communication device and self-identify. Identifying a user may be automatic taking place without the user's knowledge, or may require the user to acknowledge or give permission for the computer system to identify the user.

At 806, the audible source of the signal is converted to text or machine understandable language at the computer system. This may occur using speech-to-text techniques or other speech recognition techniques employed by computer systems.

At 808, a query related to the organization is derived based on the text or understanding at the computer system. The query may be any number of queries from the user. The user may ask for general assistance or may ask a more specific question such as whether an item is in stock, where an item is located, what sales are taking place, technical details or features regarding an item.

At 810, a response to the query is compiled at the computer system, wherein the response represents the organization. For example, the response relates to the purpose of the organization. In one embodiment, the response is regarding a location or status of a person or an item within the organization. The computer system may access a database to complete the response. The database maybe a local database such as an inventory of a local store, or may access a database in part of a larger network associated with the organization, or may access a database associated with the Internet. In one embodiment, the computer system performs a keyword search of the Internet using a search engine to complete the response.

At 812, the response is sent to the first communication device, wherein the response is audible at the first communication device. In one embodiment, the response is initially a text response that is converted from text to speech. The conversion may occur at the computer system such that a signal with an audible portion is sent to the first communication device, or a text message may be sent to the first communication device where it is converted to speech. The response may be recorded by the organization in a computer system and may also be sent to a person associated with the organization such as a manager, supervisor or others. Thus, a person associated with the business may monitor the responses of the computer system and may be aware of the needs or requirements of the user associated with the first communication device.

At 814, a prior user history of the user is associated with the first communication device. The user history may be a user profile that may or may not identify the user. The history may have a list of all the transactions of this user associated with the organization. The history may also comprise information provided by the user such as likes and dislikes or preferences regarding which person the user wishes to be served by while in the organization.

At 816, the signal and the response are relayed to a third communication device associated with a person representing the organization. The person associated with the organization may be a consultant, an employee, a supplier, a vendor, a sales associate, a civil servant, a volunteer, a manager, or other users. The third communication device may be a handheld device and may or may not be the same type of device as the first communication device.

At 818, a second response is received at the second communication device from the third communication device. For example, the person representing the organization may respond using a signal that may have an audible voice portion a text portion or both.

At 820, the second response is relayed to the first communication device. The computer system may initiate a virtual voice connection between the first communication device and the second communication device.

Figure 9:
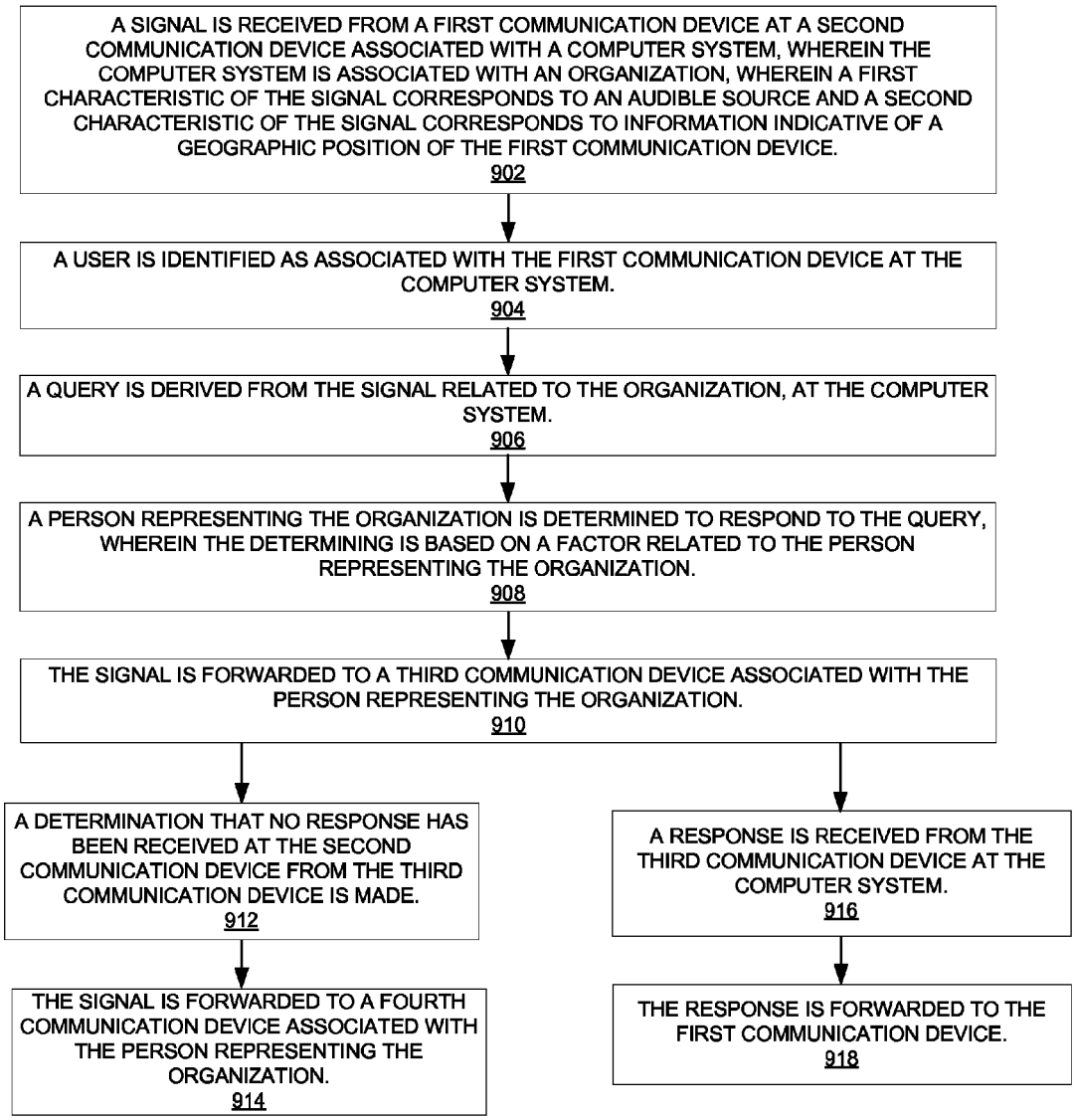
FIG. 9 illustrates a flowchart of an example method for performing communications in an of observation platforms in accordance with embodiments of the present technology.

FIG. 9 is a flowchart illustrating process 900 for performing structured communications in an observation platform in accordance with one embodiment of the present technology. Process 900 may also be described as disciplining communications in an observation platform. In one embodiment, process 900 is a computer implemented method that is carried out by processors and electrical components under the control of computer usable and computer executable instructions. The computer usable and computer executable instructions reside, for example, in data storage features such as computer usable volatile and non-volatile memory. However, the computer usable and computer executable instructions may reside in any type of computer usable storage medium. In one embodiment, process 900 is performed by the components of FIG. 1A, 1B, 1C or 2. In one embodiment, the methods may reside in a computer usable storage medium having instructions embodied therein that when executed cause a computer system to perform the method.

At 902, a signal is received from a first communication device at a second communication device associated with a computer system, wherein the computer system is associated with an organization, wherein a first characteristic of the signal corresponds to an audible source and a second characteristic of the signal corresponds to information indicative of a geographic position of the first communication device. Additional characteristics of the signal may include contextual information and environmental information. For example, the audible source may the voice of a user, the signal characteristics may include signal signature information and contextual or environmental information may include user status (e.g., engaged or on-break) and/or background noise levels. The organization may be a retail environment, a school, an event, a military organization, a prison organization, customer service, manufacturing organization, a factory, a disaster response team, or any environment where humans interact with one another to accomplish a purpose. The first communication device may be a handheld device that is capable of sending and receiving signals and may comprise a display, a microphone and a speaker. The first communication device may be owned by the organization and issued to the user or may be the user's personal property such as a smart phone executing an application. The second communication device may be a radio base station as described herein. It should be appreciated that the signal may actually be a plurality of signals. For example, a first signal may be a transmission of the first characteristic corresponding to the audible source and the second signal may be the second characteristic corresponding to the information indicative of geographic position of the first communication device.

At 904, a user is identified as associated with the first communication device at the computer system. The actual identity of the user may remain anonymous to the computer system or the user may be identified. The user may be identified using one or a combination of several different techniques.

At 906, a query is derived from the signal of the first device related to the organization, at the computer system. The query may be any number of queries from the user. The user may ask for general assistance or may ask a more specific question such as whether an item is in stock, where an item is located, what sales are taking place, technical details or features regarding an item or requesting general assistance.

At 908, a person representing the organization is determined to respond to the query, wherein the determining is based on a factor related to the person representing the organization. The factor may also be described as a characteristic. The factor may be related to the query from the user. For example, the user may ask a question regarding an item in a given department. The determining may be based on who is associated with the given department. The factor may also be based on the status of the person, the availability of the person, the proximity of the person to the user, geographic location of the person, knowledge level of the person, authority level of the person, ability of the person, the social engagement quotient of the person, or a combination of factors. The determining may determine that a plurality of persons qualify to respond. The signal may then be forwarded to one of the plurality, a subset of the plurality, or all of the plurality of persons.

At 910, the signal is forwarded to a third communication device associated with the person representing the organization.

At 912, a determination that no response has been received at the second communication device from the third communication device is made. 912 may occur after 910 in an embodiment where 916 and 918 do not occur. However, 912, 914, 916 and 918 may all occur in one embodiment. Such determination may occur after a pre-determined time period has passed with no response from the third communication device. Such a determination may or may not preclude the third communications device from later responding.

At 914, the signal is forwarded to a fourth communication device associated with the person representing the organization. 912 and 914 may be repeated forwarding the signal to additional communication devices until it is determined that a person representing the organization has responded via a communication device. Alternatively, 910 and 914 may forward the signal to a plurality of communication devices associated with a plurality of persons representing the organization. Once any one of the plurality of persons responds, the person and the user may be placed into a communications channel via their communications devices. The communications channel may be private in the sense that the other members of the plurality of persons representing the organization do not hear subsequent communications over the communications channel. This may be accomplished via the computer system associated with the second communications device. The subsequent communications may all be relayed or forwarded between the user and the person representing the organization via the second communication device and the associated computer system. In one embodiment, the communication channel is open to all members of the plurality of persons representing the organization. In one embodiment, the communication channel is open to a subset group of the plurality of persons representing the organization. For example, the subset group may be only persons who are determined by the computer system to have knowledge regarding the query made by the user or may only be persons who are determined to be available, or persons who have interest in learning more about the subject, or some combination of these characteristics.

By forwarding the signal to a fourth communication device or a plurality of other devices, the circle or group of those required or enlisted to help the user is enlarged. In other words, the user may send a communication or query indicating that the user is in need of assistance. The computer system determines that a first person or small group of people are requested to assist the user, but if the first person or group does not respond, the computer system then determines a second person or a plurality of persons to assist the user. Thus the group of those responding to the assistance request increases. In one embodiment, the initial communication from the first user may go to a designated plurality and the first person to respond becomes established in a private one-on-one conversation with the first (originating) user.

At 916, a response is received from the third communication device at the computer system. 916 may occur after 910 in an embodiment where 912 and 914 do not occur.

At 918, the response is forwarded to the first communication device. 918 may occur after 916 in an embodiment where 912 and 914 do not occur. Process 900 may initiate a virtual voice connection between two communication devices where the communication is relayed or forwarded via the computer system and the second communication device. Thus the computer system and the second communication device may be described as mediating the communications.

Figure 10:
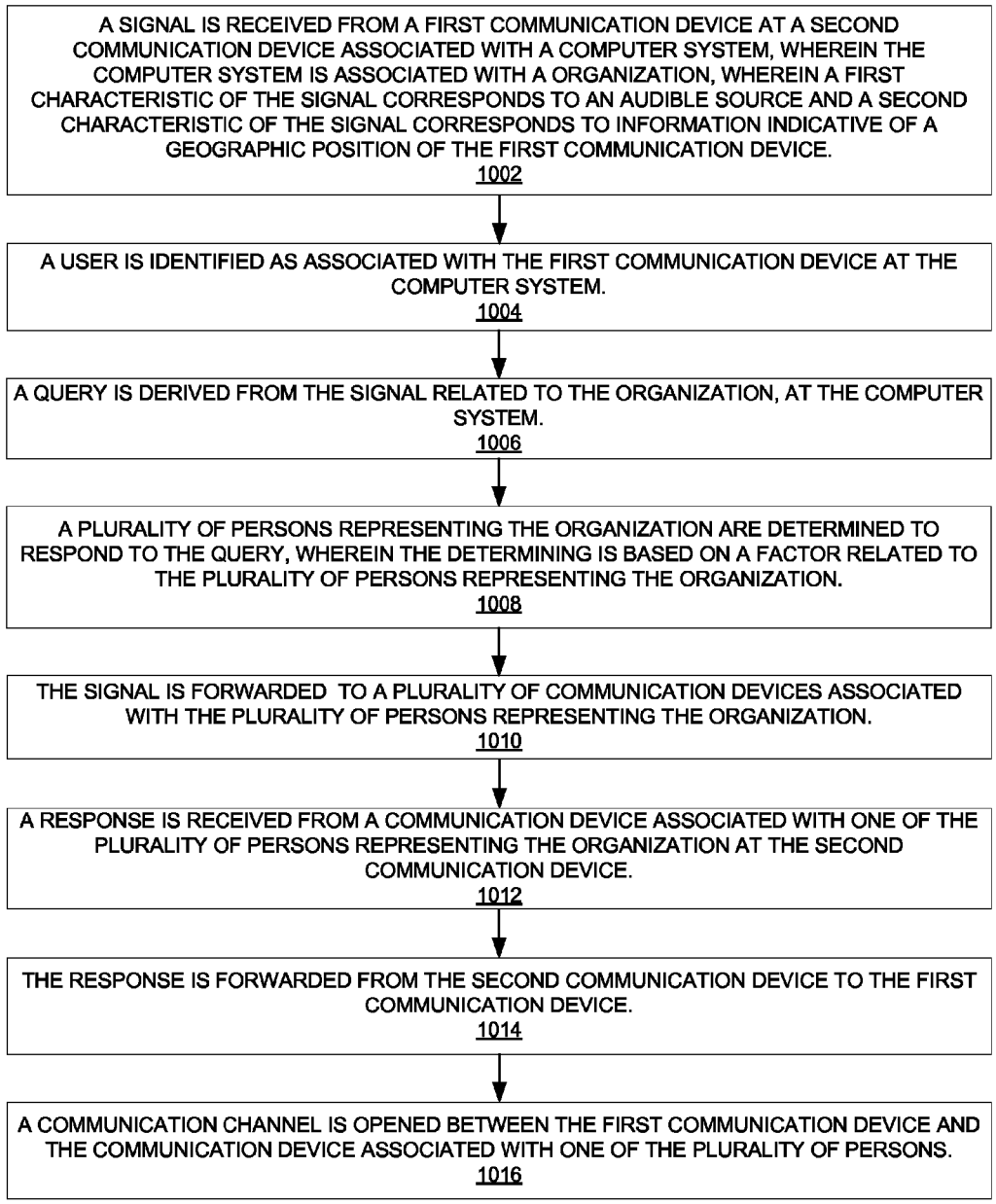
FIG. 10 illustrates a flowchart of an example method for performing communications in an of observation platforms in accordance with embodiments of the present technology.

FIG. 10 is a flowchart illustrating process 1000 for performing structured communications in an observation platform in accordance with one embodiment of the present technology. Process 1000 may also be described as disciplining communications in an observation platform. In one embodiment, process 1000 is a computer implemented method that is carried out by processors and electrical components under the control of computer usable and computer executable instructions. The computer usable and computer executable instructions reside, for example, in data storage features such as computer usable volatile and non-volatile memory. However, the computer usable and computer executable instructions may reside in any type of computer usable storage medium. In one embodiment, process 1000 is performed by the components of FIG. 1A, 1B, 1C or 2. In one embodiment, the methods may reside in a computer usable storage medium having instructions embodied therein that when executed cause a computer system to perform the method.

At 1002, a signal is received from a first communication device at a second communication device associated with a computer system, wherein the computer system is associated with an organization, wherein a first characteristic of the signal corresponds to an audible source and a second characteristic of the signal corresponds to information indicative of a geographic position of the first communication device. Additional characteristics of the signal may include contextual information and environmental information. For example, the audible source may the voice of a user, the signal characteristics may include signal signature information and contextual or environmental information may include user status (e.g., engaged, available or on-break) and/or background noise or sub-audible signal levels. The organization may be a retail environment, a school, an event, a hospitality organization, a military organization, a prison organization, customer service, manufacturing organization, a factory, a disaster response team, or any environment where humans interact with one another to accomplish a purpose. The first communication device may be a handheld or fixed device that is capable of sending and receiving signals and may comprise a display, a microphone and a speaker. The first communication device may be owned by the organization and issued to the user or may be the user's personal property such as a smart phone executing an application. The second communication device may be a radio base station as described herein. It should be appreciated that the signal may actually be a plurality of signals. For example, a first signal may be a transmission of the first characteristic corresponding to the audible source and the second signal may be the second characteristic corresponding to the information indicative of geographic position of the first communication device.

At 1004, a user is identified as associated with the first communication device at the computer system. The actual identity of the user may remain anonymous to the computer system or the user may be identified. The user may be identified using one or a combination of several different techniques.

At 1006, a query is derived from the signal related to the organization, at the computer system. The query may be any number of queries from the user. The user may ask for general assistance or may ask a more specific question such as whether an item is in stock, where an item is located, what sales are taking place, technical details or features regarding an item.

At 1008, a plurality of persons representing the organization are determined to respond to the query, wherein the determining is based on a factor related to the plurality of persons representing the organization.

At 1010, the signal is forwarded to a plurality of communication devices associated with the plurality of persons representing the organization. Such a series of communications may be described as a one-to-many communication. The "many" group may be default or predefined group such as all those associated with a given department or all those who are associated with a given area of expertise. Groups may also be created based on criteria such as names, locations, roles, skills, talents, interests, social engagement quotient and/or either engagement or availability or status.

At 1012, a response is received from a communication device associated with one of the plurality of persons representing the organization at the second communication device.

At 1014, the response is forwarded from the second communication device to the first communication device. Thus the communication may go from a one-to-many to a one-to-one communication.

At 1016, a communication channel is opened between the first communication device and the communication device associated with one of the plurality of persons. In other words, the communication from the first (originating) user is sent to multiple persons. The first person to respond enters into a communication channel between the first communication device and the communication device associated the person. Others who respond within a pre-determined timeframe are also included in the "channel." The communication channel may be mediated by the computer system and once all users have entered, may not be overheard by the other persons from the plurality of persons. The usefulness of this structure is that it allows ad-hoc group construction by simply announcing the intent of the group, and only those responding are tied into the private group "channel".

In one embodiment, the communication may go from a one-to-many to a one-to-few communication. The persons in the few of the one-to-few communication may be a subset of the many persons from the one-to-many. For example, the initial communication may be sent to all those persons holding communication devices. The computer system may then open a communication channel between the first person to respond where the channel is also opened to others person representing the store who are associated with a specific role or department. Thus only one person may be actively communicating with the user, but other persons may hear the communications and may join at any time. Thus the communication may not disrupt those who are otherwise not interested.

Figure 11:
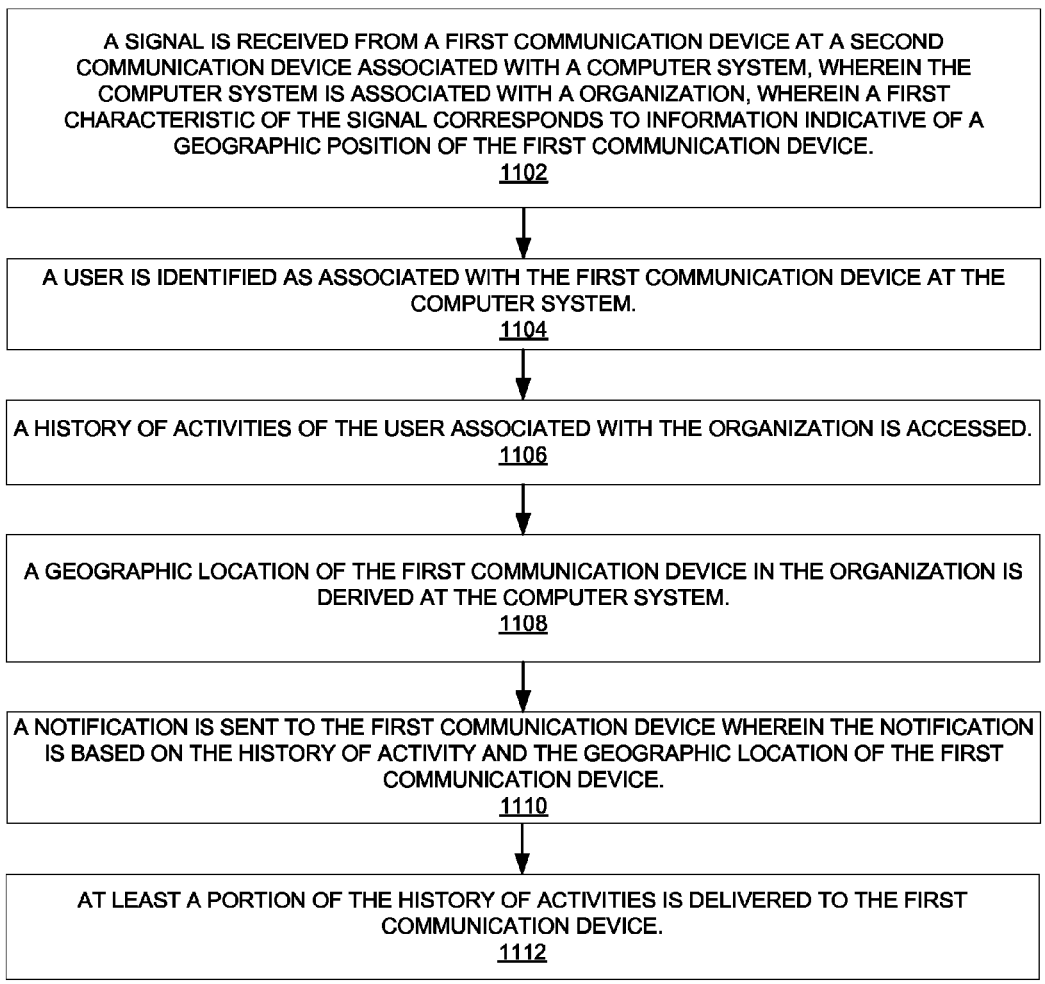
FIG. 11 illustrates a flowchart of an example method for performing communications in an of observation platforms in accordance with embodiments of the present technology.

FIG. 11 is a flowchart illustrating process 1100 for sending notifications in an observation platform in accordance with one embodiment of the present technology. Process 1100 may also be described as disciplining communications in an observation platform. In one embodiment, process 1100 is a computer implemented method that is carried out by processors and electrical components under the control of computer usable and computer executable instructions. The computer usable and computer executable instructions reside, for example, in data storage features such as computer usable volatile and non-volatile memory. However, the computer usable and computer executable instructions may reside in any type of computer usable storage medium. In one embodiment, process 1100 is performed by the components of FIG. 1A, 1B, 1C or 2. In one embodiment, the methods may reside in a computer usable storage medium having instructions embodied therein that when executed cause a computer system to perform the method.

At 1102, a signal is received from a first communication device at a second communication device associated with a computer system, wherein the computer system is associated with an organization, wherein a first characteristic of the signal corresponds to information indicative of a geographic position of the first communication device. The organization may be a retail environment, a school, an event, a hospitality organization, a military organization, a prison organization, customer service, manufacturing organization, a factory, a disaster response team, or any environment where humans interact with one another to accomplish a purpose. The first communication device may be a handheld device that is capable of sending and receiving signals and may comprise a display, a microphone and a speaker. The first communication device may be owned by the organization and issued to the user or may be the user's personal property such as a smart phone executing an application. The second communication device may be a radio base station as described herein. It should be appreciated that the signal may actually be a plurality of signals. For example, a first signal may be a transmission of the first characteristic corresponding to the audible source and the second signal may be a second characteristic corresponding to the information indicative of geographic position of the first communication device.

At 1104, a user is optionally identified as associated with the first communication device at the computer system. The actual identity of the user may remain anonymous to the computer system or the user may be identified. The user may be identified using one or a combination of several different techniques.

At 1106, a history of activities of the user associated with the observation platform is accessed. The history of activities may be a user history, device history or user profile that may or may not identify the user. The history may have a list of all the prior contextual information of this user. The history may also comprise information provided by the user such as likes and dislikes or preferences regarding which system characteristics or behaviors the user wants to experience while using the device. In one example, a user acting as a shopper, may describe her likes, dislikes, preferences and/or interests. In this case, the computer combines the contextual information such as location and motion, with spoken information and other related data to match the user preferences with another user on the system, such as a sales associate. The computer may attempt to find the preferential associate(s) and notify them that the shopper is in the store, possibly including other helpful information such as: where the shopper is located, how are they moving (motion vector), what is their name if they have identified themselves, what they are saying, what they are listening to, prior pattern of motion and dwell locations and/or any other relevant contextual data or social engagement quotient information. In addition, he associates contacted may hear prior conversations with that shopper to refresh their memory and aid in making the shopper experience seamless or may be updated on prior Point of Sale (POS) information from a separate computer system.

At 1108, a geographic location and possibly a motion vector of the first communication device in the organization is derived at the computer system. For example, the computer system may determine that the user is on a given aisle such as the cereal aisle in a grocery store or in a zone that may correlate to a department such as the lumber department in a hardware store.

At 1110, a notification is sent to the first communication device wherein the notification is based on the history of activity and the geographic location and/or motion of the first communication device. For example, the notification may alert the user of a coupon or special on a given item in the organization that is for sale. The coupon or special may be for an item that the user previously purchased which knowledge was obtained by the computer system based on the history of user activity or stored in a separate computer system. The notification maybe any number of notifications including a text message or an audible message and the notification may be accompanied by an alert such as a vibration, LED indication, or an audible sound. The history of activity may be utilized to automatically connect communications from the user to a person with whom the user has prior interactions.

At 1112, at least a portion of the history of activities is delivered to the first communication device. Such information may be used the user to determine what items the user previously purchased. For example, the user may wish to purchase the same item again or a related item, but does not remember the exact details of the item; or the user may wish to avoid purchasing the same item. The user may also use the information to identify a person representing the organization with whom the user wishes to interact with again. For example, the user may have had a pleasant experience with a given sales associate and know that sales associate can meet the user's needs. In one embodiment, step 1112 is not performed as part of process 1100.

Process 1100 may be used in conjunction with a loyalty program involving lotteries or coupons that may be in existence before the communications platform is implemented in the organization or may be created based on the communications platform or a combination of the two.

Figure 12:
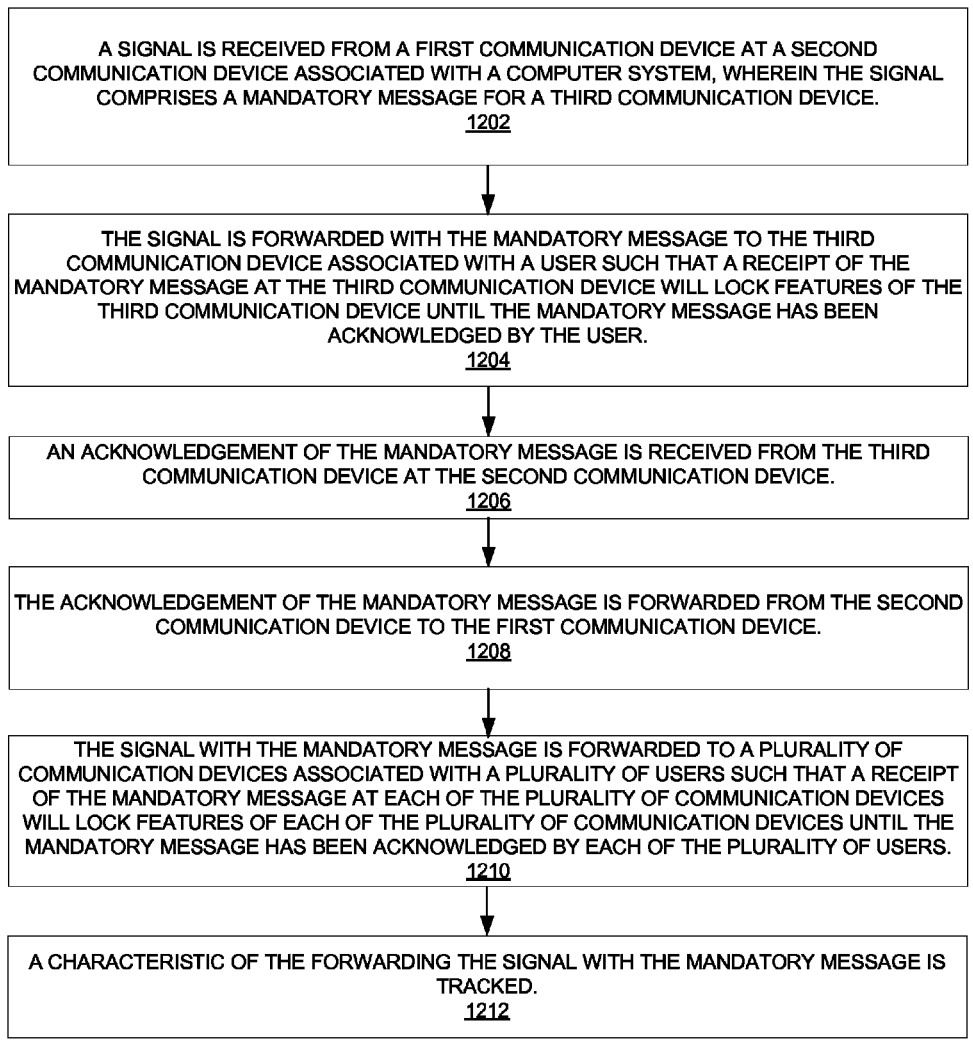
FIG. 12 illustrates a flowchart of an example method for performing communications in an of observation platforms in accordance with embodiments of the present technology.

FIG. 12 is a flowchart illustrating process 1200 for performing structured communications in an observation platform in accordance with one embodiment of the present technology. Process 1200 may also be described as disciplining communications in an observation platform. In one embodiment, process 1200 is a computer implemented method that is carried out by processors and electrical components under the control of computer usable and computer executable instructions. The computer usable and computer executable instructions reside, for example, in data storage features such as computer usable volatile and non-volatile memory. However, the computer usable and computer executable instructions may reside in any type of computer usable storage medium. In one embodiment, process 1200 is performed by the components of FIG. 1A, 1B, 1C or 2. In one embodiment, the methods may reside in a computer usable storage medium having instructions embodied therein that when executed cause a computer system to perform the method.

At 1202, a signal is received from a first communication device or other computer system at a second communication device associated with a computer system, wherein the signal comprises a mandatory message for a third communication device. For example, the mandatory message may be a message that is required to be delivered to each employee associated with an organization and an acknowledgement must be received and recorded. The requirement may be a legal requirement to notify employees of certain information or may be requirement implemented by the organization. The mandatory message may be delivered as an audible message or a text message. The mandatory message may also direct a user to a location where more information may be found. In another example, the mandatory message may be a request for additional assistance for a specific location or task, such as opening another cash register line or attending to shoppers needing mobile POS services.

At 1204, the signal is forwarded with the mandatory message to the third communication device associated with a user such that a receipt of the mandatory message at the third communication device will lock features of the third communication device until the mandatory message has been acknowledged by the user. For example, the third communication device may be a handheld device and may have features such as the ability to communicate with other devices or the ability to connect to other devices such as a computer system and may be used to access information from a database. Upon receipt of the mandatory message, some or all of the features of the communication device may be locked or altered meaning that the user is not able to access the features or must experience a different behavior of the observation platform. For example, upon receipt of the mandatory message the communication device may lock, disable or alter the ability to communicate with other devices.

At 1206, an acknowledgement of the mandatory message is received from the third communication device at the second communication device. The acknowledgement may be generated manually by the user of the third communication device or may be automatically generated. For example, upon receipt of the mandatory message, the third communication device may display an option to access the mandatory message. Once the user accesses the message, the acknowledgement may be sent automatically, or an option may be presented to the user to send the message. In one embodiment, the user is required to create an acknowledgement message or action to send back. The acknowledgement message may be a text, button press or audible message created by the user.

At 1208, the acknowledgement of the mandatory message is forwarded from the second communication device to the first communication device. In one embodiment, the locked features of the third communication device may be unlocked in response to the user of the second communication device accessing and/or acknowledging the mandatory message. In one embodiment, the locked features of the third communication device may be unlocked in response the computer system receiving the action of the second communication device. In one embodiment, the locked or altered features of the third communication device may be modified in response to the user of the first communication device receiving the acknowledgement or taking other action to drop the request.

At 1210, the signal with the mandatory message is forwarded to a plurality of communication devices associated with a plurality of users such that a receipt of the mandatory message at each of the plurality of communication devices will lock or alter the features of each of the plurality of communication devices until the mandatory message has been acknowledged by each of the plurality of users, if required, or a single responder, if required. The plurality of users in this case may be further determined based factors such as responsibilities, roles, groupings, talents, interests, location and/or motion, or social engagement factors. In one example, a request for additional help with customer POS and/or mobile POS (mPOS) may be initiated which might be directed to a group of sales associates with contextual information such as: qualified for register work, designated as a register support back up person at this time, located near the register or mPOS area needing assistance, and not currently in an engaged state. In this example, the altered features may include the playing of messages or sounds in the ear, activation of LEDs or screen displays or physical vibration.

At 1212, a characteristic of the forwarding the signal with the mandatory message is tracked. In one embodiment, the system tracks the time the message was sent, when it was heard by the user, and when and where the user was located when they acknowledged. Associated with the statistical information is a speech file of what the user said. This feature is ideal for communicating policy or liability information and assuring that that information was received and understood. It should be appreciated that there is more than one type or class of mandatory messages. Each type or class may have different requirements for the delivery and/or acknowledgement. In the case of the example above, the system might track such characteristics as: who responded, when (how quickly) they responded, where they responded, how they moved (speed and direction), and how long it took them to arrive at the required location.

Figure 13:
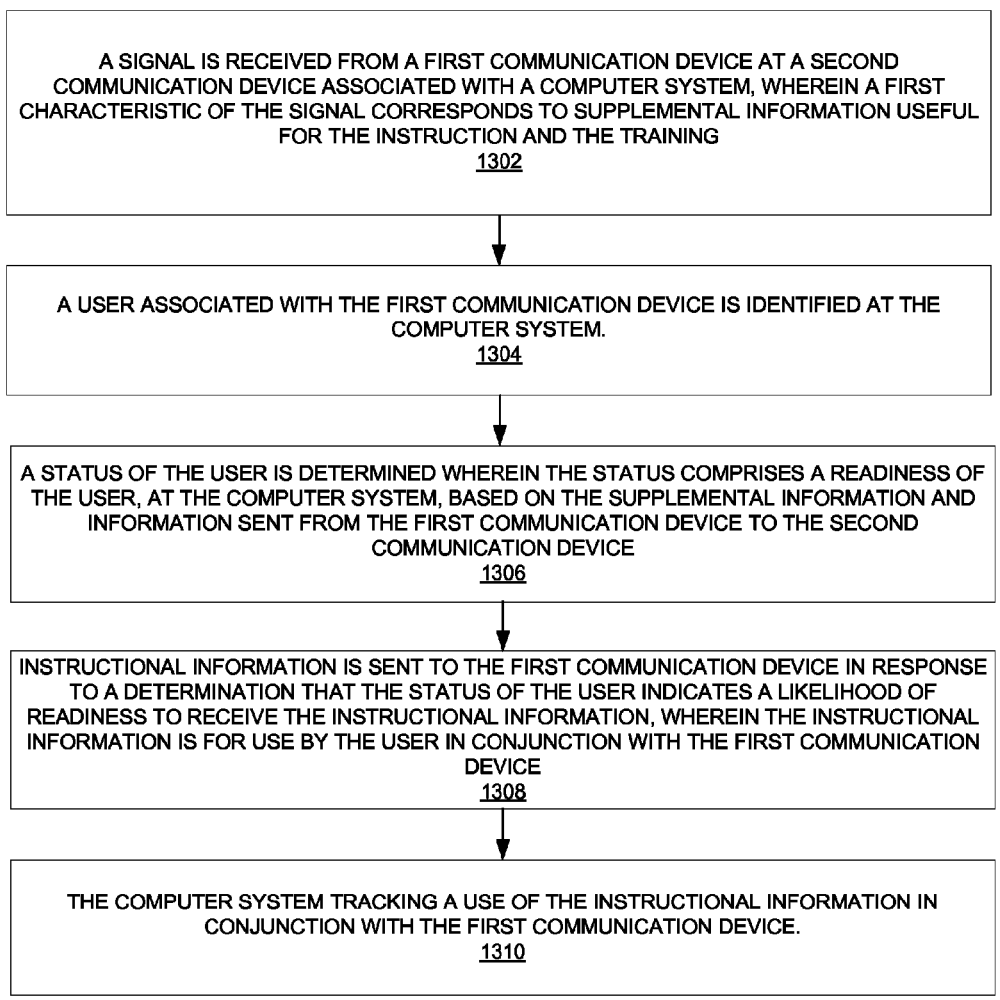
FIG. 13 illustrates a flowchart of an example method for structured training in an observation platform in accordance with embodiments of the present technology.

FIG. 13 is a flowchart illustrating process 1300 for structured training in an observation platform in accordance with one embodiment of the present technology. Process 1300 may also be described as disciplining communications in an observation platform. In one embodiment, process 1300 is a computer implemented method that is carried out by processors and electrical components under the control of computer usable and computer executable instructions. The computer usable and computer executable instructions reside, for example, in data storage features such as computer usable volatile and non-volatile memory. However, the computer usable and computer executable instructions may reside in any type of computer usable storage medium. In one embodiment, process 1300 is performed by the components of FIG. 1A, 1B, 1C or 2. In one embodiment, the methods may reside in a computer usable storage medium having instructions embodied therein that when executed cause a computer system to perform the method.

At 1302, a signal is received from a first communication device at a second communication device associated with a computer system, wherein a first characteristic of the signal corresponds to supplemental information useful for the instruction and the training. Additional characteristics of the signal may include information indicative a geographic location of the first communication device, a characteristic corresponding to an audible or sub-audible source, contextual information and environmental information. Moreover, a second signal may be sent as part of the overall communication that contains the additional characteristics. For example, the audible source may be the voice of a user, the signal characteristics may include signal signature information and contextual or environmental information may include user status (e.g., engaged, available or on-break) and/or background noise levels or subaudible signals. The supplemental information may be useful for establishing and running a process for delivering information, alerts, instruction or a training module to an individual or group of individuals. The supplemental information may include information related to a location determination, environmental surroundings including audio and sub-audible information, user habits, user identification, button presses, or other external influences of the system.

The first communication device may be a handheld device that is capable of sending and receiving signals and may comprise a display, a microphone and a speaker. The first communication device may be owned by an organization and issued to the user or may be the user's personal property such as a smart phone executing an application. The second communication device may be a radio base station as described herein may be a second handheld device.

At 1304, a user associated with the first communication device is identified at the computer system. The user may be identified as an employee, manager, or other person employing the observation platform. The user may be identified by the user's name, a username, an employee number, a phone number, etc. The identity of the user may be employed to select an appropriate training module in that is sent at step 1308. For example, there may be a list of training modules that the user is required to complete. The computer system may be tied to a database that tracks which training modules have been completed by the user and thus the computer system may send a training module to the user that has not yet been completed.

At 1306, a status of the user is determined wherein the status comprises a readiness of the user, at the computer system, based on the supplemental information and information sent from the first communication device to the second communication device. For example, the user may indicate to the computer system the status of the user. The user may indicate that she is available for training, or may indicate that she is engaged, unavailable, or busy and should not receive a training module. The user may manually indicate this status by pressing buttons on the first communication device or by issuing voice commands to the device. The computer system may also infer or determine that a user is busy based on the communication signals sent by the communication device associated with the user. For example, if the user is communicating with another device then the computer system may infer that the user is busy and not available for training. In one embodiment, the user may schedule a time for training. For example, the user may schedule training at the beginning of a work shift or a break period.

The geographic location of the user or the first communication device may be employed to determine which training module is to be sent to the device. For example, the user may be an associate or other user in a retail setting with multiple departments. The associate may be required to complete training modules associated with each of the departments. The computer system may determine that the associate is available for training and that the associated is located in the lumber department. The computer system may then determine that the training module for the lumber department should be sent to the first communication device. Moreover, the location of the user may indicate the user's availability for training. For example, if an employee is located in a break room then it may be automatically determined that the employee is available for training.

At 1308, instructional information is sent to the first communication device in response to a determination that the status of the user indicates a likelihood of readiness to receive the instructional information, wherein the instructional information is for use by the user in conjunction with the first communication device. The instructional information may be a training module or data on how a user may obtain a training module. A training module may be instructional information designed to teach or train the user. The instructions may be related to the use and features of the first communication device in the observation platform. The instructions may also be related to the user's education of information related to an organization employing the observation platform. For example, the organization may be a retail setting and the user is a sales associate. The training module may then be related to the policies and procedures of the retail setting or information regarding the products being sold. The training module may comprise content that is audio, video, graphical, textual, or any combination thereof. The content may be displayed or played using the first communication device. For example, the audio may be played into headphones connected to the first communication device worn by the user. Textual and other visual data may be displayed on a screen of the first communication device.

The training module may be streamed to the user. In other words, the first communication device may not receive all of the content in one download or transmission. The first communication device may receive a stream of data and display or play the stream of data as it is received without saving the data into storage at the device. In such an example the user may have the ability to pause, suspend or repeat the training. In one embodiment, the user may be available and begin a training module, but may become engaged or unavailable part way through completing the training module. The user may indicate this status to the computer system and then resume the training module at a time when the user is available again. The computer system may store the partial completion of the training module and where the user left off in the stream. The training module need not be streamed to the communication device and may instead be downloaded to the communication device from the computer system or another data base. Alternatively, the communication device may be pre-loaded with training modules before it is employed by the user. The pre-loading or downloading may be accomplished via well known techniques for transferring data between two networked electronic devices.

The training module may be described as an instructional audio stream, or audio "informercials," so that associates, supervisors, managers or other users can learn more about products, culture, brand identity or system usage. This training information can be distributed based on priority and user location. For example a non-urgent product snippet might only play when an employee enters the break room or the stock room. Another type of training might be triggered by an employee nearing a certain area or object. A priority message might play whenever the employee is not "engaged" with a shopper. Another way training "podcasts" can be heard is by the employee requesting a training stream via speech command. In this case, the employee can hear the stream in the background while going about her business and can suspend the training any time by pressing the "engaged" button.

The use of the training module may be described as a virtual training room where detailed information can be delivered upon command or specified actions. A button action such as engaged/interrupt would suspend training if shoppers need assistance or a task needs concentration. Users could call up new information, repeat information or continue where they left off with older information. The Training Room could also be a repository for manufacturer or brand-specific information. The retailer or a third party could sell space in the training room to the manufacturers for increasing brand awareness and knowledge. Analytics or tracking may indicate what was heard, when, where and by whom. Recommendations for learning could be associated with where associates spend their time, the context of communications or the groups they are associated with. Contextual and location information is used to share relevant information with associates or others at the right time and place. The information or modules may be prioritized so that the modules can play during the best times for the associates to hear it such as when they arrive or go on break. In another example, product training can be delivered to non-engaged associated in the vicinity of products, motivational information can be scheduled for delivery at certain times of day, new feature introductions can be delivered upon device authentication, management information can be delivered to management groups, communication usage tips can be delivered as employees enter the break room and motivational information might make use of changes in the social engagement quotient to determine who should listen. Another example is that the retailer could sell ear space to manufacturers with differing values depending on the priority and/or location with which it is delivered to the associates.

At 1310, the computer system tracking a use of the instructional information in conjunction with the first communication device. The computer system may be capable of tracking which users have completed training modules including the time and place the training modules were completed. Such information could be used by management in a retail setting to determine which users are completing required training. Additionally, managers or others may use information to determine if the training modules are being used in the intended manner. For example, an employee may always complete training modules in the same location and not in the location they were intended to be completed in. Thus, observational metrics will show who hears what, where and when. Additionally, measurements of social engagement quotient or social factors may be compared before and after motivational or inspirational training messages.

FIG. 14 is a flowchart illustrating process 1400 for monitoring communications in an observation platform in accordance with one embodiment of the present technology. Process 1400 may also be described as disciplining communications in an observation platform. In one embodiment, process 1400 is a computer implemented method that is carried out by processors and electrical components under the control of computer usable and computer executable instructions. The computer usable and computer executable instructions reside, for example, in data storage features such as computer usable volatile and non-volatile memory. However, the computer usable and computer executable instructions may reside in any type of computer usable storage medium. In one embodiment, process 1400 is performed by the components of FIG. 1A, 1B, 1C or 2. In one embodiment, the methods may reside in a computer usable storage medium having instructions embodied therein that when executed cause a computer system to perform the method.

At 1402, at least one signal of a plurality of communication signals is monitored via a computer system between a first communication device and a second communication device wherein a first characteristic of the at least one signal corresponds to an audible source and a second characteristic of the at least one signal corresponds to information indicative of a geographic position of the first communication device. Additional characteristics of the signal may include contextual information and environmental information. For example, the audible source may be the voice of a user, the signal characteristics may include signal signature information and contextual or environmental information and may include user status (e.g., engaged or on-break) and/or background noise levels. The first communication device may be a handheld device that is capable of sending and receiving signals and may comprise a display, a microphone and a speaker. The first communication device may be owned by an organization and issued to the user or may be the user's personal property such as a smart phone executing an application. The second communication device may be a radio base station as described herein may be a second handheld device. It should be appreciated that the signal may actually be a plurality of signals. For example, a first signal may be a transmission of the first characteristic corresponding to the audible source and the second signal may be the second characteristic corresponding to the information indicative of geographic position of the first communication device.

The monitoring may be repeated or may occur simultaneously for a plurality of communication signals. Such signals may be from a plurality of communication devices. For example, the first communication device may communicate with a plurality of other devices, or other devices not including the first communication device may all be communicating a multiple number of times within the observation platform. Process 1400 may occur for a single signal or a plurality of signals.

At 1404, a determination is made that a user associated with the first communication device is experiencing an issue with a feature of the first communication device. An issue may be defined to be any number of difficulties, errors, malfunctions, or other problems experienced by the user who is using the first communication device. In one embodiment, the user may not know how to properly use the device or all of its features. For example, the user may not know how to send a message, how to receive a message, how to send acknowledgements, how to change the volume, how to indicate a status of the user, etc. The user may or may not know that they are experiencing such an issue.

In one embodiment, the user may be under-utilizing the device by not using all of the available features. For example, the user may not know that they are able to ask for assistance via the device, or may not know what type of assistance that they may request. The computer system may determine that a user is in need of assistance based on one or more characteristics such as: the geographic location or a pattern of geographic locations of the user within a setting, motion and speed of the user, pattern of features used by the user, what the user has been hearing and how they have or have not responded to hearing, button press patterns, speech command patterns and changes in the social engagement factors while using the device. The computer system may then determine that the user is under-utilizing, over-utilizing or misusing the device.

In one embodiment, the computer may determine that the user is re-issuing the same commands to the device and determine that the result desired by the user has not been achieved. The computer system may then determine that a training module may assist the user in learning which alternative commands may be issued to achieve the results desired by the user. For example, the training module may teach the user specific phrases or actions that may be used to achieve desired results. The training module may inform the user regarding the communications phrases described in process 300 herein. In other words, if the observation platform monitors a user having difficulty with a command or function, it can automatically send a short audio script to the user with corrective actions.

In one embodiment, the computer system determines or anticipates that the user is in need of tech support. The anticipation may be based on commands issued to the device by the user, button presses or other actions taken by the user, a geographic location of the user, speech to text conversion of audible portions of the signal with an algorithm searching for key phrases in the text, an analysis of voice stress, or any combination thereof. The tech support may be offered in the form of a training module or live audible support via the first communication device in contact with a tech support representative. The tech support function may be associated with the organization employing the observation platform or may be provided through a third party.

At 1406, an invitation for a training module is sent from the computer system to the first communication device, wherein the training module is for use by the user in conjunction with the first communication device. The invitation to the device may be audible, textual, visual, or a combination thereof. The invitation may offer more than one training module options to the user. The user may then select the most relevant option. Live tech support may also be offered to the user. The training modules may instruct the user in how to use the communication device. The training modules may be similar to the training modules described in process 1300.

At 1408, the training module is sent to the first communication device in response to receiving an acceptance of the invitation. For example, the user may audibly accept an invitation using key phrases. The key phrases may be one of a list of key phrases that the computer system will recognize or may be given to the user with the invitation. In one embodiment, the user presses a button on the first communication device to accept the invitation.

Process 1400 demonstrates how to use the observation platform to monitor how users behave using the platform. The result of such monitoring can reduce field support costs and can even anticipate problems before the user tries to make contact for support. User behavior monitoring improves the product and software continuously and those improvements may then be shared with other observation platform users outside of the organization which initially captured the user behavior. These improvements may be offered as a service by those supplying the observation platform to various organizations.

Figure 15:
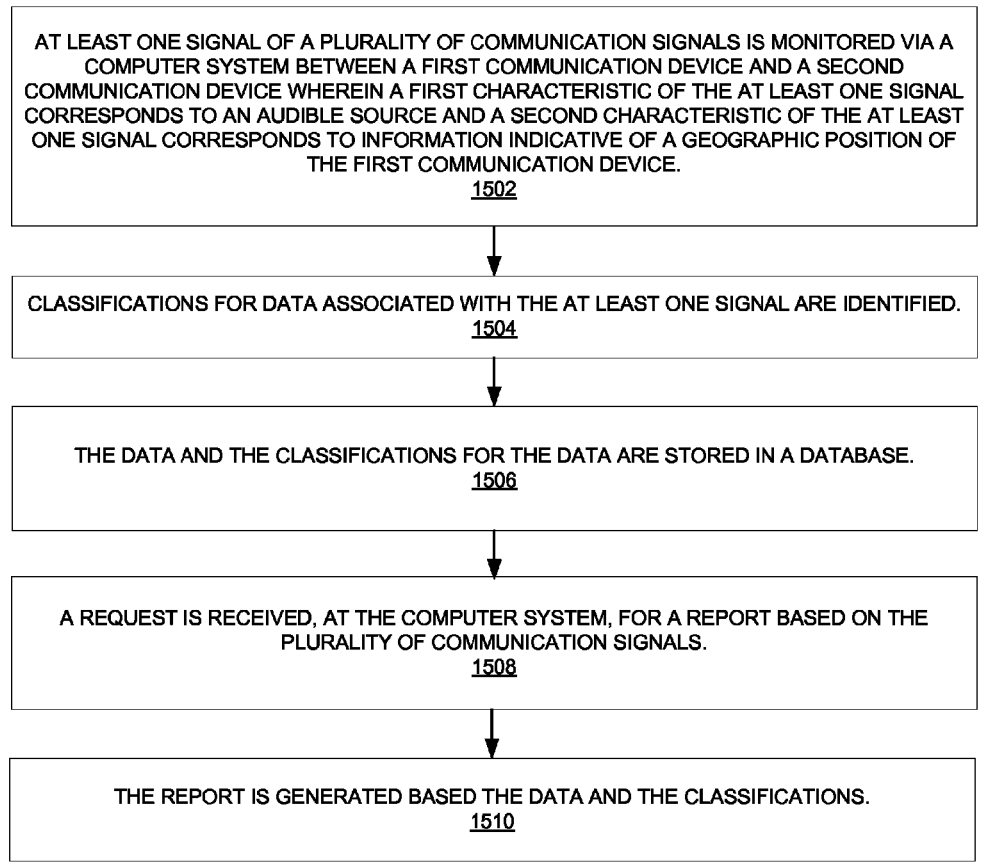
FIG. 15 illustrates a flowchart of an example method for mining data in an observation platform in accordance with embodiments of the present technology.

FIG. 15 is a flowchart illustrating process 1500 for mining data in an observation platform in accordance with one embodiment of the present technology. Process 1500 may also be described as disciplining communications in an observation platform. In one embodiment, process 1500 is a computer implemented method that is carried out by processors and electrical components under the control of computer usable and computer executable instructions. The computer usable and computer executable instructions reside, for example, in data storage features such as computer usable volatile and non-volatile memory. However, the computer usable and computer executable instructions may reside in any type of computer usable storage medium. In one embodiment, process 1500 is performed by the components of FIG. 1A, 1B, 1C or 2. In one embodiment, the methods may reside in a computer usable storage medium having instructions embodied therein that when executed cause a computer system to perform the method.

At 1502, at least one signal of a plurality of communication signals is monitored via a computer system between a first communication device and a second communication device wherein a first characteristic of the at least one signal corresponds to an audible source and a second characteristic of the at least one signal corresponds to information indicative of a geographic position of the first communication device. Additional characteristics of the signal may include contextual information and environmental information. For example, the audible source may be the voice of a user, the signal characteristics may include signal signature information and contextual or environmental information may include user status (e.g., engaged or on-break) and/or background noise levels. The first communication device may be a handheld device that is capable of sending and receiving signals and may comprise a display, a microphone and a speaker. The first communication device may be owned by an organization and issued to the user or may be the user's personal property such as a smart phone executing an application. The second communication device may be a radio base station as described herein may be a second handheld device. It should be appreciated that the signal may actually be a plurality of signals. For example, a first signal may be a transmission of the first characteristic corresponding to the audible source and the second signal may be the second characteristic corresponding to the information indicative of geographic position of the first communication device.

The monitoring may be repeated or may occur simultaneously for a plurality of communication signals. Such signals may be from a plurality of communication devices. For example, the first communication device may communicate with a plurality of other devices, or other devices not including the first communication device may all be communicating a multiple number of times within the observation platform. Process 1400 may occur for a single signal or a plurality of signals.

At 1504, classifications for data associated with the at least one signal are identified. The classifications may or may not be related to features or portions of the signal that are not the communication itself. In other words, the communication itself may be an audible or text message from one user to the other, but the communication also carries secondary data such as the time the communication was sent, or the location of the device when the communication was sent, etc.

In one embodiment, the classifications are related to the non-message portion of the communication and may comprise the time the message was sent, who sent the message, the length of the message, who the message was sent to, what the user listened to or heard, the length of listening, the type of data in the message (i.e. audible, textual, etc.), At 1506, the data and the classifications for the data are stored in a database. The data base may be part of the computer system or may be stored in another location accessible by the computer system. In one embodiment the data base is a MySQL data base.

At 1508, a request is received, at the computer system, for a report based on the plurality of communication signals. The request may comprise an inquiry or a request for a certain type of report. For example, the request may ask for the number of communications in the observation platform for a given period of time for all devices within the platform. Or the request may be for all instances of communications from one user including the time, length, and to whom the communication was sent. Or the request may be for all communications between two users. Or the request may be for a geographic location of a user prior to, during, or following communications from the user. Any number of requests may be made for a report based on the message and non-message portions of the communications. Alternatively, the request may be sent to a hardware device associated with the observation platform other than the computer system that has access to the database.

At 1510, the report is generated based the data and the classifications. The report may comprise the message portion of the communication or only non-message data related to the communication that is generated based on the classifications. The report can be generated to show the frequency of communications from a user, or the frequency from one user to a second user. Movements of a user or a group of users may be inferred based on the location of the users prior to, during and following the communications. The report can separate what the user says to whom and what the user listens to and from what source. Such reports may be useful to make inferences about user behavior. For example, in a retail setting a manager or others may use the reports to infer that an associate is located in an appropriate zone of the retail setting in a given time frame and quickly responds to requests for assistance from customers. Alternatively, a manager may infer that two given associates communicate too frequently with one another and during times that they should not be communicating. It should be appreciated that the variety of reports that may be generated may be useful for a great number of purposes. In one embodiment, the reports are generated automatically in response to parameters established within the observation platform. For example, a computer system may be commanded to automatically produce a daily report for all communication associated with a given user. The report may be generated at the computer system and may be displayed at the computer system and may be sent to another device.

Figure 16:
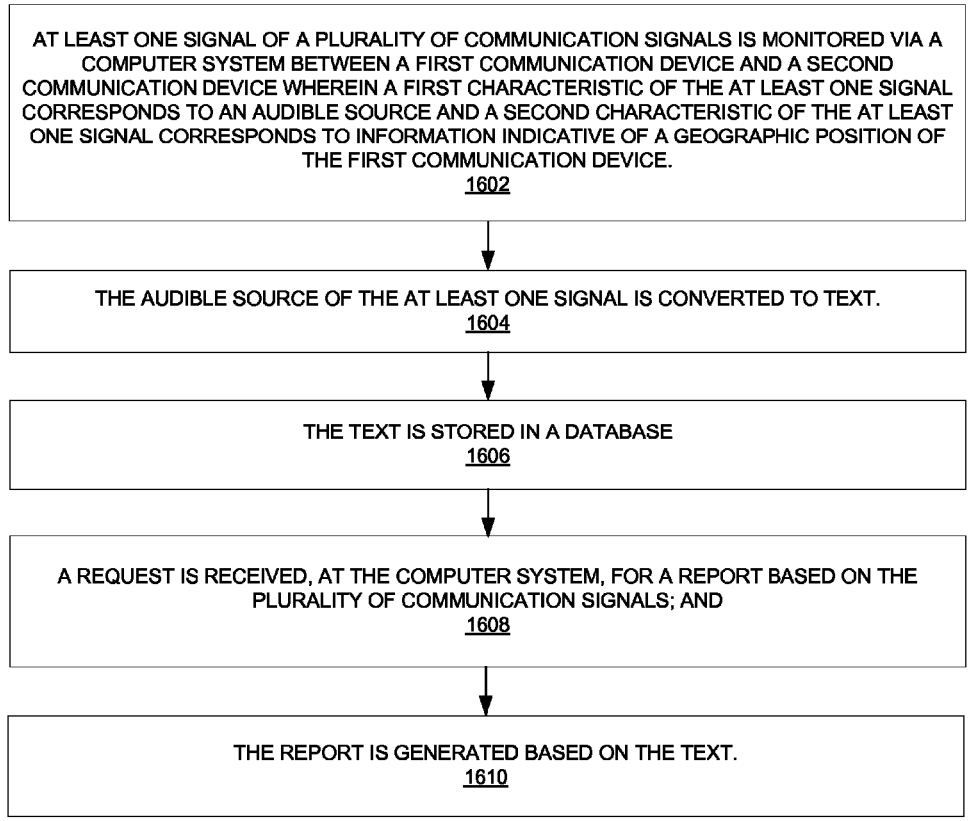
FIG. 16 illustrates a flowchart of an example method for mining data in an observation platform in accordance with embodiments of the present technology.

FIG. 16 is a flowchart illustrating process 1600 for mining data in an observation platform in accordance with one embodiment of the present technology. Process 1600 may also be described as disciplining communications in an observation platform. In one embodiment, process 1600 is a computer implemented method that is carried out by processors and electrical components under the control of computer usable and computer executable instructions. The computer usable and computer executable instructions reside, for example, in data storage features such as computer usable volatile and non-volatile memory. However, the computer usable and computer executable instructions may reside in any type of computer usable storage medium. In one embodiment, process 1600 is performed by the components of FIG. 1A, 1B, 1C or 2. In one embodiment, the methods may reside in a computer usable storage medium having instructions embodied therein that when executed cause a computer system to perform the method.

At 1602, at least one signal of a plurality of communication signals is monitored via a computer system between a first communication device and a second communication device wherein a first characteristic of the at least one signal corresponds to an audible source and a second characteristic of the at least one signal corresponds to information indicative of a geographic position of the first communication device. Additional characteristics of the signal may include contextual information and environmental information. For example, the audible source may be the voice of a user, the signal characteristics may include signal signature information and contextual or environmental information may include user status (e.g., engaged, available or on-break) and/or background noise levels. The first communication device may be a handheld device that is capable of sending and receiving signals and may comprise a display, a microphone and a speaker. The first communication device may be owned by an organization and issued to the user or may be the user's personal property such as a smart phone executing an application. The second communication device may be a radio base station as described herein may be a second handheld device. It should be appreciated that the signal may actually be a plurality of signals. For example, a first signal may be a transmission of the first characteristic corresponding to the audible source and the second signal may be the second characteristic corresponding to the information indicative of geographic position of the first communication device.

The monitoring may be repeated or may occur simultaneously for a plurality of communication signals. Such signals may be from a plurality of communication devices. For example, the first communication device may communicate with a plurality of other devices, or other devices not including the first communication device may all be communicating a multiple number of times within the observation platform. Process 1400 may occur for a single signal or a plurality of signals.

At 1604, the audible source of the at least one signal is converted to text or other language recognized by a computer. Well known techniques may be employed for such a conversion. The audible portion of the signal may be described as the message portion of the signal.

At 1606, the text is stored in a database. The data base may be part of the computer system or may be stored in another location accessible by the computer system. In one embodiment the data base is a MySQL data base.

At 1608, a request is received, at the computer system, for a report based on the plurality of communication signals. For example, a manager in a retail setting may request reports regarding communications of associates in the retail setting. The request may be for all communications involving a particular user. Or a request may be for all communications involving key phrases. For example, algorithms may be used to mine the text for the key phrase. A key phrase may be "lumber" and all communications involving the phrase "lumber" would then be included in the report. Automatic reports may be generated based on parameters established within the observation platform. Alternatively, the request may be sent to a hardware device associated with the observation platform other than the computer system that has access to the database.

At 1610, the report is generated based on the text. The report may be generated at the computer system and may be displayed at the computer system and may be sent to another device.

It should be appreciated that processes 300, 400, 500, 600, 700, 800, 900, 1000, 1100, 1200, 1300, 1400, 1500 and 1600 need not carry out each of the described steps to complete its operation. Nor do the steps need to be carried out in the order described. It should be appreciated that processes 300, 400, 500, 600, 700, 800, 900, 1000, 1100, 1200, 1300, 1400, 1500 and 1600, or portions thereof, may be combined with one another using any number of combination. For example, the response from the computer system in process 800 may take place in 900, 1000, 1100 and 1200.

Figure 18:
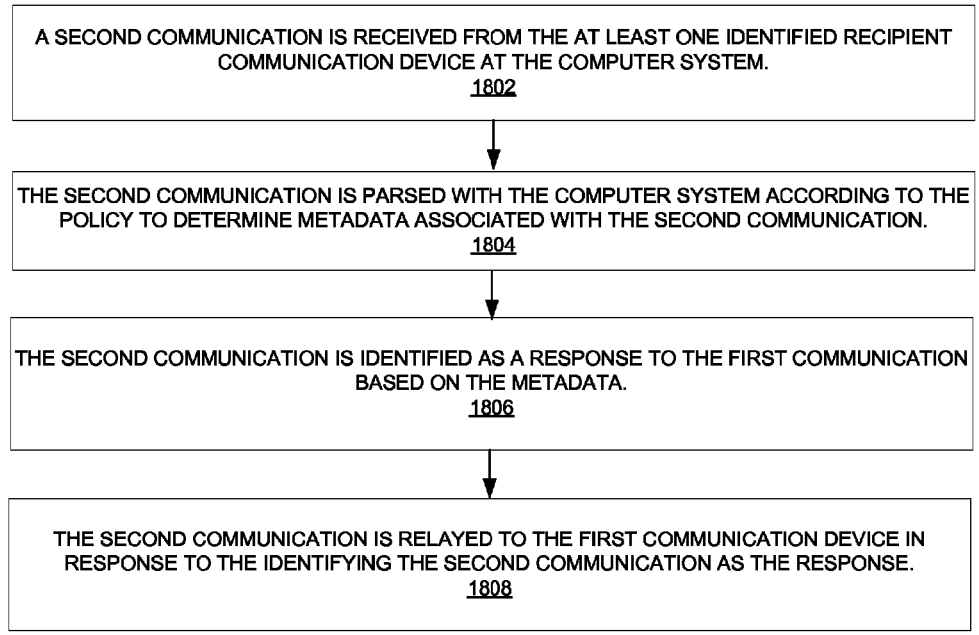
FIG. 18 illustrates a flowchart of an example method for mediating a communication in an observation platform in accordance with embodiments of the present technology.

FIGS. 17 and 18 are flowcharts illustrating processes 1700 and 1800 for mediating data in an observation platform in accordance with one embodiment of the present technology. Processes 1700 and 1800 may also be described as disciplining communications in an observation platform. In one embodiment, processes 1700 and 1800 are computer implemented methods that are carried out by processors and electrical components under the control of computer usable and computer executable instructions. The computer usable and computer executable instructions reside, for example, in data storage features such as computer usable volatile and non-volatile memory. However, the computer usable and computer executable instructions may reside in any type of computer usable storage medium. In one embodiment, processes 1700 and 1800 are performed by the components of FIGS. 1A, 1B, 1C, 1D, or 2. In one embodiment, the methods may reside in a computer usable storage medium having instructions embodied therein that when executed cause a computer system to perform the method.

At 1702, a first communication is parsed with a computer system according to a policy to determine metadata associated with the first communication, wherein the metadata comprises a first set of attributes and wherein the first communication is received at the computer system from a first communication device. For example, first communication 104, computer system 120, policy 114, metadata 108, and device 105 of FIG. 1D may be employed.

At 1704, the first set of attributes is compared to attributes of a plurality of communication devices associated with the observation platform, the comparing performed by the computing system. Such a comparison may employ a matching of attributes, use of attribute inhibitors, a voting system, or a combination thereof.

At 1706, at least one recipient communication device is identified from the plurality of communication devices for the first communication based on the comparing, the identifying performed by the computing system.

At 1708, the first communication is relayed to the at least one identified recipient communication device via the computer system. This may also be described as forwarding the message and may occur in substantially real time. In one embodiment, the first communication is automatically played at the recipient communication device once it is received. The recipient device may respond to the first communication with a second communication as is described in process 1800.

At 1802, a second communication is received from the at least one identified recipient communication device at the computer system. The second communication device may be device 110 of FIG. 1D.

At 1804, the second communication is parsed with the computer system according to the policy to determine metadata associated with the second communication.

At 1806, the second communication is identified as a response to the first communication based on the metadata.

At 1808, the second communication is relayed to the first communication device in response to the identifying the second communication as the response.

Figure 19:
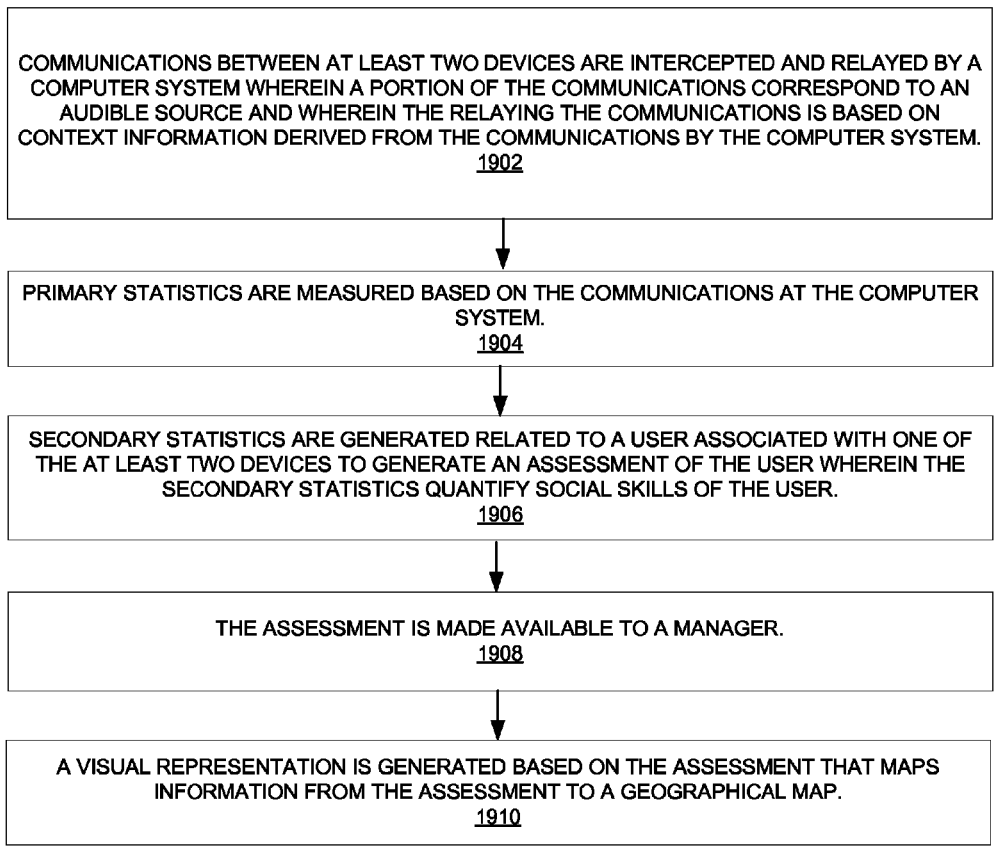
FIG. 19 illustrates a flowchart of an example method for using structured communications to quantify social skills in accordance with embodiments of the present technology.

FIG. 19 is a flowchart illustrating process 1900 for using an observation platform to measure and quantify social skills in accordance with one embodiment of the present technology. In one embodiment, process 1900 shows computer implemented methods that are carried out by processors and electrical components under the control of computer usable and computer executable instructions. The computer usable and computer executable instructions reside, for example, in data storage features such as computer usable volatile and non-volatile memory. However, the computer usable and computer executable instructions may reside in any type of computer usable storage medium. In one embodiment, process 1900 is performed by the components of FIGS. 1A, 1B, 1C, 1D, or 2. In one embodiment, the methods may reside in a computer usable storage medium having instructions embodied therein that when executed cause a computer system to perform the method.

At 1902, communications between at least two devices are intercepted and relayed by a computer system wherein a portion of the communications correspond to an audible source and wherein the relaying the communications is based on context information derived from the communications by the computer system. In other words, the observation platform is employed for intercepting a communication and determining the destination to relay the communication to. The relaying may also employ metadata and policies as described herein. In one embodiment, the communications comprise information indicative of geographic location or position. This information may be the location data itself or may be information that allows the computer system to infer the location. It should be appreciated that a single communication may be sent using one signal may be split into a plurality of signals. For example, a first signal may be a transmission of data pertaining to an audible source and the second signal may be information indicative of a geographic location or other additional information.

At 1904, Primary Statistics are measured based on the communications at the computer system. For example, the computer system may be computer 120 of FIG. 1A. The Primary Statistics may be data related to: engaged or available time(s), locations, locations traversed including speed and direction, listen time, talk time, number of listeners, geographic location of the speakers and listeners, type of communication (e.g., broadcast, private conversations, interruptions, group conversations, announcements, interrupting announcements, mandatory response messages), length of the communication session, initiator of communications, receiver of communications, presence information, keywords spoken or listened to, tone of voice, speech cadence, banter rate, emotion and inflection (as measured by voice stress analysis tools), lengths of speech segments, what policies are used for the communications, when and where two or more individuals dwell in close proximity to each other or to specific locations, the speed of movement and pausing of the listening individuals during/after talking or listening, the frequency that listeners delay hearing a message or drop out from what a speaker is saying, and/or promptness of responses to what was heard, Inertial Measurement Unit (IMU) data, radio signal strength (RSS), signal to noise ratio (SINR), measurements from accelerometer, and (X,Y,Z) location coordinates At 1906, Secondary Statistics are generated related to a user associated with one of the at least two devices to generate an assessment of the user wherein the Secondary Statistics quantify social skills of the user. The Secondary Statistics and assessment quantify the sociability potential and social factors of the user and conveys an ability and/or willingness of the user to communicate as described herein in reference to FIG. 1A. In one embodiment, the Secondary Statistics are generated using inference rules and weighted sums. An inference rule may be changed or tuned during the generation of Secondary Statistics. The Primary Statistics may be sent to a second computer system to generate the Secondary Statistics using cloud computing techniques.

In one embodiment, the Secondary Statistics also are based on external statistics such as: length of employment, languages spoken, job identity, employment hours, location assignments, skills possessed, desired skills, roles, responsibilities or social engagement quotient (SEQ). In one embodiment, the assessment is dynamically updated based on new communications between the two devices.

It should be appreciated that process 1900 may generate an assessment and Secondary Statistics for a single user or for a plurality of users. The plurality of users may be a related group such as all employees associated with a retail environment or all employees in a retail environment during a shift.

At 1908, the assessment is made available to a third party which may be a person, a plurality of people or a computer system. The assessment may be used by the third party or others to make decisions for combining groups of users into teams.

At 1910, a visual representation is generated based on the assessment that maps information from the assessment to geographical or logical maps, graphs or spatial representations. For example, the visual representation may be a map that shows the geographic location of a user over a period of time within the retail environment. Thus the visual representation may convey where an employee spends their time while on shift and where the employee is located when communicating or engaged with shoppers. The visual representation may also depict the types of communications that are made in certain areas. For example, it may show that an employee will answer communications even when in the break room. Or the visual representation may show that two employees are likely to only communicate with each other during certain times or in certain places.

Figure 20:
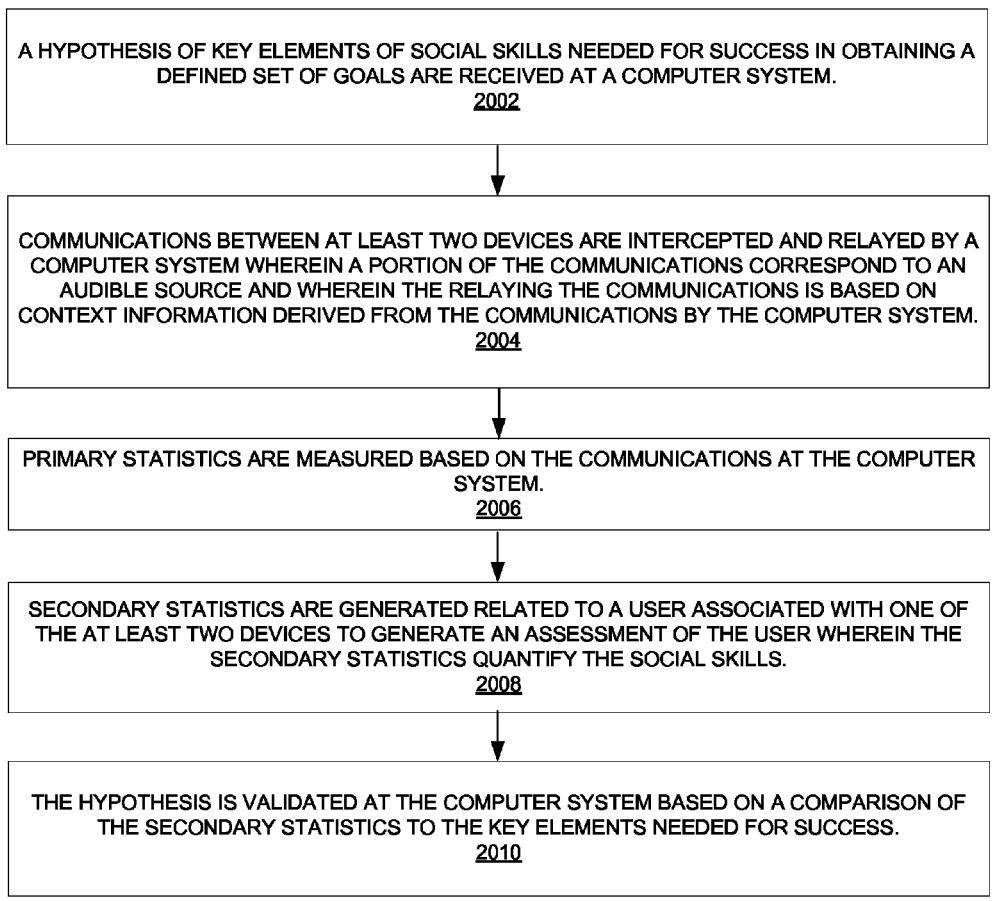
FIG. 20 illustrates a flowchart of an example method for using structured communications to validate a hypothesis related to social skills in accordance with embodiments of the present technology.

FIG. 20 is a flowchart illustrating process 2000 for using structured communications to validate a hypothesis related to social skills and social factors in accordance with one embodiment of the present technology. In one embodiment, process 2000 is computer implemented methods that are carried out by processors and electrical components under the control of computer usable and computer executable instructions. The computer usable and computer executable instructions reside, for example, in data storage features such as computer usable volatile and non-volatile memory. However, the computer usable and computer executable instructions may reside in any type of computer usable storage medium. In one embodiment, process 2000 is performed by the components of FIGS. 1A, 1B, 1C, 1D, or 2. In one embodiment, the methods may reside in a computer usable storage medium having instructions embodied therein that when executed cause a computer system to perform the method.

At 2002, a hypothesis of key elements of social skills or social factors which are characteristic of the desired set of social factors needed for the role or position are received at a computer system. The hypothesis may be created by a manager, a plurality of mangers, other individuals or plurality of individuals or may be automatically generated by a machine such as the computer system. The hypothesis may also be generated by the manager or others and supplemented or modified by a machine. In one embodiment, the hypothesis is created by the manager based on experience, judgment, and/or the input of a consultant as to what social skills or sociability potential of employees are needed for a given shift or other assignment to meet the set of defined goals. The hypothesis is then tested using the following steps. The defined set of goals may be financial such as achieving a specified level of sales in a retail environment.

Steps 2004, 2006 and 2008 are similar to steps 1902, 1904 and 1906 of process 1900 and comprise the same features, capabilities and limitations.

At 2004, communications between at least two devices are intercepted and relayed by a computer system wherein a portion of the communications correspond to an audible source and wherein the relaying the communications is based on context information derived from the communications by the computer system.

At 2006, Primary Statistics are measured based on the communications at the computer system.

At 2008, Secondary Statistics are generated related to a user associated with one of the at least two devices to generate an assessment of the user wherein the Secondary Statistics quantify the social skills.

At 2010, the hypothesis is validated at the computer system based on a comparison of the Secondary Statistics to the key element or social factors which are characteristic of the desired set of social factors needed for the role or positions. The validation could be that the hypothesis is valid or not valid. In one embodiment, the hypothesis is found not valid but is improved via input from the manager, relevant individuals or the computer system. The improved hypothesis may then be validated or not. The input for the improved hypothesis may be to tune an inference rule for generating the Secondary Statistics. The validation step is used to provide the manager or others with information as to whether the hypothesis is useful making decisions in to obtain the defined set of goals.

The following is an example of how process 2000 may be implemented. Store chain ABC has several stores in different regions. Each store is open an average of 12 hours a day, more on Wednesdays and Saturdays, less on Sundays. The management has deployed the observation platform, and is sophisticated in the use of big data and data analytics. The management now is embarking on use of the observation platform to improve shift scheduling and hiring. This program will consist of the following phases:

Phase 0: Management has already defined a set of goals for employee costs, unit sales, and certain specific sales goals in new product categories.

Phase 1: Management uses its own experience and expert judgment, with external consultants, to hypothesize key elements of employee behavior needed for plan success, and how this behavior can be measured. Management verifies that the observation platform will be configured using the internal set-up tools, parameters, policy selection, and information selection tools to gather the needed Primary Statistics while providing the communication, location and contextual support that is inherent to the observation platform.

Phase 2: Management lays in place the analytics program to produce behavioral metrics based on the hypothesis, and to compare those metrics with the observed store results to validate, discard, and improve the various hypothesis. Management also recognizes that there may be other relations not obvious to them, and elects to use the machine-generated hypothesis to look further into other factors that might contribute to success.

Phase 3: Management begins to execute the new program, tuning the inference rules using by comparing higher level statistics against results, both manually to generate insight and in the machine to leverage the power of big data.

Phase 4: Management uses the discovered rules in a set of modeling activities to assist in optimizing staffing, and to improve hiring, training, and incentives for both employees and immediate store supervision.

Continuing Phase: At the same time, management continues with the activities initiated in the earlier phases to build a system of continuous improvement. Through the continuous improvement enabled by all Information Technology and especially by the Observation Platform, management is able to be agile in tracking market trends and product opportunities, and continues advancing in retail leadership.

Phase 1 may further comprise:

Management believes that 'team relationships' are fundamental. Management expects to find that employee groups of 'loners' and 'team players', and that the likely program will be to identify the best team players, allocate them at the most leveraged times, while moving the loners to less leveraged times and modifying HR policies to get more team players while reducing the number of the loners. Management also believes that teaming may be fundamentally driven by certain key groupings or partnerships, and that discovering these natural partnerships will help in assigning shift schedules. Management expects to divide the team players into distinct categories: "Amiables" having an easy and often-used facility to interact and greet, "Helpers" having a proclivity to respond to requests but not necessarily to initiate an interaction, "Experts" having deep knowledge as evinced by being the target of certain types of interactions from others, and "Managers" as measured by a likelihood of organizing tasks including customer-help. Management expects to find that high-performing teams will be made of some appropriate mix of these types and that the identified 'loners' will negatively impact performance. Management builds a table that summarizes these expectations, using this to guide the programming of the observation platform and the analytics derived from the platform. Finally, management enables the sophisticated auto-search for rule' in the analytics to see what other patterns might emerge by certain canned algorithmic procedures that themselves generate algorithmic procedures in order to look for emergent higher order statistics casually associated with store performance under various times and schedules. (Some team make-up might be better for the 'shopper-gatherer, more female' week-day crowd vs the 'hunter-purchaser, more male' Saturday and evening crowd).

Phase 2 may further comprise:

Management rolls out the program, and the Observation Platform gathers the Primary Statistics.

Phase 3 may further comprise:

The Analytics Platform, using the Primary Statistics from the Observation Platform, groups employees into the categories defined by management, and then correlates different mixes with the historical store results. This reveals that the Mgmt and Helper categories are less correlated with success, and that the Amiable and Expert are more strongly correlated. Additionally, the analytics platform varies the strengths of the couplings (as in the above table), adjusting the weights to optimize the predictiveness of the higher-level statistics, also called behavioral metrics.

Figure 21:
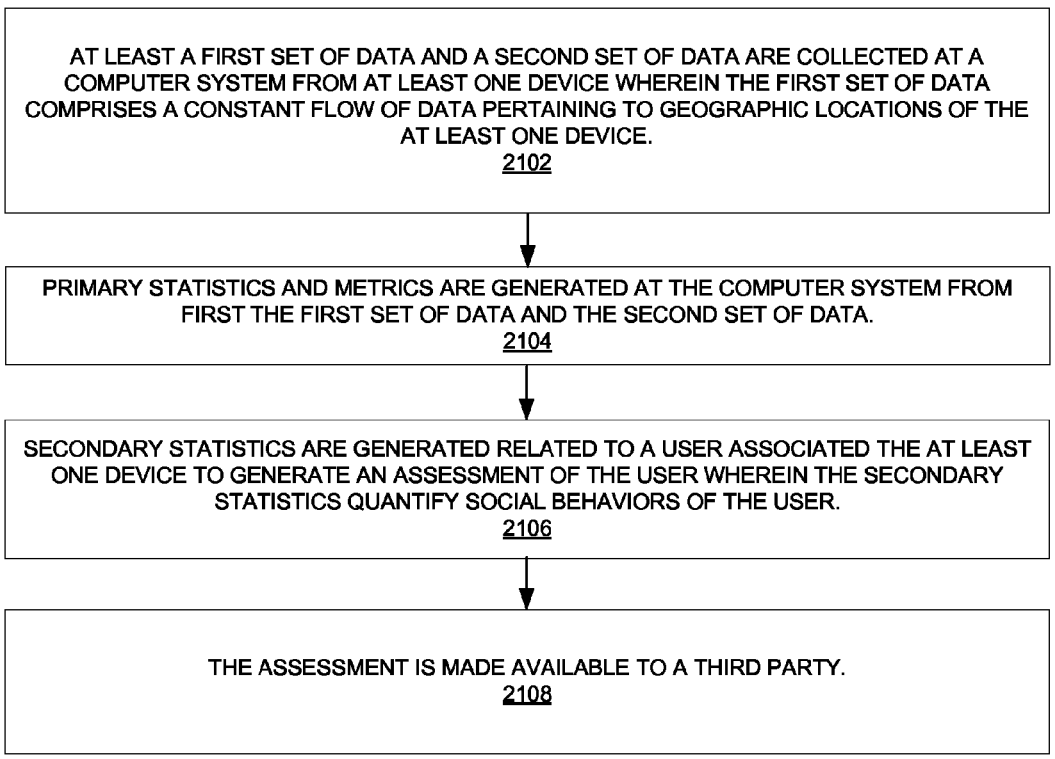
FIG. 21 illustrates a flowchart of an example method for using an observation platform to measure and quantify social skills in accordance with embodiments of the present technology.

FIG. 21 is a flowchart illustrating process 2100 for using an observation platform to measure and quantify social skills in accordance with one embodiment of the present technology. In one embodiment, process 2100 is computer implemented methods that are carried out by processors and electrical components under the control of computer usable and computer executable instructions. The computer usable and computer executable instructions reside, for example, in data storage features such as computer usable volatile and non-volatile memory. However, the computer usable and computer executable instructions may reside in any type of computer usable storage medium. In one embodiment, process 2000 is performed by the components of FIGS. 1A, 1B, 1C, 1D, or 2. In one embodiment, the methods may reside in a computer usable storage medium having instructions embodied therein that when executed cause a computer system to perform the method.

At 2102, at least a first set of data and a second set of data are collected at a computer system from at least one device wherein the first set of data comprises a constant flow of data pertaining to geographic locations of the at least one device. The second set of data may be context data or information derived from communications from the first device, intercepted at the computer system and relayed to a second device. The second set of data may be other data gathered by the computer system.

At 2104, Primary Statistics and metrics are generated at the computer system from first the first set of data and the second set of data.

At 2106, Secondary Statistics are generated related to a user associated the at least one device to generate an assessment of the user wherein the Secondary Statistics quantify social behaviors of the user.

At 2108, the assessment is made available to a third party.

Figure 22:
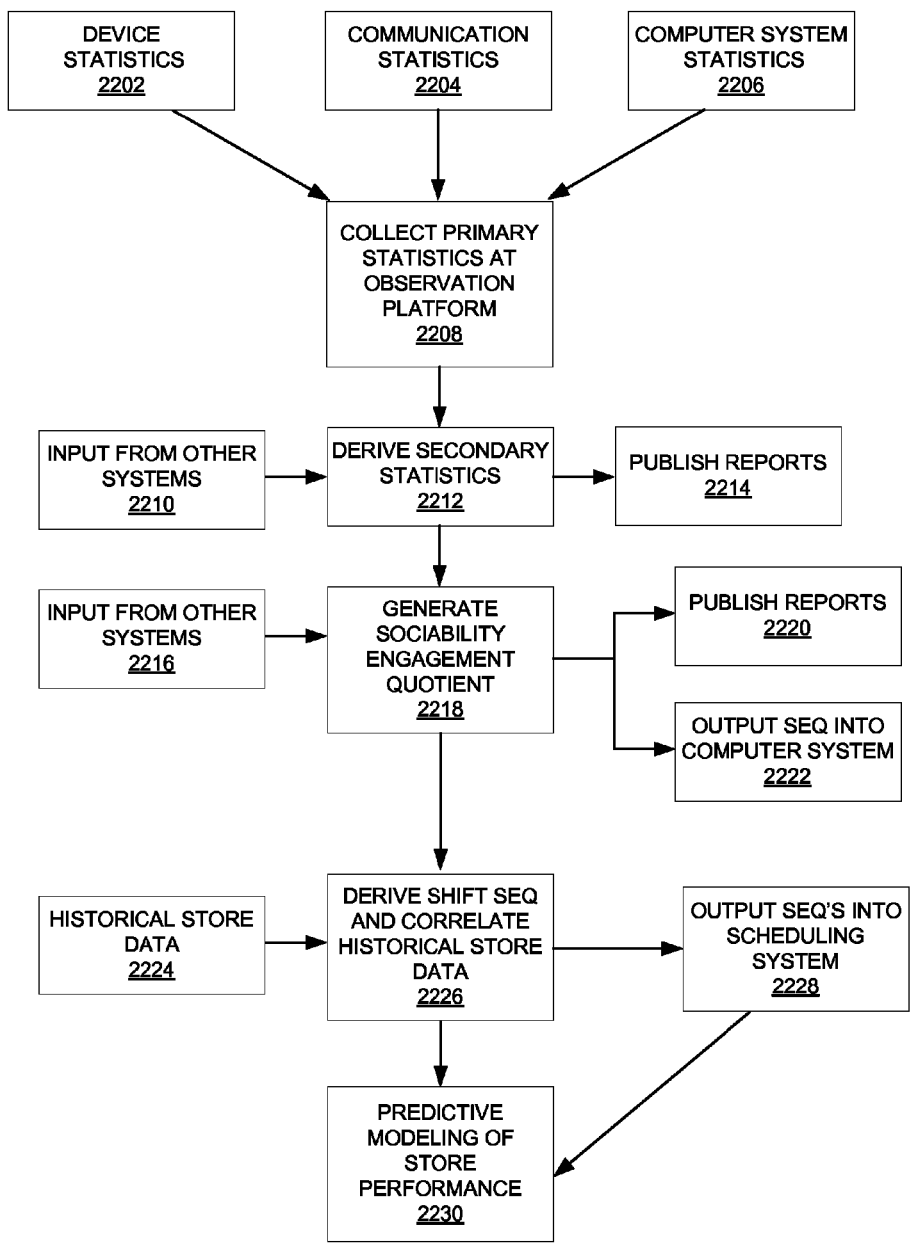
FIG. 22 illustrates a flowchart of an example method for using an observation platform to measure and quantify social skills in accordance with embodiments of the present technology.

FIG. 22 is a flowchart illustrating process 2200 for using an observation platform to measure and quantify social skills in accordance with one embodiment of the present technology. In one embodiment, process 2200 is computer implemented methods that are carried out by processors and electrical components under the control of computer usable and computer executable instructions. The computer usable and computer executable instructions reside, for example, in data storage features such as computer usable volatile and non-volatile memory. However, the computer usable and computer executable instructions may reside in any type of computer usable storage medium. In one embodiment, process 2200 is performed by the components of FIGS. 1A, 1B, 1C, 1D, or 2. In one embodiment, the methods may reside in a computer usable storage medium having instructions embodied therein that when executed cause a computer system to perform the method.

It should be appreciated that that process 2200 is accomplished using devices and computer systems associated with an observation platform. The observation platform may be for a retail environment or other environment where an observation platform may be used.

In one embodiment, device statistics 2202, communications statistics 2204, and computer system statistics 2206 are all input data that is generated by the observation platforms with their devices and components as described in FIGS. 1A, 1B, 1C, 1D, and 2. Device statistics 2202 may be statistics related to a handheld device in a retail environment such as a smart phone. In one embodiment, device statistics 2202 is information indicative of a geographic location of the device. Communications statistics 2204 may be statistics related to communications between two devices such as is described herein. The communications statistics 2204 may be based on the actual text of the communication after the communication has been converted from voice to text or may be based on the characteristics of the communication such as when it was sent, who sent it, who receive it, etc. Computer system statistics 2206 may be related to the statistics or data stored in a computer system associated with the observation platform and may include data similar to 2202 and 2204.

At 2208, the device statistics 2202, communications statistics 2204, and computer system statistics 2206 inputted into or collected by the observation platform. This may be accomplished by a first computer system associated with the observation platform.

At 2210, the first computer system receives an input of data from other systems such as data from a finance department, a human resources department, or other department associated with the environment in which in the observation platform is used.

At 2212, the first computer system is employed to derive Secondary Statistics based on 2202, 2204, 2206, and/or 2210. The Secondary Statistics may be the same as described in processes 1900, 2000 and 2100.

At 2214, reports may be published based on the Secondary Statistics. Such reports may be made available to a manager or other person associated with the observation platform. The report may include text, graphs, and other forms of present data.

At 2216, the first computer system receives an input of data from other systems such as data from a finance department, a human resources department, or other department associated with the environment in which in the observation platform is used.

At 2218, the first computer system is employed to generate a sociability engagement quotient (SEQ) based on the Secondary Statistics and the input from 2216.

At 2220, reports may be published based on the SEQ. Such reports may be made available to a manager or other person associated with the observation platform. The report may include text, graphs, and other forms of present data.

At 2222, the SEQ may be outputted to a computer system that may or may not be associated with the observation platform. The SEQ may then be employed for a variety of purposes including creating schedules of personnel, the placement of personnel in roles, or for scripted training messages appropriate to the SEQ at that time.

At 2224, historical store data is inputted into the first computer system. The store may be a retail environment associated with the observation platform. The store may also refer to another type of environment associated the observation platform. The historical store data may be past data pertaining to 2202, 2204, 2206, or may be past data related to 2210 or 2216, or may be past Secondary Statistics or past SEQ's.

At 2226, the first computer system is employed to derive a shift SEQ and correlate the historical store data. The shift SEQ may be an SEQ based on Secondary Statistics that relates only to a shift for a retail environment. For example, the shift may refer to a given amount of time when the retail environment had a staff of employing working. The shift SEQ may be based only on the employees working during the shift.

At 2228, the shift SEQ and/or other SEQ's are outputted into workforce scheduling for use in making decisions. The decisions may be to determine which employees to staff during particular future shifts.

At 2230, the shift SEQ from 2226 and/or the output from 2228 are employed to generate predictive modeling of store performance at the first computer system. The predictive modeling may refer to predictive success of a store such as sales records, etc.

Example Computer System Environment

Portions of the present technology are composed of computer-readable and computer-executable instructions that reside, for example, in computer-usable media of a computer system or other user device. Described below is an example computer system or components that may be used for or in conjunction with aspects of the present technology.

It is appreciated that the present technology can operate on or within a number of different computer systems including general purpose networked computer systems, embedded computer systems, cloud-based computers, routers, switches, server devices, user devices, various intermediate devices/artifacts, stand-alone computer systems, mobile phones, personal data assistants, televisions and the like. The computer system is well adapted to having peripheral computer readable media such as, for example, a floppy disk, a compact disc, and the like coupled thereto.

The computer system includes an address/data bus for communicating information, and a processor coupled to bus for processing information and instructions. The computer system is also well suited to a multi-processor or single processor environment and also includes data storage features such as a computer usable volatile memory, e.g. random access memory (RAM), coupled to bus for storing information and instructions for processor(s).

The computer system may also include computer usable non-volatile memory, e.g. read only memory (ROM), as well as input devices such as an alpha-numeric input device, a mouse, or other commonly used input devices. The computer system may also include a display such as liquid crystal device, cathode ray tube, plasma display, and other output components such as a printer or other common output devices.

The computer system may also include one or more signal generating and receiving device(s) coupled with a bus for enabling the system to interface with other electronic devices and computer systems. Signal generating and receiving device(s) of the present embodiment may include wired serial adaptors, modems, and network adaptors, wireless modems, and wireless network adaptors, and other such communication technology. The signal generating and receiving device(s) may work in conjunction with one or more communication interface(s) for coupling information to and/or from the computer system. A communication interface may include a serial port, parallel port, Universal Serial Bus (USB), Ethernet port, antenna, or other input/output interface. A communication interface may physically, electrically, optically, or wirelessly (e.g. via radio frequency) couple the computer system with another device, such as a cellular telephone, radio, a handheld device, a smartphone, or computer system.

Although the subject matter is described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for using an observation platform to measure and quantify social skills, comprising:
    collecting, at a computer system, at least a first set of data and a second set of data from at least one device wherein said first set of data comprises information pertaining to geographic locations of said at least one device;
    generating, at said computer system, primary statistics and metrics from said first set of data and said second set of data;
    generating, by said computer system, secondary statistics related to a user associated with said at least one device to generate an assessment of said user wherein said secondary statistics quantify social behaviors of said user; and
    making said assessment available to a third party.

2. The method as recited in claim 1 wherein said second set of data pertains to context data derived from communications between said at least one device and a second device wherein said communications are intercepted at said computer system.

3. The method as recited in claim 2 wherein said communications are relayed from said at least one device to said second device via said computer system.

4. The method as recited in claim 2 wherein a portion of said communications corresponds to an audible source.

5. The method as recited in claim 1 wherein said third party is selected from the group of third parties consisting of a person, a plurality of people, and a relevant computer system.

6. The method as recited in claim 1 wherein said generating said secondary statistics is accomplished using an inference rule with an algorithm to construct a social engagement quotient (SEQ) metric based on data associated with said primary statistics.

7. a) The method as recited in claim 1 wherein said assessment further comprises high order statistics generated through an application of an inference rule to said secondary statistics.

8. The method as recited in claim 1 wherein said assessment is for use by said third party in making decisions regarding appropriate roles for users, performance assessments, and/or for combining groups of users into teams.

9. The method as recited in claim 1 wherein said assessment is for use by one of a related computer system and another non-human device used to signal, control, supervise, quantify, analyze or otherwise utilize the assessment.

10. The method as recited in claim 1 wherein said assessment quantifies metrics that convey an ability and willingness of said user to communicate, educate, or engage with others.

11. The method as recited in claim 1 wherein said assessment is dynamically updated based on new secondary statistics based on new primary statistics.

12. The method as recited in claim 1 wherein said devices and said computer system associated with a hospitality or retail environment.

13. The method as recited in claim 1 wherein said primary statistics are selected from the group of primary statistics consisting of: engagement time, available times, location maps, talk time, listen time, number of listeners, geographic location of device, locations traversed including speed and direction, length of a communication, under what circumstances, who initiated communications to which groups and individuals, presence information, type of communication, key words, keywords spoken or listened to, tone, emotion, lengths of speeches, lengths of speech segments, what policies are used for the communications, when and where two or more individuals dwell in close proximity to each other or to specific locations, speed of movement and pausing of listening individuals during/after talking or listening, and frequency that listeners delay hearing a message or drop out from what a speaker is saying, and/or promptness of responses to what was heard.

14. The method as recited in claim 1 further comprising:
    generating a visual representation based on said assessment that maps information from said assessment geographical or logical maps, graphs or spatial representations.

15. The method as recited in claim 1 wherein said assessment is combined with external statistics selected from the group of external statistics consisting of: length of employment, languages spoken, job identity, employment hours, location assignments, skills possessed, desired skills, roles, and responsibilities.

16. A non-transitory computer-usable storage medium having instructions embodied therein that when executed cause a computer system to perform a method for using structured communications to quantify social skills, said method comprising:

collecting, at a computer system, at least a first set of data and a second set of data from at least one device wherein said first set of data comprises information pertaining to geographic locations of said at least one device;

generating, at a computer system, primary statistics and metrics from said first set of data and said second set of data;

generating secondary statistics related to a user associated said at least one device to generate an assessment of said user wherein said secondary statistics quantify social behaviors of said user; and making said assessment available to a third party.

17. The non-transitory computer-usable storage medium as recited in claim 16 wherein said second set of data pertains to context data derived from communications between said at least one device and a second device wherein said method further comprises intercepting said communications at said computer system.

18. The non-transitory computer-usable storage medium as recited in claim 17 wherein said method further comprises relaying said communications from said at least one device to said second device via said computer system.

19. The non-transitory computer-usable storage medium as recited in claim 17 wherein a portion of said communications corresponds to an audible source.

20. A platform for using structured communications to quantify social skills, said platform comprising:
    a first device for generating a first set of data comprising information pertaining to geographic locations of said first device and for generating a second set of data; and
    a computer system for collecting at least said first set of data and said second set of data from said first device and for generating primary statistics and metrics from said first set of data and said second set of data and further for generating secondary statistics related to a user associated said first device to generate an assessment of said user wherein said secondary statistics quantify social behaviors of said user and further for making said assessment available to a third party.

21. The platform as recited in claim 20 further comprising:
    a plurality of devices each for generating said first set of data and for generating said second set of data, said first set of data comprising a constant flow of data pertaining to geographic locations of said plurality of devices; and
    wherein said computer system is further for collecting said first set of data and said second set of data from each of said plurality of devices and further for generating secondary statistics related to each user associated with each of said plurality of devices to generate an assessment of said each user wherein said secondary statistics quantify social behaviors of said each user.

* * * * *

UNITED STATES PATENT AND TRADEMARK OFFICE
CERTIFICATE OF CORRECTION

PATENT NO. : 9,501,951 B2  
APPLICATION NO. : 14/680475  
DATED : November 22, 2016  
INVENTOR(S) : Steven Paul Russell et al.

It is certified that error appears in the above-identified patent and that said Letters Patent is hereby corrected as shown below:

Page 2, Column 2, Other Publications, Line 3:  
Delete: ""I-Dentric Communications:"  
Insert: --"I-centric Communications:--

Page 60, Column 1, Claim 7, Line 1:  
Delete: "7. a) The"  
Insert: --7. The--

Signed and Sealed this  
Thirteenth Day of June, 2017

Joseph Matal  
*Performing the Functions and Duties of the*  
*Under Secretary of Commerce for Intellectual Property and*  
*Director of the United States Patent and Trademark Office*